US007577645B2

(12) United States Patent
Yamamoto et al.

(10) Patent No.: US 7,577,645 B2
(45) Date of Patent: *Aug. 18, 2009

(54) INFORMATION PROCESSING DEVICE AND INFORMATION PROCESSING METHOD, RECORDING MEDIUM, AND COMPUTER PROGRAM

(75) Inventors: Noriyuki Yamamoto, Kanagawa (JP); Mitsuhiro Miyazaki, Kanagawa (JP); Mari Saito, Kanagawa (JP); Hiroyuki Koike, Kanagawa (JP)

(73) Assignee: Sony Corporation, Tokyo (JP)

( * ) Notice: Subject to any disclaimer, the term of this patent is extended or adjusted under 35 U.S.C. 154(b) by 509 days.

This patent is subject to a terminal disclaimer.

(21) Appl. No.: 10/538,181

(22) PCT Filed: Dec. 12, 2003

(86) PCT No.: PCT/JP03/15926

§ 371 (c)(1),
(2), (4) Date: Feb. 1, 2006

(87) PCT Pub. No.: WO2004/054246

PCT Pub. Date: Jun. 24, 2004

(65) Prior Publication Data

US 2006/0129547 A1 Jun. 15, 2006

(30) Foreign Application Priority Data

Dec. 12, 2002 (JP) ............................. 2002-361277

(51) Int. Cl.
*G06F 7/00* (2006.01)
(52) U.S. Cl. ........................................................ 707/4
(58) Field of Classification Search ................ 707/1–10
See application file for complete search history.

(56) References Cited

U.S. PATENT DOCUMENTS

| 2001/0023401 | A1 | 9/2001 | Weishut et al. |
| 2003/0220858 | A1* | 11/2003 | Lam et al. ...................... 705/35 |
| 2004/0019846 | A1* | 1/2004 | Castellani et al. ............ 715/500 |
| 2004/0032393 | A1* | 2/2004 | Brandenberg et al. ....... 345/156 |
| 2004/0034631 | A1* | 2/2004 | Julliard et al. .................. 707/4 |
| 2004/0073625 | A1* | 4/2004 | Chatani ...................... 709/217 |
| 2006/0294093 | A1* | 12/2006 | Yamamoto et al. ............. 707/5 |

FOREIGN PATENT DOCUMENTS

| JP | 9-288683 | 11/1997 |
| JP | 2001-86420 | 3/2001 |
| JP | 2001-160955 | 6/2001 |
| JP | 2001-282285 | 10/2001 |

\* cited by examiner

*Primary Examiner*—Wilson Lee
(74) *Attorney, Agent, or Firm*—Oblon, Spivak, McClelland, Maier & Neustadt, P.C.

(57) ABSTRACT

An information processing apparatus and an information processing method, a recording medium, and a program make it possible to generate a positive history vector and a negative history vector. A negative history vector is generated from initially registered contents. If the initially registered contents are not changed, and an operation log is supplied, whether or not the supplied operation log is a positive history is determined. When the supplied operation log is a positive history, a program vector corresponding to the operation log is additionally stored as a positive history, and a positive history vector is generated from a sum of program vectors. When the supplied operation log is a negative history, a program vector corresponding to the operation log is additionally stored as a negative history, and a negative history vector is generated from a sum of program vectors.

20 Claims, 40 Drawing Sheets

FIG. 4

MOVIE - JAPANESE MOVIE "TOKAIDO MITSUYA KAIDAN"
08/14 (WED) 22:43, 08/15 (WED) 00:00 WOWO
1959 (SAIHO), ORIGINAL 74 MINUTES
[DIRECTOR] NOBUO NAKAGAWA [SCREENWRITER] SHOICHI OHNUKI, YOSHIHIRO ISHIDA
[CINEMATOGRAPHER] SHOJI NISHIMOTO [MUSIC] CHUTA WATANABE
[STARRING] KATSUMI WAKASUGI, SHIGERU AMAMI, TOSHIHIKO EMI,
　　　　　　RYUJIRO NAKAMURA, NORIKO NISHIZAWA
[COMMENTS] '59 SAIHO
　　☆THE MASTERPIECE OF JAPANESE HORROR MOVIES
　　　THAT DEPICTS THE WORLD OF WELL-KNOWN "MITSUYA KAIDAN"
　　　WITH FULL STYLISTIC BEAUTY.

FIG. 5

| PROGRAM VECTOR | PP=(Tm,Gm,Hm,Sm,Pm,Am,Km) |
|---|---|
| T: TITLE (Title)<br>G: GENRE (Genre)<br><br>H: TIME SLOT (Hour)<br><br>S: BROADCASTING STATION (TV Station)<br><br><br>P: STARRING (Person)<br>A: SCRIPTWRITER/AUTHOR/PRODUCER (Author)<br>K: CONTENTS (Keyword) | Tm={Title}<br>Gm={DRAMA, VARIETY, SPORTS, MOVIE, MUSIC,<br>CHILD-ORIENTED/EDUCATION,<br>CULTURE/DOCUMENT, NEWS/REPORT, OTHER}<br>Hm={MORNING, NOON, EVENING, PRIME TIME,<br>MIDNIGHT}<br>Sm={NNK SOGO, NNK KYOUIKU, ASIA TELEVISION,<br>TTS, BUJI, TELENICHI, TOTO,<br>NNK EISEI DAIICHI, NNK EISEI DAINI, WOWO}<br>Pm={person A, person B, ···, }<br>Am={person a, person b, ···, }<br>Km={kw1, kw2, ···, } |

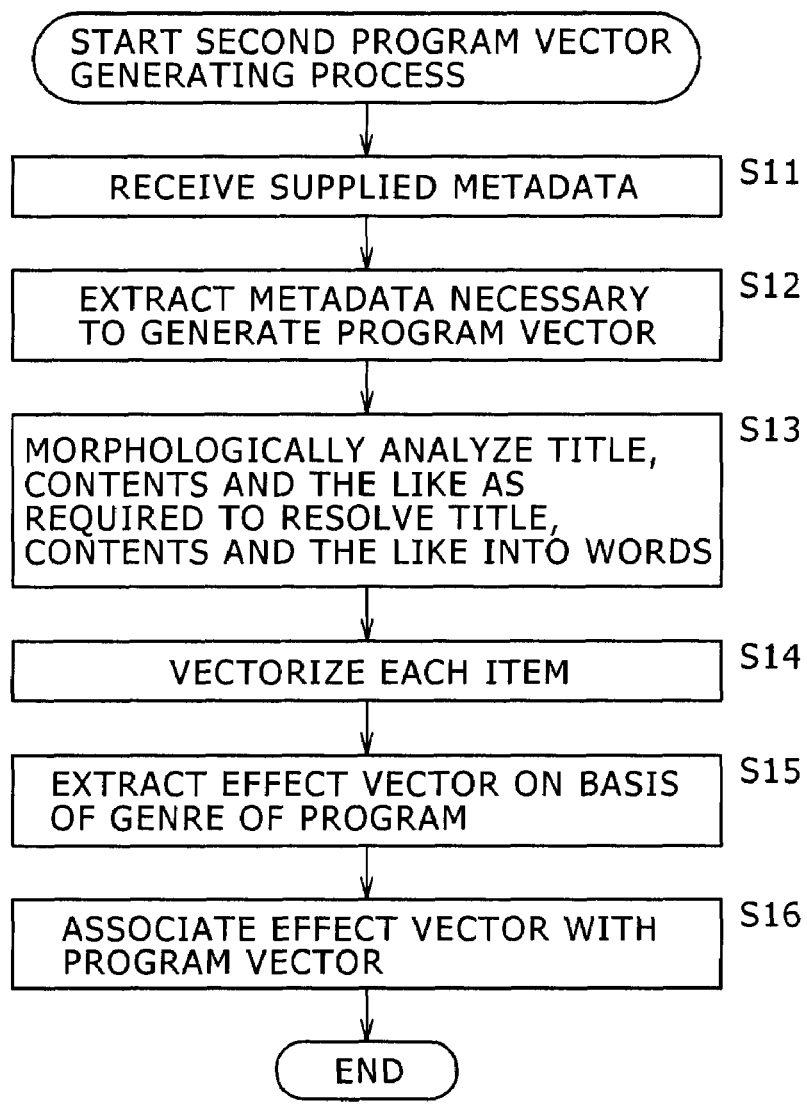

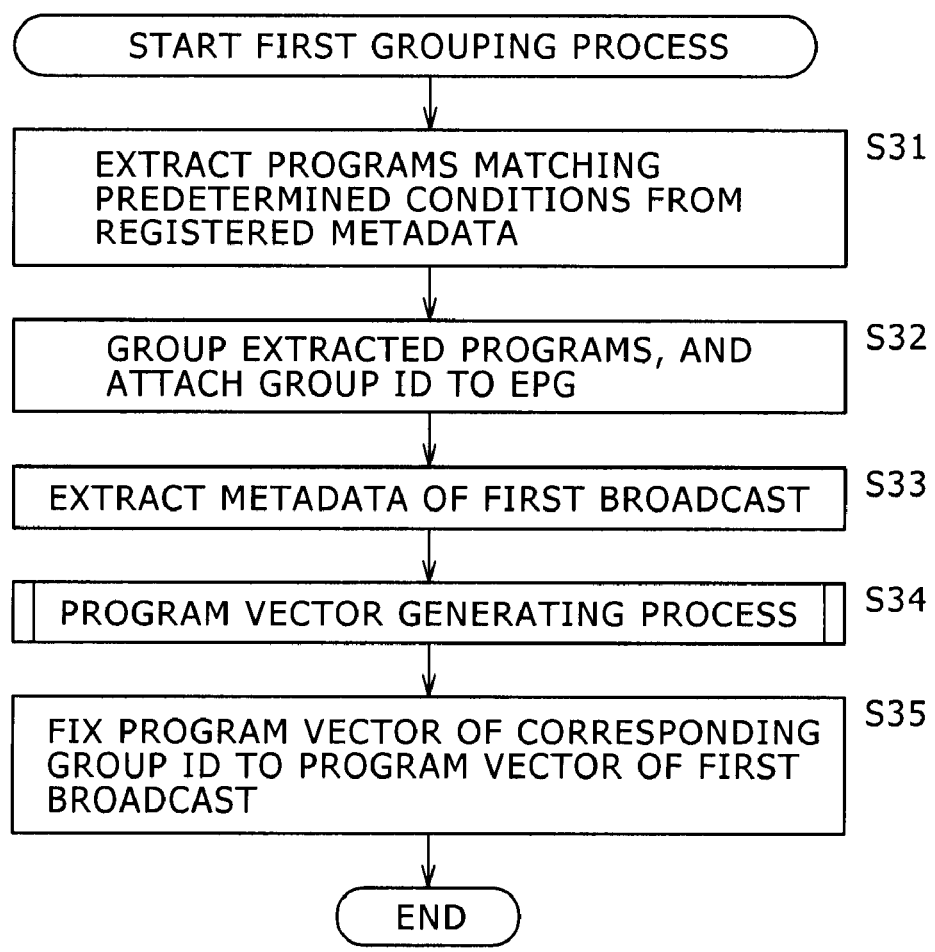

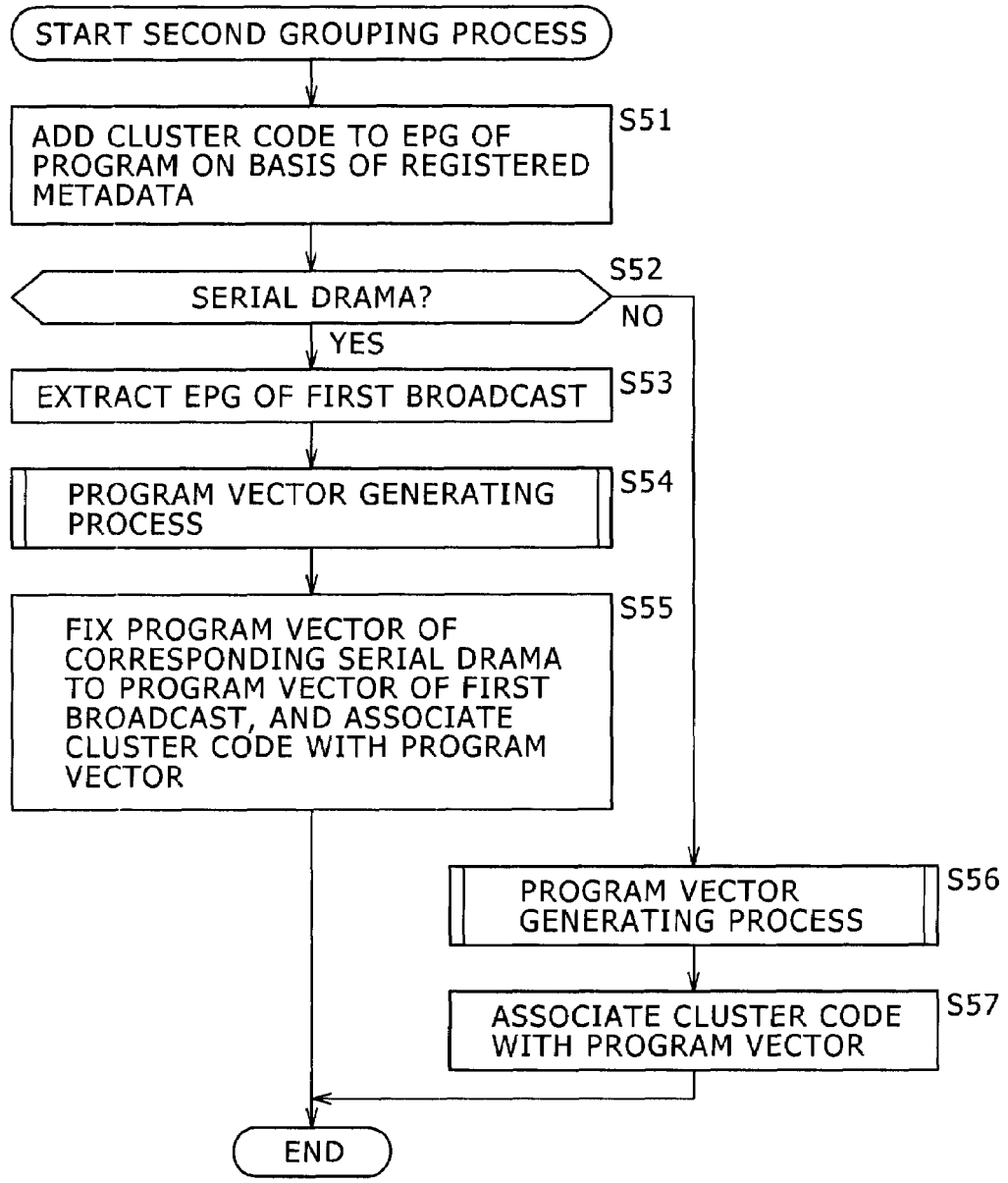

FIG. 15

| POSITIVE HISTORY VECTOR | UP=(Tup,Gup,Pup,Aup,Kup) |
|---|---|
| TITLE | Tup={(title 1-12), (title 2-3), ⋯,} |
| GENRE | Gup={(DRAMA-25), (VARIETY-34), (SPORTS-42), (MOVIE-37), (MUSIC-73), (CHILD-ORIENTED/EDUCATION-120), (CULTURE/DOCUMENT-3), (NEWS/REPORT-5), (OTHER-23)} |
| STARRING | Pup={(person A-10), (person B-43), ⋯,} |
| SCRIPTWRITER/AUTHOR/PRODUCER | Aup={(person a-8), (person b-2), ⋯,} |
| CONTENTS (Keyword) | Kup={(kw1-32), (kw2-73), ⋯,} |

INFORMATION PROCESSING DEVICE AND INFORMATION PROCESSING METHOD, RECORDING MEDIUM, AND COMPUTER PROGRAM

TECHNICAL FIELD

The present invention relates to an information processing apparatus and an information processing method, a recording medium, and a program, and particularly to an information processing apparatus and an information processing method, a recording medium, and a program that are suitable for use in recommending for example automatic recording, programs and the like to users viewing programs of television broadcasting, radio broadcasting and the like, and streaming data and the like.

BACKGROUND ART

Conventionally, for example, when a program is recommended to a user in television broadcasting, radio broadcasting and the like, a program matching information on preference of the user is selected on the basis of program information (program metadata) such an electronic program guide (EPG) or the like. A method for recommending a program to a user differs depending on a method of obtaining user taste data. The recommending method includes for example an initial interest registration method in which information on interests of a user is registered initially and a program is recommended on the basis of the information, a viewing history using method in which a history of programs viewed by a user in the past is used to recommend a program, or a collaborative filtering method in which a history of viewing by another user is used to recommend a program.

The initial interest registration method has the user register for example favorite program categories (for example dramas, variety shows and the like), favorite genres (detective stories, comedies and the like), or names of favorite talent at the time of a start of use, and obtains a name of a program to be recommended by performing matching between these pieces of information as keywords and program metadata.

The viewing history using method accumulates metadata of viewed programs each time the user views a program. When the history metadata is accumulated to a certain degree, the metadata is analyzed, and thereby information such for example as favorite program categories, favorite genres, or names of favorite talent is obtained. By performing matching between these pieces of information as keywords and program metadata, a name of a program to be recommended is obtained.

In a recording device using an HDD (Hard Disk Drive), for example, not only a history of viewing but also user operations such as recording programming, recording or the like may be accumulated as history information, and used to obtain taste information. In this case, it is possible to partly distinguish between programs that are viewed by the user without any particular interest and are in a state of being viewed because a television receiver, a radio or the like is on and programs viewed intentionally with more interest. Thus, information reflecting preference of the user more can be obtained.

The collaborative filtering method performs matching between a history of viewing and operations of a first user and histories of viewing of other users to search for a second user having a similar history of viewing to that of a first user, and obtains viewing or operation history data of the second user to extract and recommend programs that have been viewed by the second user but have not yet been viewed by the first user.

There is a technology that adds an n-dimensional attribute vector as program attribute information to a broadcasting program in advance, and can select a program to be recorded or a program to be reproduced by comparing a selection vector generated on the basis of an average value of each attribute item of attribute vectors of contents initially registered by the user and programs reproduced by the user or recorded by programmed recording and attribute vectors (for example Japanese Patent Laid-Open No. 2001-160955).

However, when a program is selected on the basis of the initial registration method, it is possible to reflect only fixed interests at the time of initial registration by the user. Besides, to obtain detailed information makes user registration operations complicated. On the other hand, when the number of pieces of information registered is reduced to simplify the operation of inputting registration information in initial setting, recommendation can be made only on the basis of rough information on preference of the user, thus resulting in lower accuracy in selecting programs suiting the preference of the user.

On the other hand, when a program is selected using a sum, an average or the like of metadata simply collected on the basis of a history of viewing of the user or the like as in the history using method or the like, programs accurately suiting the preference of the user cannot be recommended unless the history is accumulated to a certain extent. Further, in the history using method, relationship between metadata is obscured, and thus personalization cannot be made sufficiently. In addition, accumulating the history can cause an imbalance in weighting between items that tend to accumulate as a history, such for example as genre (items that tend to be detected as things that the user has a preference for) and items whose elements tend to spread as a history, such for example as starring (items that tend not to be detected as things that the user has a preference for).

Specifically, for example, in a case where a user is a fan of commentator A and thus likes to view "a live broadcast of a game played by baseball team B in which broadcast commentator A comments", information "live broadcast of baseball" as a genre tends to accumulate as a history (information "live broadcast of baseball" is easily detected as a thing that the user has a preference for), whereas information "commentator A" does not tend to accumulate as a history (information "commentator A" is not easily detected as a thing that the user has a preference for). Hence, there occurs a case where a live broadcast of a game played by baseball team B in which broadcast another commentator comments is recommended, but a variety program on which commentator A appears is not recommended.

Also in the case where a program attribute vector is added to a broadcasting program in advance, and a program to be recorded or a program to be reproduced is selected by comparing a selection vector generated on the basis of an average value of each attribute item of contents initially registered by the user and attribute vectors of programs reproduced by the user or recorded by programmed recording and attribute vectors, as disclosed in Japanese Patent Laid-Open No. 2001-160955, a history of user operations is used, and therefore there may similarly occur an imbalance in weighting between items that tend to accumulate as a history and items whose elements tend to spread as a history such as starring and the like.

Further, for example, in a selection vector generated for a user who likes dramas and likes variety programs on which comedian A hardly appearing in dramas appears, and whose viewing ratio of variety programs to dramas is 2:8, starring B who frequently appears in dramas but is not an actor that the user particularly likes is accumulated as a history. Hence, a documentary in which starring B who frequently appears in dramas appears is recommended before a variety show in which comedian A appears.

In addition, when an important item for selecting programs differs (for example importance is attached to starring or importance is attached to contents) depending on the user, all items are calculated similarly, and thus preference unique to the user are not reflected in some cases.

Further, the collaborative filtering method uses mere information on preference of another user, and therefore makes it difficult to extract information indicating preference of each user in detail.

DISCLOSURE OF INVENTION

The present invention has been made in view of the above, and makes it possible to select programs suiting preference of a user.

According to the present invention, there is provided an information processing apparatus including: attribute information obtaining means for obtaining attribute information of a content; operation history obtaining means for obtaining an operation history of a user; preference information generating means for generating first preference information indicating positive factors of preference of the user and second preference information indicating negative factors of the preference of the user on a basis of the operation history obtained by the operation history obtaining means; and recommendation information generating means for generating recommendation information indicating the content recommended for viewing to the user by calculating a degree of similarity between the first preference information and the attribute information and a degree of similarity between the second preference information and the attribute information independently of each other.

The first preference information and the second preference information generated by the preference information generating means and the attribute information obtained by the attribute information obtaining means can each include a plurality of items; the preference information generating means can direct attention to one of the items of the operation history obtained by the operation history obtaining means, and generate the first preference information and the second preference information by elements of the item to which the preference information generating means directs attention; and the recommendation information generating means can extract the first preference information and the second preference information corresponding to the elements of the attribute information, and calculate a degree of similarity between the first preference information and the attribute information and a degree of similarity between the second preference information and the attribute information.

The recommendation information generating means can generate recommendation information indicating a content having a low degree of similarity to each of the first preference information and the second preference information on a basis of independent results of the calculation of the degree of similarity between the first preference information and the attribute information and the degree of similarity between the second preference information and the attribute information.

The first preference information and the second preference information generated by the preference information generating means and the attribute information obtained by the attribute information obtaining means can be vectorized by predetermined items.

The information processing apparatus can further include normalization processing means for normalizing at least a part of the attribute information of the content and the first preference information and the second preference information by items; and the recommendation information generating means can generate the recommendation information by calculating, independently of each other, a degree of similarity between the first preference information and the attribute information of the content and a degree of similarity between the second preference information and the attribute information of the content, at least the part of the attribute information of the content and the first preference information and the second preference information being normalized by the normalization processing means.

The recommendation information generating means can generate the recommendation information on a basis of a calculation of an inner product of the first preference information generated by the preference information generating means and the attribute information obtained by the attribute information obtaining means and an inner product of the second preference information generated by the preference information generating means and the attribute information obtained by the attribute information obtaining means.

The predetermined items can include major items and minor items obtained by further dividing the major items into details; and the recommendation information generating means can calculate, by the major items, an inner product of the first preference information generated by the preference information generating means and the attribute information obtained by the attribute information obtaining means and an inner product of the second preference information generated by the preference information generating means and the attribute information obtained by the attribute information obtaining means, and generate the recommendation information on a basis of a sum of results of the calculation of the inner products.

The operation history obtaining means can divide the obtained operation history into a first operation history indicating contents that the user likes and a second operation history indicating contents that the user does not like; and the preference information generating means can generate the first preference information on a basis of the first operation history and generate the second preference information on a basis of the second operation history.

The recommendation information generating means can generate the recommendation information on a basis of a value obtained by subtracting the degree of similarity between the second preference information generated by the preference information generating means and the attribute information obtained by the attribute information obtaining means from the degree of similarity between the first preference information generated by the preference information generating means and the attribute information obtained by the attribute information obtaining means.

The information processing apparatus can further include display means for displaying the recommendation information generated by the recommendation information generating means.

The information processing apparatus can further include: receiving means for receiving the content; and selection controlling means for controlling selection of the content received by the receiving means on a basis of the recommendation information generated by the recommendation information generating means.

The information processing apparatus can further include recording means for recording the received content selected by the selection controlling means.

According to the present invention, there is provided an information processing method including the steps of: obtaining an operation history of a user; generating first preference information indicating positive factors of preference of the user and second preference information indicating negative factors of the preference of the user on a basis of the operation history obtained by a process of the operation history obtaining step; and generating recommendation information indicating a content suiting the preference of the user by calculating a degree of similarity between the first preference information and attribute information and a degree of similarity between the second preference information and the attribute information independently of each other.

According to the present invention, there is provided a program recorded on a recording medium, including the steps of: obtaining an operation history of a user; generating first preference information indicating positive factors of preference of the user and second preference information indicating negative factors of the preference of the user on a basis of the operation history obtained by a process of the operation history obtaining step; and generating recommendation information indicating a content suiting the preference of the user by calculating a degree of similarity between the first preference information and attribute information and a degree of similarity between the second preference information and the attribute information independently of each other.

According to the present invention, there is provided a program including the steps of: obtaining an operation history of a user; generating first preference information indicating positive factors of preference of the user and second preference information indicating negative factors of the preference of the user on a basis of the operation history obtained by a process of the operation history obtaining step; and generating recommendation information indicating a content suiting the preference of the user by calculating a degree of similarity between the first preference information and attribute information and a degree of similarity between the second preference information and the attribute information independently of each other.

The information processing apparatus and the information processing method, and the program according to the present invention generate first preference information indicating positive factors of preference of a user and second preference information indicating negative factors of the preference of the user on a basis of an operation history of the user, and generate recommendation information indicating a content suiting the preference of the user by calculating a degree of similarity between the first preference information and attribute information and a degree of similarity between the second preference information and the attribute information independently of each other.

BRIEF DESCRIPTION OF THE DRAWINGS

FIG. 4 is a diagram of assistance in explaining EPG data;

FIG. 5 is a diagram of assistance in explaining a program vector;

FIG. 6 is a flowchart of assistance in explaining a second program vector generating process;

FIG. 7 is a flowchart of assistance in explaining a first grouping process;

FIG. 8 is a flowchart of assistance in explaining a second grouping process;

FIG. 15 is a diagram of assistance in explaining a positive history vector;

BEST MODE FOR CARRYING OUT THE INVENTION

Figure 1:
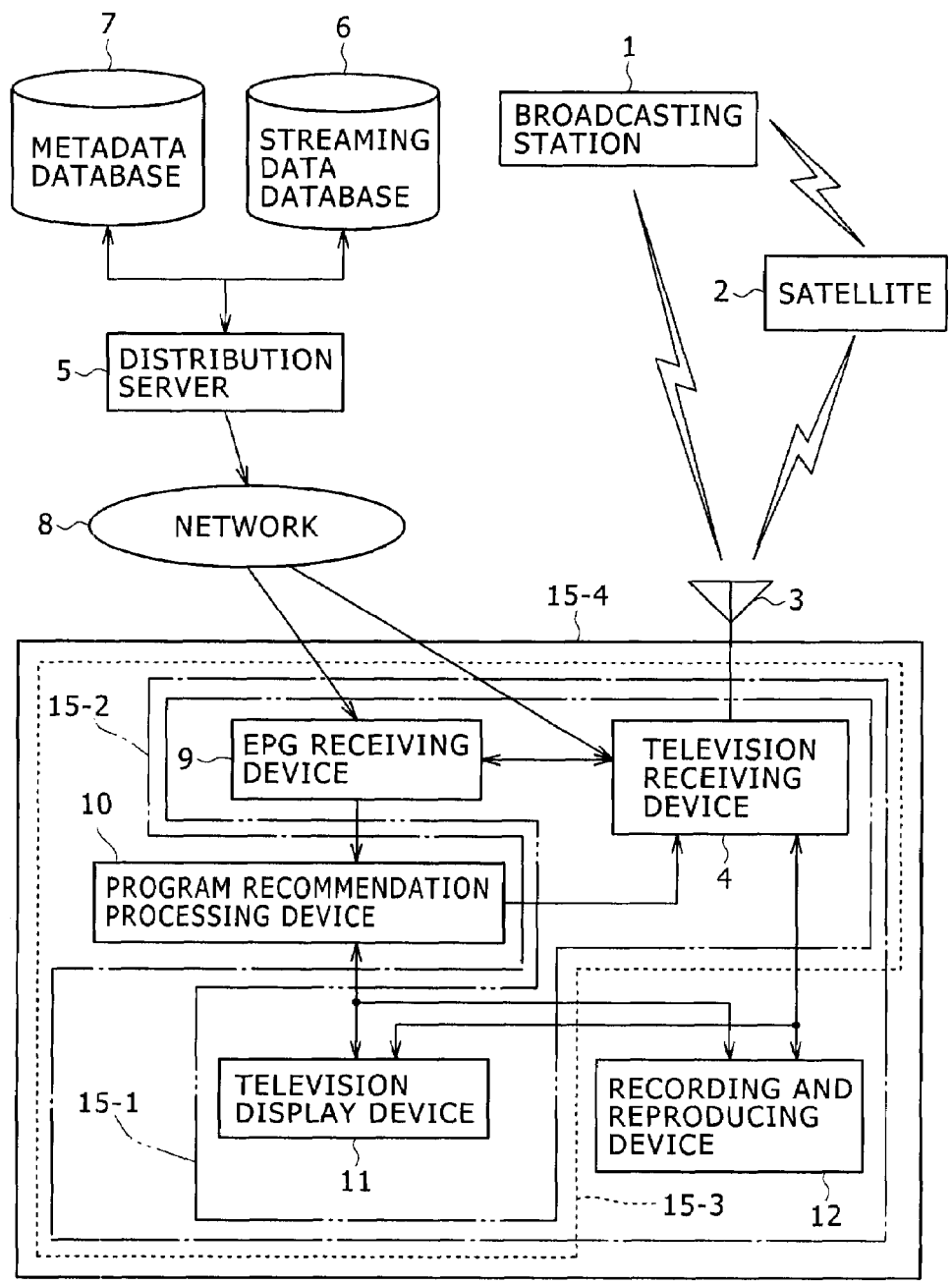
FIG. 1 is a diagram of assistance in explaining television program broadcasting and stream data distribution.

An embodiment of the present invention will hereinafter be described with reference to the drawings.

Television program broadcast and stream data distribution will be described with reference to FIG. 1.

A broadcasting station 1 transmits a terrestrial wave program broadcast or transmits a satellite wave program broadcast via a satellite 2. While only one broadcasting station 1 is shown in FIG. 1 and described, it is needless to say that there are a plurality of broadcasting stations 1. An antenna 3 of a television receiving device 4 receives the terrestrial wave or satellite wave program broadcast. The broadcast signal includes an EPG (Electronic Program Guide), as required.

A distribution server 5 reads streaming data from a streaming data database 6, and then transmits the streaming data to the television receiving device 4 via a network 8 including the Internet and other networks. Also, the distribution server 5 reads an EPG as information on a program broadcast from the broadcasting station 1 or metadata including more detailed information than the EPG from a metadata database 7, generates a program vector PP for each program, and then transmits the program vector PP together with the EPG data to an EPG receiving device 9 via the network 8.

When an EPG superimposed on an ordinary broadcast signal has a sufficient amount of information for a process to be described below, information identical with the EPG superimposed on the ordinary broadcast signal may be used for the process. When an amount of information of an EPG superimposed on an ordinary broadcast signal cannot be said to be sufficient for a process to be described below, metadata may be used for the process singly or in addition to the EPG superimposed on the ordinary broadcast signal. Suppose hereinafter that the EPG superimposed on the ordinary broadcast signal does not have a sufficient amount of information, and that information including the metadata is used in the present embodiment. This information will be referred to collectively as EPG data.

The EPG receiving device 9 supplies the transmitted EPG data to the television receiving device 4. The EPG receiving device 9 also supplies the program vector PP transmitted together with the EPG data to a program recommendation processing device 10.

The television receiving device 4 having a tuner selects and receives a terrestrial wave or satellite wave program broadcast via the antenna 3 on the basis of a control signal indicating a channel selection which signal is supplied from a television display device 11 having an operating part or a recording and reproducing device 12. The television receiving device 4 also receives streaming data transmitted from the distribution server 5 via the network 8. In addition, the television receiving device 4 receives EPG data from the EPG receiving device 9, and supplies the EPG data to the television display device 11 or the recording and reproducing device 12. Incidentally, when a broadcast wave received by the television receiving device 4 includes an EPG, the television receiving device 4 separates the EPG from the program signal, and supplies the EPG and the program signal to the television display device 11 or the recording and reproducing device 12.

The program recommendation processing device 10 obtains a program vector PP from the EPG receiving device 9, and obtains an operation log from the television display device 11 and the recording and reproducing device 12. The program recommendation processing device 10 generates recommendation information recommending a program suiting a preference of a user on the basis of these pieces of information or operation input by the user, and then supplies the recommendation information to the television display device 11 and the recording and reproducing device 12.

The television display device 11 displays a broadcast signal supplied from the television receiving device 4 or a reproduced signal supplied from the recording and reproducing device 12 on the basis of operation input by the user, and automatically sets a channel or displays recommended program information on the basis of the recommendation information supplied from the program recommendation processing device 10. The television display device 11 supplies an operation log as a history of operation by the user to the program recommendation processing device 10.

The recording and reproducing device 12 records a broadcast signal supplied from the television receiving device 4 onto a recording medium loaded in the recording and reproducing device 12 or a built-in recording medium (for example, a hard disk) on the basis of operation input by the user, and automatically records a broadcast signal supplied from the television receiving device 4 onto the loaded recording medium or the built-in recording medium on the basis of the recommendation information supplied from the program recommendation processing device 10. Also, the recording and reproducing device 12 reproduces a program recorded on the loaded recording medium or the built-in recording medium, and then outputs the program to the television display device 11 for display. Further, the recording and reproducing device 12 supplies an operation log as a history of operation by the user to the program recommendation processing device 10.

While the EPG receiving device 9, the television receiving device 4, the program recommendation processing device 10, the television display device 11, and the recording and reproducing device 12 are described as respective different devices in this case, these devices do not need to be formed separately from each other. It is needless to say that for example the EPG receiving device 9, the television receiving device 4, and the television display device 11 may be formed integrally with each other as a television receiver 15-1 including a tuner function. Further, the recording and reproducing device 12 may be formed integrally with the EPG receiving device 9, the television receiving device 4, and the television display device 11 to form a television receiver 15-2 having a recording function. It is needless to say that this recording and reproducing device 12 may be a so-called hard disk recorder having a high-capacity hard disk as a recording medium. In addition, the program recommendation processing device 10 may be included in the television receiver 15-1 including the tuner function to form a television receiver 15-3, or the program recommendation processing device 10 may be included in the television receiver 15-2 having the recording function to form a television receiver 15-4.

Figure 2:
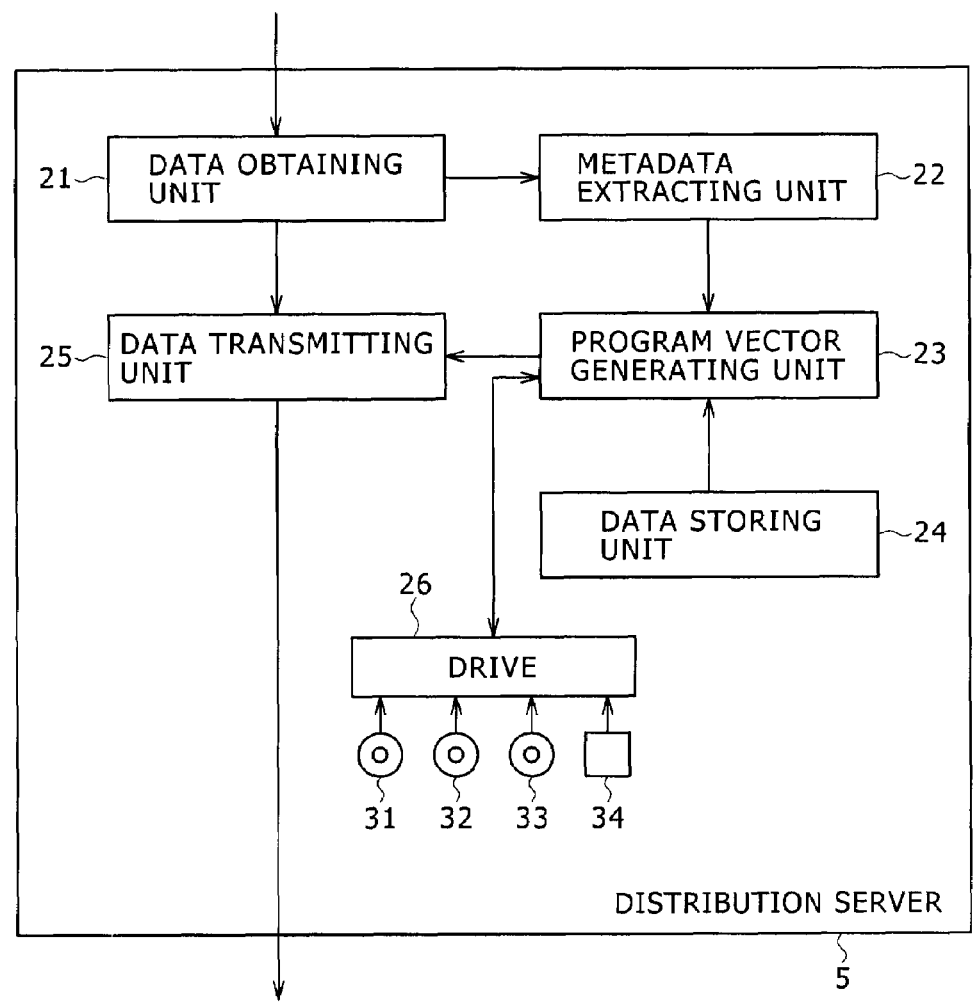
FIG. 2 is a block diagram showing a configuration of a distribution server in FIG. 1.

FIG. 2 is a block diagram showing a configuration of the distribution server 5.

A data obtaining unit 21 obtains data from the metadata database 7 and the streaming data database 6, and then supplies the data to a data transmitting unit 25. The data obtaining unit 21 also supplies EPG data to a metadata extracting unit 22. In addition, the data obtaining unit 21 groups the EPG data registered in the metadata database 7 according to contents of the EPG data.

The metadata extracting unit 22 extracts data necessary to generate a program vector PP from the EPG data supplied from the data obtaining unit 21, and then supplies the data to a program vector generating unit 23. The program vector generating unit 23 generates the program vector PP on the basis of the metadata, associates the program vector PP with a program side effect vector EfPP stored in a data storing unit 24 as required, and then supplies the program vector PP to the data transmitting unit 25.

The data storing unit 24 stores the program side effect vector EfPP, which is information necessary in generating the program vector PP, as required.

On the basis of a viewpoint on a production side and a broadcasting side of how to raise an audience rating, for example, an educational program has a characteristic in that elements of genre and contents are strong, a variety program or the like has a characteristic in that an element of starring is strong, and a drama or the like has a characteristic in that elements of starring and scriptwriter are strong. These characteristics need to be used in order to extract characteristics of a program correctly. That is, which of elements constituting the program vector PP is important in a matching process performed to recommend a program that suits a preference of the user differs according to the genre of the program.

Specifically, when the genre of the program is "culture and documents", an important item is contents and a title of the program rather than starring. On the other hand, when the genre of the program is "variety", an important item is starring, and when the genre of the program is "drama", an important item is starring and a scriptwriter. When these are used to generate a program vector PP, a program side effect vector defining a degree of contribution of each item in a matching process by the genre of the program is set and stored in the data storing unit 24.

The data transmitting unit 25 transmits EPG data and streaming data supplied from the data obtaining unit 21 as well as a program vector PP and a program side effect vector EfPP supplied from the program vector generating unit 23 to the EPG receiving device 9 or the television receiving device 4 via the network 8.

The program vector generating unit 23 is connected with a drive 26 as required. A magnetic disk 31, an optical disk 32, a magneto-optical disk 33, and a semiconductor memory 34 are loaded into the drive 26 as required to send and receive data to and from the drive 26.

A first program vector generating process performed by the distribution server 5 will next be described with reference to a flowchart of FIG. 3.

In step S1, the data obtaining unit 21 receives EPG data comprising metadata supplied from the metadata database 7.

In step S2, the metadata extracting unit 22 receives the EPG data supplied from the data obtaining unit 21, extracts the metadata necessary to generate a program vector PP, and then outputs the metadata to the program vector generating unit 23.

FIG. 4 shows an example of the metadata. The metadata includes for example "Movie-Japanese movie" as a genre, "Tokaido Mitsuya Kaidan" as a title of a movie, a date of broadcast and data on a distributor, a date and time of broadcast, a name of a broadcasting station that broadcasts the movie, and a broadcast time. The metadata further includes for example data on a name of a director, names of screenwriter, a cinematographer (cameraman), a person in charge of music, and a starring, and comments on the movie as contents of the program.

In step S3, the program vector generating unit 23 morphologically analyzes the title, the contents and the like included in the metadata as required to thereby resolve the title, the contents and the like into words. Specifically, the program vector generating unit 23 resolves the title of the movie which title is included in the metadata into three words "Tokaido", "Mitsuya", and "Kaidan". When information "'59 Shin Saiho The masterpiece of Japanese horror movies that depicts the world of well-known "Mitsuya Kaidan" with full stylistic beauty" is included as comments on the movie in the metadata as shown in FIG. 4, the program vector generating unit 23 extracts the words included in the comments, and sets, as content information, "Saiho", "stylistic", "beauty", "full", "well-known", "Mitsuya", "Kaidan", "world", "depicts", "Japanese movie", "horror", and "masterpiece".

In step S4, the program vector generating unit 23 vectorizes each item included in the metadata to generate a program vector PP. Then the process is ended. The generated program vector PP is output to the data transmitting unit 25, and then transmitted to the EPG receiving device 9 via the network 8. In vectorizing each item, all detail elements may be arranged in one row, or may be separated into major items and vectorized by the major items.

When vectorization by major item is performed, a program vector PP=(Tm, Gm, Hm Sm, Pm, Am, Km) is generated with title, genre, time slot, broadcasting station, starring, scriptwriter/author/producer, and contents set as seven major items as shown in FIG. 5, for example. Then, contents of the items are vectorized as Title (Title) Tm={title 1, title 2, ... }, Genre (Genre) Gm={drama, variety, sports, movie, music, child-oriented/education, culture/document, news/report, other}, Time Slot (Hour) Hm={morning, noon, evening, prime time, midnight}, Broadcasting Station (TV Station) Sm={NNK Sogo, NNK Kyouiku, Asia Television, TTS, Buji, Telenichi, Toto, NNK Eisei Daiichi, NNK Eisei Daini, WOWO}, Starring (Person) Pm={person A, person B, ... }, Scriptwriter/author/producer and the like (Author) Am={person a, person b, ... }, and Contents (Keyword) Km={kw1, kw2, ... }.

Of the seven major items described above, a type can be set in the major items "Genre", "Broadcasting Station", and "Time Slot", and therefore respective detail elements can each be represented by a numerical vector. In the case of Broadcasting Station Sm={NNK Sogo, NNK Kyouiku, Asia Television, TTS, Buji, Telenichi, Toto, NNK Eisei Daiichi, NNK Eisei Daini, WOWO}, for example, when a broadcasting station of the corresponding program is WOWO, a broadcasting station vector can be represented by Broadcasting Station Sm={0, 0, 0, 0, 0, 0, 0, 0, 0, 1}. In the case of Genre Gm={drama, variety, sports, movie, music, child-oriented/education, culture/document, news/report, other}, for example, when a genre of the corresponding program is culture/document, a genre vector can be represented by Genre Gm={0, 0, 0, 0, 0, 0, 1, 0, 0}.

On the other hand, for items that cannot be represented by a numerical vector, such as the major items "Title", "Starring", "Scriptwriter/author/producer", and "Contents", an item value (word) and a weight (numerical value) are associated with each other on the basis of frequency of the word included in the vector, for example. For example, the major item "Title" is represented by elements each comprising a word and a numerical value as in Title Tm={Tokaido-1, Mitsuya-1, Kaidan-1}. For example, "Tokaido-1" in this example denotes that frequency of the word "Tokaido" is 1.

The program vector PP is generated by such a process, and then transmitted to the EPG receiving device 9. Specifically, when the program vector PP is generated from the program metadata described with reference to FIG. 4, the program vector PP={Title Tm={Tokaido-1, Mitsuya-1, Kaidan-1}, Genre Gm={0, 0, 0, 1, 0, 0, 0, 0, 0}, Time Slot Hm={0, 0, 0, 0, 1}, Broadcasting Station Sm={0, 0, 0, 0, 0, 0, 0, 0, 1}, Starring Pm={Katsumi Wakasugi-1, Shigeru Amami-1, Toshihiko Emi-1, Ryujiro Nakamura-1, Noriko Nishizawa-1}, Scriptwriter/Author/Producer Am={Nobuo Nakagawa-1, Shoichi Ohnuki-1, Yoshihiro Ishida-1, Shoji Nishimoto-1, Chuta Watanabe-1}, Contents Km={Saiho-1, stylistic-1, beauty-1, full-1, well-known-1, Mitsuya-1, Kaidan-1, world-1, depicts-1, Japanese movie-1, horror-1, masterpiece-1}}. This program vector PP is transmitted to the EPG receiving device 9.

The program vector PP may be generated with a leading actor in the elements of Starring Pm weighted and a director in the elements of Scriptwriter/author/producer Am weighted, for example. In such a case, elements of the program vector PP are for example Starring Pm={Katsumi Wakasugi-3, Shigeru Amami-2, Toshihiko Emi-1, Ryujiro Nakamura-1, Noriko Nishizawa-1}, and Scriptwriter/author/producer Am={Nobuo Nakagawa-3, Shoichi Ohnuki-1, Yoshihiro Ishida-1, Shoji Nishimoto-1, Chuta Watanabe-1}.

Important elements in generating the program vector PP differ depending on the genre of the program, as described above. When a program side effect vector EfPP indicating important elements by genre is stored as program side effect vector information in the data storing unit 24, the program side effect vector EfPP may be transmitted in association with the program vector PP. The program side effect vector EfPP is set so as to correspond to the major items of the program vector PP.

When the genre of the program is "culture/document" in the program vector PP={Title Tm, Genre Gm, Time Slot Hm, Broadcasting Station Sm, Starring Pm, Scriptwriter/author/producer Am, Contents Km}, important items are the contents and the tile of the program (in the case of a weighting value of 3), and hence the program side effect vector EfPP={3, 1, 1, 1, 1, 1, 3}. On the other hand, when the genre of the program is "variety", an important item is starring (in the case of a weighting value of 5), and hence the program side effect vector EfPP={1, 1, 1, 1, 5, 1, 1}. When the genre of the program is "drama", important items are starring (in the case of a weighting value of 2) and screenwriter, and hence when screenwriter are particularly important (in the case of a weighting value of 3), the program side effect vector EfPP={1, 1, 1, 1, 2, 3, 1}.

A second program vector generating process when a program side effect vector EfPP is transmitted in association with a program vector PP will next be described with reference to a flowchart of FIG. 6.

Figure 3:
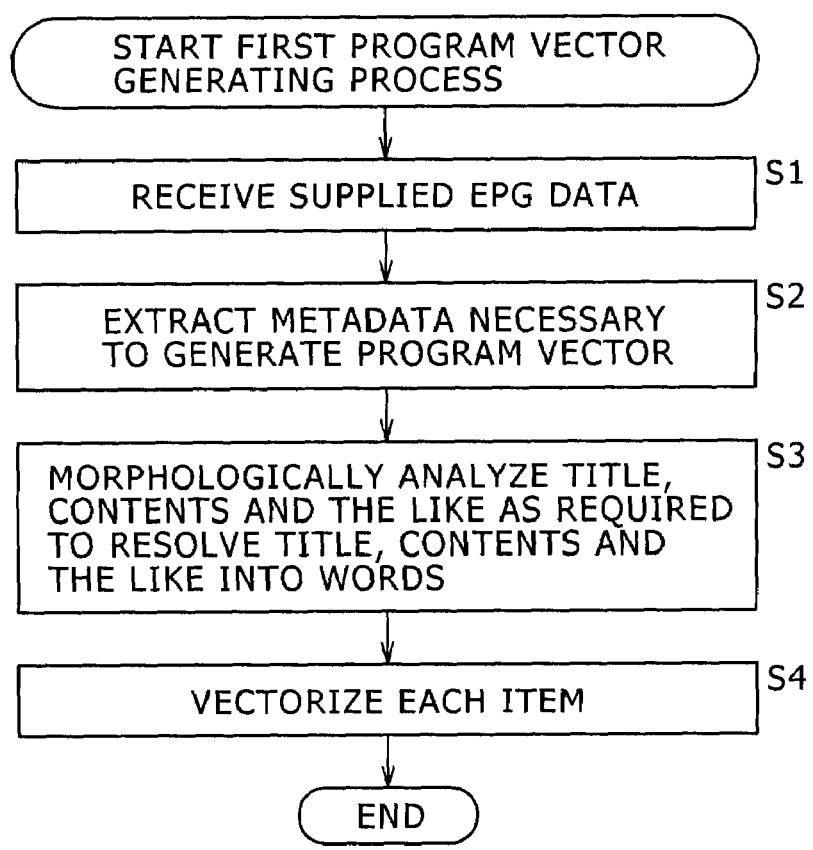
FIG. 3 is a flowchart of assistance in explaining a first program vector generating process.

The same process as the process of steps S1 to S4 described with reference to FIG. 3 is performed in steps S11 to S14. Specifically, EPG data supplied from the metadata database 7 is received, metadata necessary to generate a program vector PP is extracted from the EPG data, and a title, contents and the like included in the metadata are morphologically analyzed as required to be resolved into words. Then, each item included in the metadata is vectorized to generate the program vector PP.

In step S15, on the basis of a genre of a program of the supplied metadata, the program vector generating unit 23 extracts a corresponding effect vector from effect vector information stored in the data storing unit 24. When the genre of the program is "variety", for example, the program vector generating unit 23 extracts an effect vector EfPP={1, 1, 1, 1, 5, 1, 1} which vector weights starring from the data storing unit 24.

In step S16, the program vector generating unit 33 associates the effect vector EfPP extracted in step S15 with the program vector PP generated in step S14. Then the process is ended.

As a result of such a process, the program vector PP is generated, and the program side effect vector EfPP for weighting important items on the basis of the genre of the program is associated with the program vector PP and transmitted to the EPG receiving device 9 via the network 8.

While the program vector PP is generated as described above, the program vector PP can be created correctly with a small amount of operation by grouping programs by attributes thereof, for example.

Programs can be grouped into for example a serial drama, a group of programs in the same genre in a unit of one week, a group of programs by starring in a programming unit (13 weeks). As a concrete example of the grouping, a first grouping process when a serial drama is grouped will be described with reference to a flowchart of FIG. 7.

In step S31, the data obtaining unit 21 extracts programs matching predetermined conditions (conditions for grouping) such for example as the same title, the same broadcasting station, and the same broadcast time on weekdays or the same broadcast time on the same day of the week from EPG data registered in the metadata database 7.

In step S32, the data obtaining unit 21 groups the extracted programs, and adds a group ID to the EPG data of the corresponding programs.

In step S33, the metadata extracting unit 22 extracts metadata necessary to generate a program vector of a first broadcast of the programs having the same group ID, that is, recognized as a serial drama.

In step S34, the program vector generating process described with reference to FIG. 3 or FIG. 6 is performed.

In step S35, the program vector generating unit 33 fixes and sets the program vector PP of the corresponding group ID to the program vector of the first broadcast. Then the process is ended.

As a result of such a process, the serial drama is grouped, and the program vector is unified. The group ID and the program vector PP may be stored in the data storing unit 24 in association with each other.

While contents for a first installment in EPG data of a serial drama, in particular, are a description of the program as a whole, contents for an installment other than the first installment are often a description of the installment, and do not represent the contents for the program as a whole. In addition, metadata of parts other than the contents are substantially the same in every installment. Hence, by generating the program vector PP using the EPG data of the first installment, it is possible not only to reduce the number of program vector generating processes but also to generate the program vector PP matching characteristics of the program more accurately.

While the process of adding the same ID to the EPG data of the serial drama is described in FIG. 7, when information distinguishing the serial drama is included in advance in the EPG data, the process of step S31 may be omitted to add the same ID to the EPG of the serial drama referring to the information distinguishing the serial drama included in the EPG data.

A second grouping process by which grouping is possible on the basis of elements other than the serial drama will next be described with reference to a flowchart of FIG. 8. Description in the following will be made supposing that grouping is performed on the basis of genre and starring.

In step S51, the data obtaining unit 21 refers to EPG data registered in the metadata database 7, and adds a cluster code corresponding to metadata contents to the EPG data of a program.

For example, programs matching predetermined conditions of a serial drama, such for example as the same title, the same broadcasting station, and the same broadcast time on weekdays or the same broadcast time on the same day of the week are extracted. In the extracted group of programs recognized as a serial drama, a first cluster code of a least significant digit is determined; for example, according to the broadcast time of the serial drama, code 1 for the same time on weekdays, code 2 for the same time on the same day of the week, or code 3 for broadcast times of other than code 1 and code 2, such as broadcast times on alternate days or in alternate weeks or the like. When the group of programs is not a serial drama, the first cluster code of the least significant digit is 0.

Next, referring to data on a genre in the metadata registered in the metadata database 7, a second cluster code having a numerical value as a second least significant digit (second place), such for example as code 20 or code 30, is determined by the genre.

Finally, referring to data on starring in the metadata registered in the metadata database 7, a third cluster code represented by using digits above the second least significant digit (third place and above), such for example as code 2300 or code 800, is determined.

A total value of the first to third cluster codes is the cluster code added to the EPG of the program.

In step S52, the data obtaining unit 21 determines whether or not the corresponding EPG is an EPG of a serial drama on the basis of whether the first digit of the cluster code is zero.

When the data obtaining unit 21 determines in step S52 that the corresponding EPG is an EPG of a serial drama, the same process as that of step S33 and step S34 in FIG. 7 is performed in step S53 and step S54. That is, an EPG of a first broadcast is extracted, and the program vector generating process described with reference to FIG. 3 or FIG. 6 is performed.

In step S55, the program vector generating unit 23 fixes and sets the program vector PP of the serial drama to the program vector PP of the first broadcast, and sets the generated cluster code to the program vector PP in association with each other. Then the process is ended.

When the data obtaining unit 21 determines in step S52 that the corresponding EPG is not an EPG of a serial drama, the program vector generating process described with reference to FIG. 3 or FIG. 6 is performed in step S56.

In step S57, the program vector generating unit 23 associates the generated cluster code with the program vector PP. Then the process is ended.

Such a process enables the grouping of the program vector PP on the basis of genre and starring even in the case of other than a serial drama, and the associating of the cluster code indicating the group with the program vector PP.

Since the distribution server 5 described with reference to FIG. 2 generates the program vector PP as described with reference to FIGS. 3 to 8, the program vector PP corresponding to a new term or genre or the like can be generated at all times. The generated program vector PP is received together with the EPG data by the EPG receiving device 9 via the network 8, and then supplied to the program recommendation processing device 10.

The grouping process may be performed by morphologically analyzing a title to resolve the title into words, and attaching a group ID to each word.

A first title grouping process will next be described with reference to a flowchart of FIG. 9.

In step S61, the data obtaining unit 21 refers to EPG data registered in the metadata database 7, extracts a title from registered metadata, and then supplies the title to the program vector generating unit 23.

In step S62, the program vector generating unit 23 morphologically analyzes the title to resolve the title into words. Specifically, when the title of a movie included in the metadata is "Tokaido Mitsuya Kaidan", the title is morphologically analyzed, so that three words "Tokaido", "Mitsuya", and "Kaidan" are obtained.

In step S63, the program vector generating unit 23 extracts one of the analyzed words or word groups comprising a plurality of words, and extracts a group ID corresponding to the extracted word or word group from the data storing unit 24.

The word groups comprising a plurality of words are generated by combination of the words obtained by the morphological analysis. When the words obtained by the morphological analysis are "Tokaido", "Mitsuya", and "Kaidan", for example, the word groups are "Tokaido Mitsuya", "Tokaido Kaidan", and "Mitsuya Kaidan".

In step S64, the program vector generating unit 23 determines whether or not the corresponding group ID is extracted from the data storing unit 24.

When the program vector generating unit 23 determines in step S64 that the corresponding group ID is not extracted, the extracted word or the extracted word group comprising a plurality of words is not yet provided with a group ID. Therefore, in step S65, the program vector generating unit 23 associates a new group ID with the extracted word or the extracted word group comprising the plurality of words. The program vector generating unit 23 also stores the word or the word group comprising the plurality of words and the group ID corresponding thereto in the data storing unit 24.

When the program vector generating unit 23 determines in step S64 that the corresponding group ID is extracted, or after the process of step S65 is completed, the program vector generating unit 23 in step S66 determines whether or not a group ID is extracted for all the words comprising the title or all the word groups comprising a plurality of words.

When the program vector generating unit 23 in step S66 determines that a group ID is not extracted for all the words comprising the title or all the word groups comprising a plurality of words, the process returns to step S63 to repeat the process from step S63 on down.

When the program vector generating unit 23 in step S66 determines that a group ID is extracted for all the words comprising the title or all the word groups comprising a plurality of words, the program vector generating unit 23 in step S67 associates the extracted group IDs with the program vector. Then the process is ended.

As a result of such a process, the group IDs corresponding to the words comprising the title or the word groups are associated with the program vector, and transmitted by the data transmitting unit 25 to the television receiving device 4 or the EPG receiving device 9 via the network 8.

Programs having similar titles may be included in the same group. For example, in order to be able to include a serial drama with a title "2-Nen A-Gumi Ginpachi Sensei" and a special program with a title "2-Nen A-Gumi Ginpachi Sensei Special" in the same group, word matching rates between program titles in a predetermined period of two weeks, one month, or half a year, for example, are calculated in all combinations on the basis of results of morphological analysis of words comprising the titles. When a word matching rate between the titles is a predetermined value or higher, the titles may be included in the same group.

A second title grouping process for performing grouping on the basis of a matching rate between words comprising titles will next be described with reference to a flowchart of FIG. 10.

Figure 9:
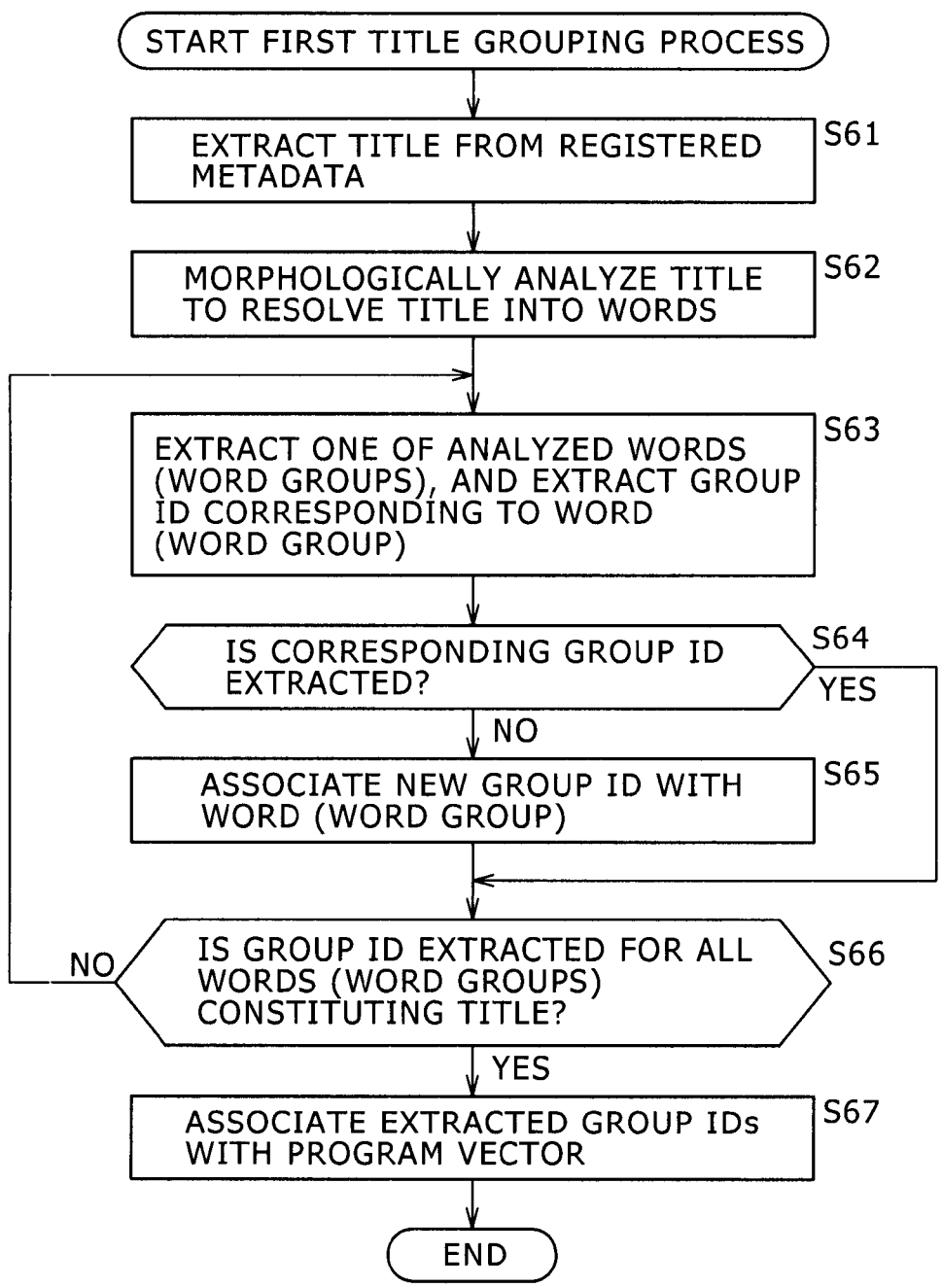
FIG. 9 is a flowchart of assistance in explaining a first title grouping process.

The same process as that of step S61 and step S62 described with reference to FIG. 9 is performed in step S401 and step S402. That is, the data obtaining unit 21 refers to EPG data registered in the metadata database 7, extracts titles from registered metadata, and then supplies the titles to the program vector generating unit 23. The program vector generating unit 23 morphologically analyzes the titles to resolve the titles into words.

In step S403, on the basis of analyzed words, the program vector generating unit 23 calculates a matching rate indicating a degree of word matching between titles, that is, a rate of matching between words.

Specifically, when the title "2-Nen A-Gumi Ginpachi Sensei" and the title "2-Nen A-Gumi Ginpachi Sensei Special" are morphologically analyzed into "2", "Nen", "A", "Gumi", "Ginpachi", and "Sensei", and "2", "Nen", "A", "Gumi", "Ginpachi", "Sensei", and "Special", respectively, a rate of matching between the words comprising the titles of the two programs is 6/7, or 85.7%.

In step S404, the program vector generating unit 23 determines whether or not the rate of matching between the words is for example a predetermined value of 70% or higher. It is needless to say that this threshold value for the matching rate may be any numerical value other than 70%.

When the program vector generating unit 23 determines in step S404 that the rate of matching between the words is for example a predetermined value of 70% or higher, the program vector generating unit 23 in step S405 associates these programs with the same group ID. The program vector generating unit 23 also stores matching words or word groups and the group ID corresponding thereto in the data storing unit 24.

When the program vector generating unit 23 determines in step S404 that the matching rate is lower than for example a predetermined value of 70%, or after the process of step S405 is completed, the program vector generating unit 23 in step S406 determines whether or not the processing in all combinations between the titles has been completed.

When the program vector generating unit 23 in step S406 determines that the processing in all combinations between the titles has not been completed, the process returns to step S403 to repeat the process from step S403 on down.

When the program vector generating unit 23 in step S406 determines that the processing in all combinations between the titles has been completed, the process is ended.

As a result of such a process, a group ID is associated with program vectors on the basis of a rate of matching between words comprising the titles, and transmitted by the data transmitting unit 25 to the television receiving device 4 or the EPG receiving device 9 via the network 8. Thus, programs with similar titles, such for example as a serial drama and its special program, can be processed as the same group.

Further, by determining a group on the basis of a rate of matching between words comprising titles, it is possible to detect programs with the same title as the same group even when there are variations in writing between half size and full size numbers, half size and full size English letters, or capital letters and small letters in EPGs or metadata, for example.

In addition to the word matching rate, a broadcasting station, a program genre, or a broadcast start time, for example, may be added to conditions for grouping. Since, for example titles of news programs comprise a small number of words including news, even news programs in different forms on different broadcasting stations may be detected as the same group by the process described with reference to FIG. 10. Therefore, in addition to the word matching rate, when the broadcasting stations match each other, the programs may be included in the same group.

A third title grouping process for performing grouping on the basis of a rate of matching between words comprising titles as well as matching between broadcasting stations as an additional condition will be described with reference to a flowchart of FIG. 11.

Figure 10:
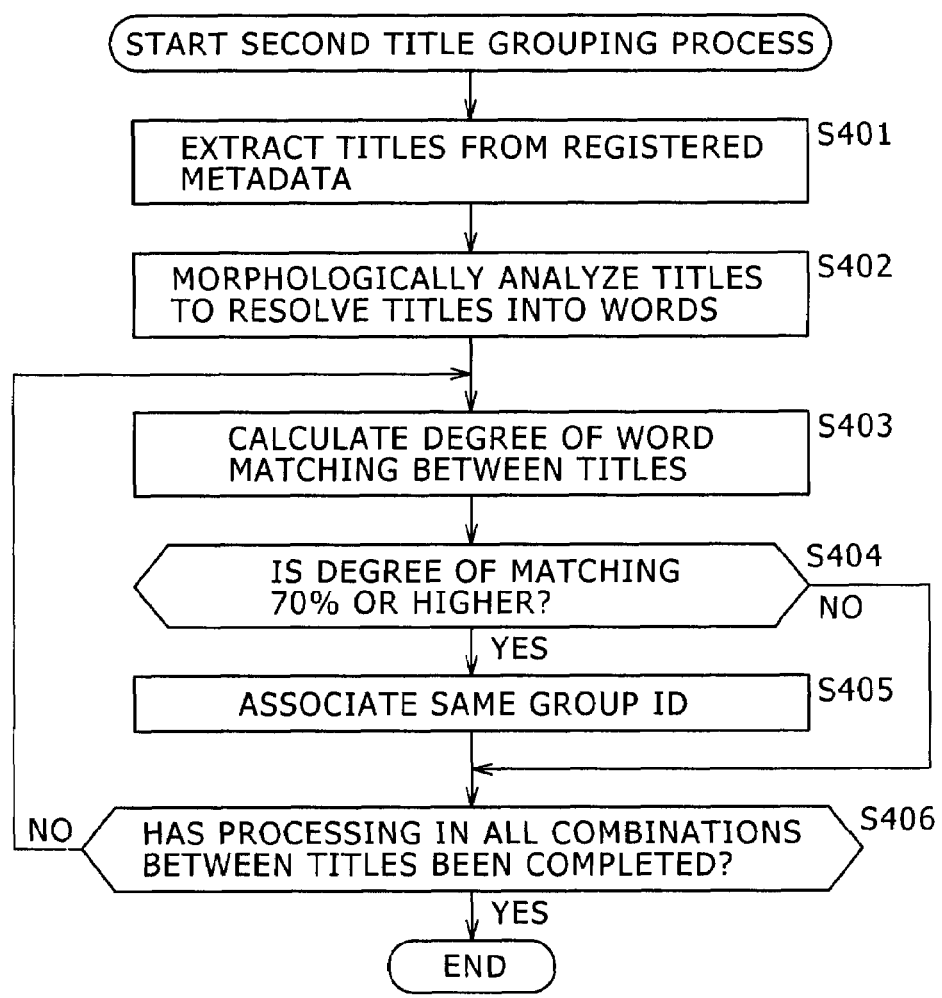
FIG. 10 is a flowchart of assistance in explaining a second title grouping process.

The same process as that of step S401 and step S404 described with reference to FIG. 10 is performed in step S421 and step S424. That is, the data obtaining unit 21 refers to EPG data registered in the metadata database 7, extracts titles from registered metadata, and then supplies the titles to the program vector generating unit 23. The program, vector generating unit 23 morphologically analyzes the titles to resolve the titles into words. On the basis of analyzed words, the program vector generating unit 23 calculates a degree of word matching between titles, and determines whether or not a rate of matching between words is for example a predetermined value of 70% or higher.

When the program vector generating unit 23 determines in step S424 that the rate of matching between the words is for example a predetermined value of 70% or higher, the program vector generating unit 23 in step S425 determines whether or not broadcasting stations of these programs match each other.

When the program vector generating unit 23 determines in step S425 that the broadcasting stations of these programs match each other, the program vector generating unit 23 in step S426 associates the same group ID with these programs. The program vector generating unit 23 also stores matching words or word groups and the broadcasting station and the group ID corresponding thereto in the data storing unit 24.

When the program vector generating unit 23 determines in step S424 that the matching rate is lower than for example a predetermined value of 70%, when the program vector generating unit 23 determines in step S425 that the broadcasting stations of these programs do not match each other, or after the process of step S426 is completed, the program vector generating unit 23 in step S427 determines whether or not the processing in all combinations between the titles has been completed.

When the program vector generating unit 23 in step S427 determines that the processing in all combinations between the titles has not been completed, the process returns to step S423 to repeat the process from step S423 on down.

When the program vector generating unit 23 in step S427 determines that the processing in all combinations between the titles has been completed, the process is ended.

As a result of such a process, a group ID is associated with program vectors on the basis of matching between broadcasting stations and a rate of matching between words comprising the titles, and transmitted by the data transmitting unit 25 to the television receiving device 4 or the EPG receiving device 9 via the network 8. Thus, when programs with similar titles are included in the same group, for example, it is possible to prevent inclusion of news programs on other broadcasting stations in the same group.

Figure 11:
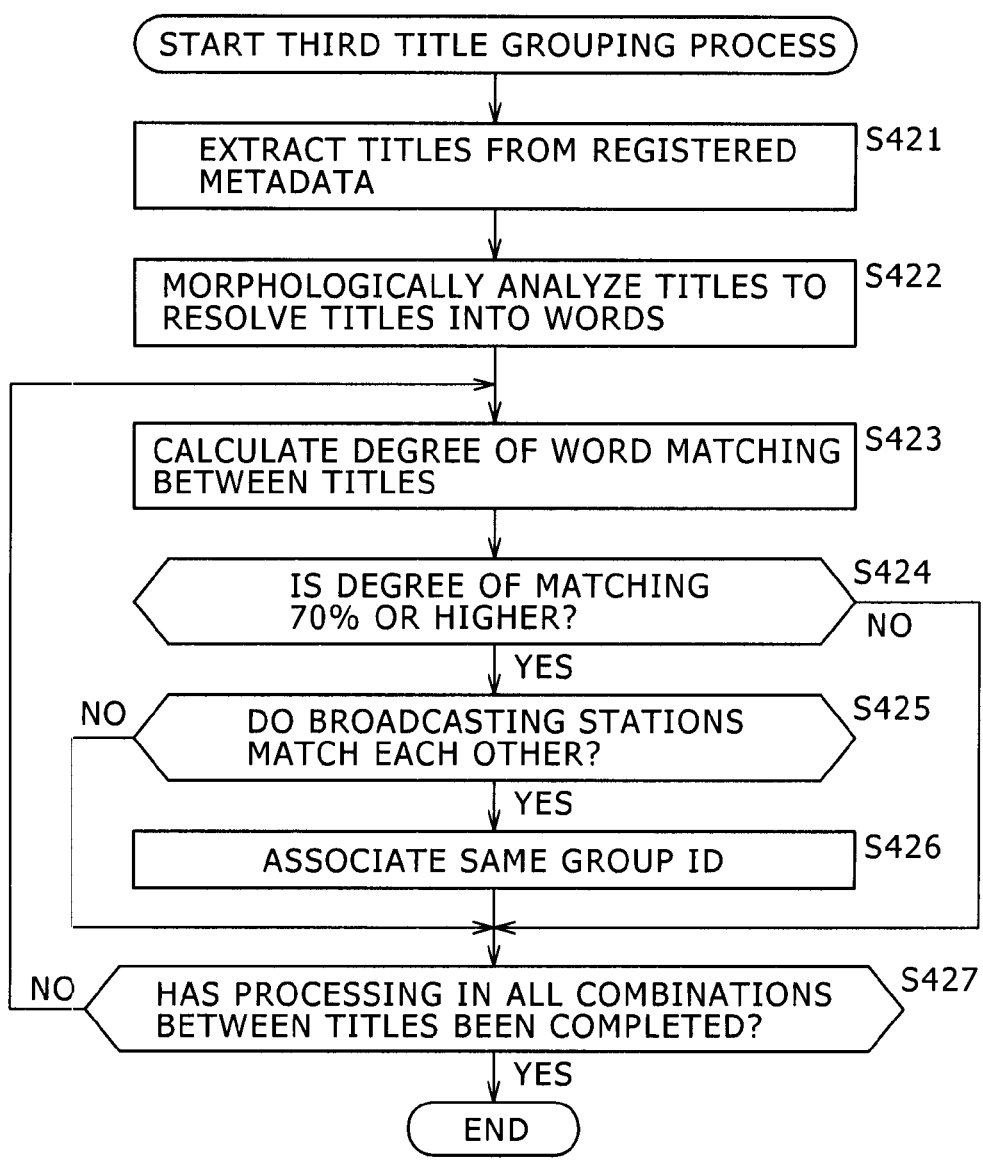
FIG. 11 is a flowchart of assistance in explaining a third title grouping process.

It is to be noted that while in the description with reference to FIG. 11, grouping is performed on the basis of the condition of whether or not the broadcasting stations are the same in addition to the rate of matching between the words comprising the titles, it is needless to say that grouping may be performed with a broadcast time slot or a genre, for example, other than the broadcasting station as another condition than the rate of matching between the words comprising the titles.

Further, in order that a serial drama or an across-the-board program, for example, can be detected as the same group even when a broadcast start time of the serial drama or the across-the-board program is shifted due to a sports relay broadcast, a special program or the like, grouping may be performed on the basis of whether or not broadcast times match each other with a difference within a predetermined time range of one hour, for example, as another condition than a rate of matching between words comprising titles.

Figure 12:
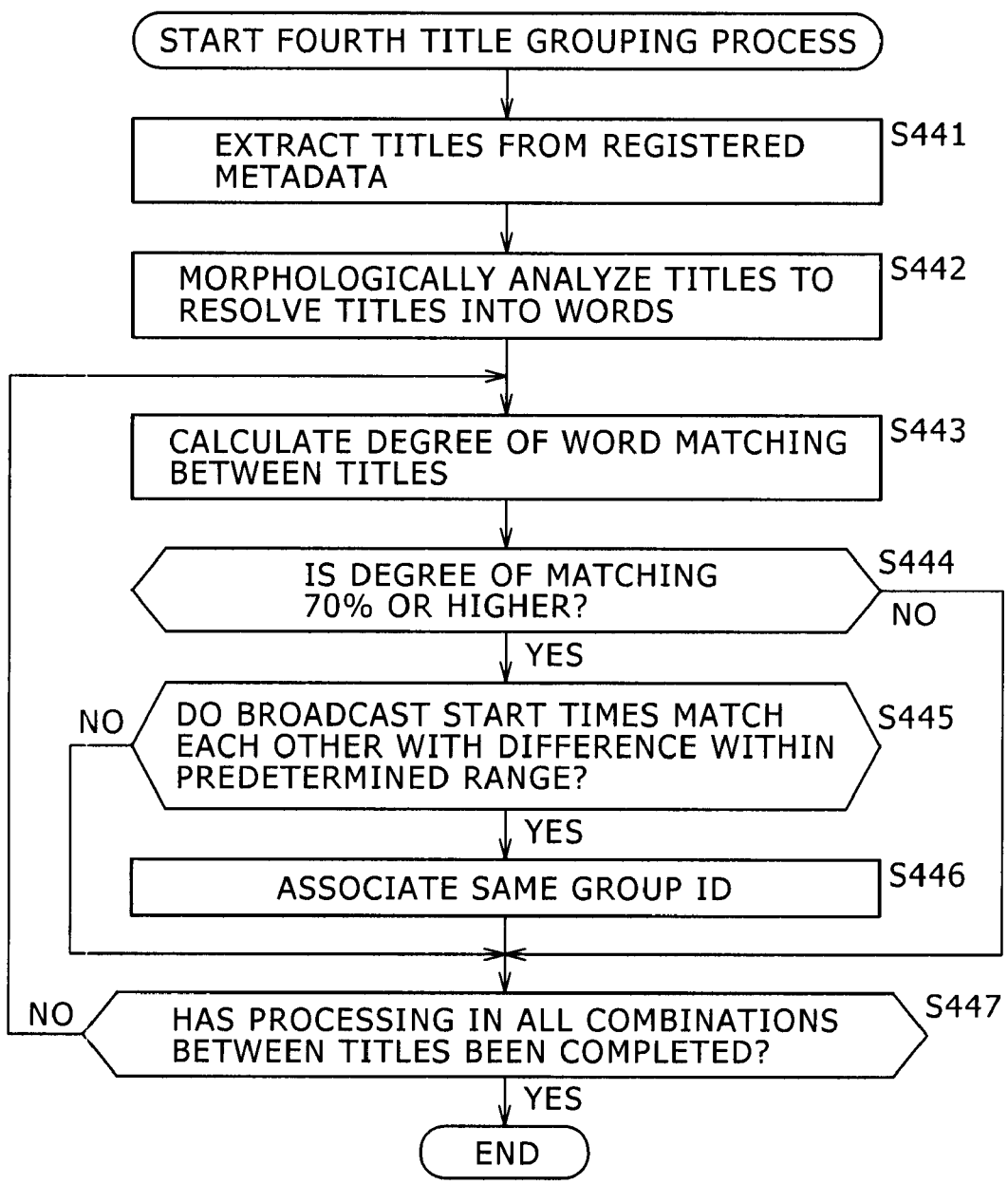
FIG. 12 is a flowchart of assistance in explaining a fourth title grouping process.

A fourth title grouping process for performing grouping on the basis of a rate of matching between words comprising titles as well as an additional condition of whether or not broadcast times match each other with a difference within a predetermined time range will be described with reference to a flowchart of FIG. 12.

The same process as that of step S401 and step S404 described with reference to FIG. 10 is performed in step S441 and step S444. That is, the data obtaining unit 21 refers to EPG data registered in the metadata database 7, extracts titles from registered metadata, and then supplies the titles to the program vector generating unit 23. The program vector generating unit 23 morphologically analyzes the titles to resolve the titles into words. On the basis of analyzed words, the program vector generating unit 23 calculates a degree of word matching between titles, and determines whether or not a rate of matching between words is for example a predetermined value of 70% or higher.

When the program vector generating unit 23 determines in step S444 that the rate of matching between the words is for example a predetermined value of 70% or higher, the program vector generating unit 23 in step S445 determines whether or not broadcast start times of these programs match each other with a difference within a predetermined range of one hour, for example.

When the program vector generating unit 23 determines in step S445 that the broadcast start times of these programs match each other with a difference within the predetermined range, the program vector generating unit 23 in step S446 associates the same group ID with these programs. The program vector generating unit 23 also stores matching words or word groups and the range of the broadcast start times and the group ID corresponding thereto in the data storing unit 24.

When the program vector generating unit 23 determines in step S444 that the matching rate is lower than for example a predetermined value of 70%, when the program vector generating unit 23 determines in step S445 that the broadcast start times of these programs differ from each other more than the predetermined range, or after the process of step S446 is completed, the program vector generating unit 23 in step S447 determines whether or not the processing in all combinations between the titles has been completed.

When the program vector generating unit 23 in step S447 determines that the processing in all combinations between the titles has not been completed, the process returns to step S443 to repeat the process from step S443 on down.

When the program vector generating unit 23 in step S447 determines that the processing in all combinations between the titles has been completed, the process is ended.

As a result of such a process, a group ID is associated with program vectors on the basis of matching including a difference within a predetermined range between broadcast start times and a rate of matching between words comprising the titles, and transmitted by the data transmitting unit 25 to the television receiving device 4 or the EPG receiving device 9 via the network 8. Thus, when programs with similar titles are included in the same group, for example, it is possible to prevent programs to be detected as the same group from not being detected as the same group because of a change in broadcast time due to a special program or the like.

Figure 13:
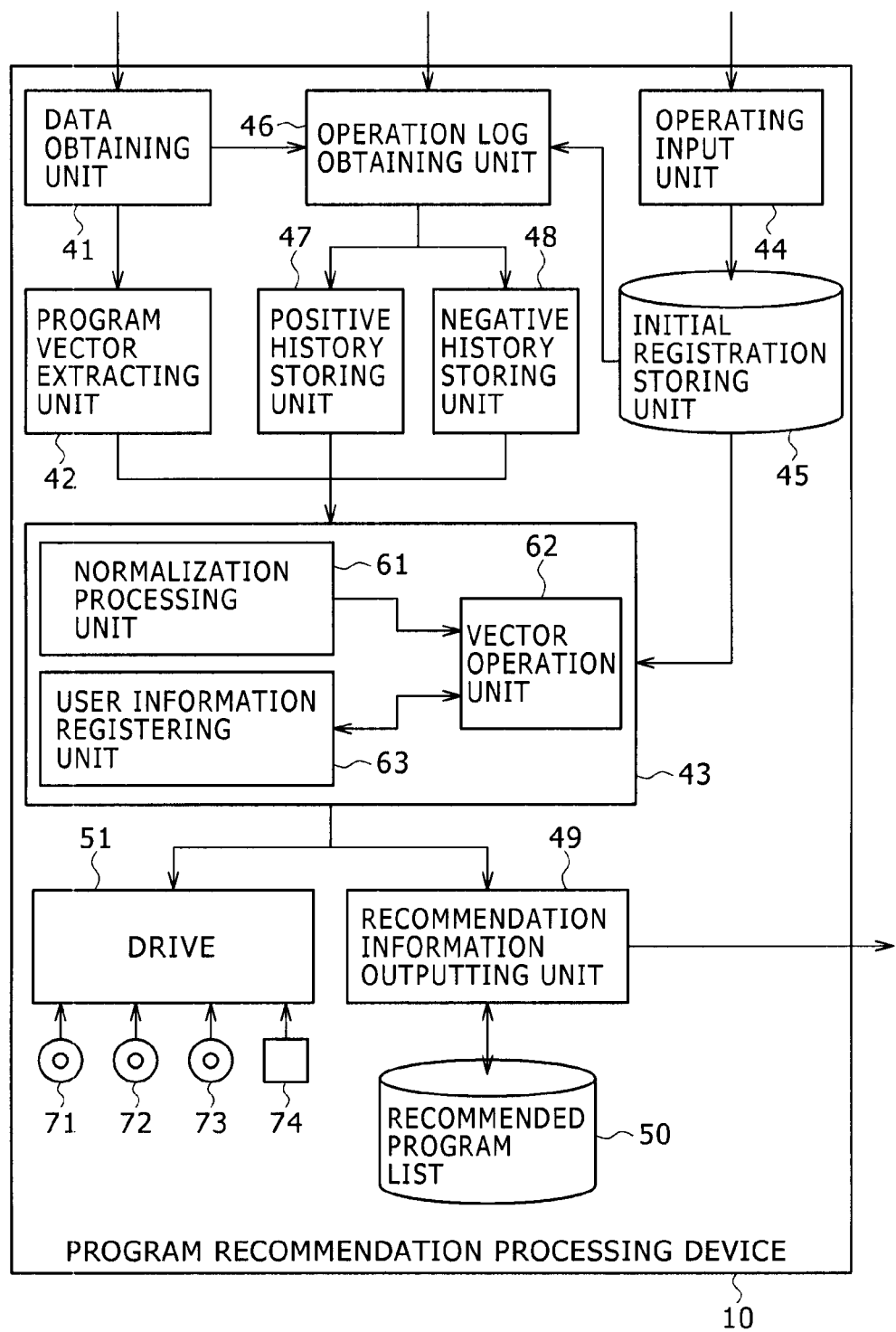
FIG. 13 is a block diagram showing a configuration of a program recommendation processing device in FIG. 1.

FIG. 13 is a block diagram showing a configuration of the program recommendation processing device 10.

A data obtaining unit 41 obtains program vectors PP transmitted from the distribution server 5 and program side effect vectors EfPP corresponding to the program vectors PP. A program vector extracting unit 42 extracts program vectors PP necessary for a matching process or program vectors PP necessary for generating a user model from the program vectors PP obtained by the data obtaining unit 41, and supplies the program vectors PP to a matching processing unit 43 together with program side effect vectors EfPP as required.

An operating input unit 44 comprises input devices such for example as a keyboard, a touch pad, and a mouse. The operating input unit 44 receives initially registered information input by the user, and a topic for generating a user model, and then outputs the initially registered information and the topic to an initial registration storing unit 45. The initial registration storing unit 45 registers the initially registered contents and the topic for generating a user model that are supplied from the operating input unit 44, and supplies the initially registered contents and the topic to an operation log obtaining unit 46 and the matching processing unit 43 as required. The contents registered in the initial registration storing unit 45 are updated sequentially on the basis of a user operation input from the operating input unit 44. The initially registered contents include information indicating programs that the user does not like, such for example as a genre, a keyword, and a starring that the user dislikes, and information indicating programs that the user likes, such for example as a genre, a keyword, and a starring that the user likes.

The operation log obtaining unit 46 obtains operation logs from the television display device 11 or the recording and reproducing device 12, and classifies these pieces of information into a positive history and a negative history. As required, referring to information stored in the initial registration storing unit 45, the operation log obtaining unit 46 reads program vectors PP corresponding to a positive history and a negative history among the program vectors PP obtained by the data obtaining unit 41. The operation log obtaining unit 46 then supplies the positive histories and the negative histories to a positive history storing unit 47 and a negative history storing unit 48, respectively, to store the positive histories and the negative histories in the positive history storing unit 47 and the negative history storing unit 48, respectively. The positive history storing unit 47 stores the supplied positive histories, and generates a positive history vector UP. The negative history storing unit 48 stores the supplied negative histories, and generates a negative history vector MUP. The generated positive history vector UP and the generated negative history vector MUP are supplied to the matching processing unit 43.

The positive history is information used to extract program candidates that the user is positive about viewing, or that are considered desirable by the user. For example, when the user views or records a program, or when programs proposed as a recommended program list to the user by a process to be described later are accepted and viewed or recorded by the user, metadata of the programs is stored as good impression metadata in the positive history storing unit 47. The positive history storing unit 47 obtains a sum of positive histories by detail item or major item, and generates the positive history vector UP.

On the other hand, the negative history is information used to exclude programs that the user is negative about viewing, or that are considered undesirable by the user from recommended programs. For example, when a program has a disliked item registered in the initial registration or is erased without being viewed after being recorded, or when programs proposed as a recommended program list to the user by a process to be described later are not accepted and are not viewed or recorded by the user, metadata of the programs is stored as negative impression metadata in the negative history storing unit 48. When the user specifies "sports" as a disliked item in the initial registration, for example, Genre Gmup={0, 0, 5, 0, 0, 0, 0, 0, 0} with a weight of 5 for a negative impression is additionally stored in the negative history storing unit 48. The negative history storing unit 48 obtains a sum of negative histories by detail item or major item, and generates the negative history vector MUP.

The matching processing unit 43 verifies matching between a program vector extracted from the program vector extracting unit 42 and the positive history vector UP or the negative history vector MUP supplied from the positive history storing unit 47 or the negative history storing unit 48.

When all detail elements of the program vector PP and the positive history vector UP or the negative history vector MUP are vectorized in a state of being arranged in one row, since a title, keywords and the like are formed by a plurality of words, one of the words and an item such for example as genre have the same weight in the vector. Accordingly, a normalization processing unit 61 in the matching processing unit 43 normalizes a title and contents as an item comprising words by dividing words by the number of words by program. For example, Title Tm={Tokaido-1, Mitsuya-1, Kaidan-1} is normalized into Title Tm={Tokaido: 0.33, Mitsuya: 0.33, Kaidan: 0.33}. Thus, the words within the item of each of the title and the contents have a total weight of 1, so that no inconvenience occurs in a matching process.

The vector operation unit 62 performs a matching process between the program vector PP and the positive history vector UP or the negative history vector MUP.

When the program vector PP, the positive history vector UP, and the negative history vector MUP are represented by a vector having all detail elements arranged in one row, the vector operation unit 62 obtains a degree of similarity SimUP between the program vector PP and the positive history vector UP as expressed by the following Equation (1) or a degree of similarity SimMUP between the program vector PP and the negative history vector MUP as expressed by Equation (2) on the basis of an inter-vector cosine distance (cos θ) between the positive history vector UP or the negative history vector MUP and the program vector PP. As expressed by Equation (1) and Equation (2), a cosine distance is a value obtained by dividing an inner product of two vectors by a product of absolute values of the vectors.

$$SimUP = \cos\theta u = UP \cdot PP / |UP| \times |PP| \quad (1)$$

$$SimMUP = \cos\theta m = MUP \cdot PP / |MUP| \times |PP| \quad (2)$$

In Equation (1) and Equation (2), PP denotes the program vector PP, UP denotes the positive history vector UP, and MUP denotes the negative history vector MUP. Also, "·" denotes an inner product, and "×" denotes a multiplication of elements (scalar operation).

When the program vector PP, the positive history vector UP, and the negative history vector MUP are vectorized by major item, the vector operation unit 62 can obtain a degree of similarity between the program vector PP and the positive history vector UP and a degree of similarity between the program vector PP and the negative history vector MUP in each major item, calculate sums of degrees of similarity in respective major items, and thereby calculate a degree of similarity SimUP and a degree of similarity SimMUP. For example, when in the major item "Title" resolved into words, the positive history vector UP is Title Tup={School-1, Kaidan-1, Toilet-1}, and the supplied program vector PP is Title Tm={Tokaido-1, Mitsuya-1, Kaidan-1}, supposing that length of a unit vector is one, since length (absolute value) of a vector is a square root of a sum of squares of a total of elements, a cosine distance cos θt as a degree of similarity of the title is calculated as by the following Equation (3).

$$\cos\theta t = (1 \cdot 1)/(\sqrt{3} \times \sqrt{3}) = 1/3 \quad (3)$$

In Equation (3), "·" denotes an inner product, and "×" denotes a scalar operation. A degree of similarity by major item between the program vector PP and the negative history vector MUP is calculated by a calculation similar to Equation (3).

For example, when the positive history vector UP is Positive History Vector UP={Title Tup, Genre Gup, Starring Pup, Scriptwriter/author/producer Aup, Contents (Keyword) Kup}, and the negative history vector MUP is Negative History Vector MUP={Title Tmup, Genre Gmup, Starring Pmup, Scriptwriter/author/producer Amup, Contents (Keyword) Kmup}, since a degree of similarity by major item is obtained in each major item by a calculation similar to Equation (3), a degree of similarity SimUP and a degree of similarity SimMUP are each calculated as a degree of similarity Sim of the following Equation (4).

$$Sim = \cos\theta_t + \cos\theta_g + \cos\theta_p + \cos\theta_a + \cos\theta_k \quad (4)$$

In this equation, $\cos\theta_t$ denotes a cosine distance between the program vector PP and the positive history vector UP or the negative history vector MUP in the major item "Title"; $\cos\theta_g$ denotes a cosine distance between the program vector PP and the positive history vector UP or the negative history vector MUP in the major item "Genre"; $\cos\theta_p$ denotes a cosine distance between the program vector PP and the positive history vector UP or the negative history vector MUP in the major item "Starring"; $\cos\theta_a$ denotes a cosine distance between the program vector PP and the positive history vector UP or the negative history vector MUP in the major item "Scriptwriter/author/producer"; and $\cos\theta_k$ denotes a cosine distance between the program vector PP and the positive history vector UP or the negative history vector MUP in the major item "Contents".

When the degree of similarity SimUP and the degree of similarity SimMUP are calculated as a sum of results of calculation in respective major items, an imbalance in weight between items is eliminated, which is synonymous with normalization. Hence, unlike a vector having all elements arranged in one row, the normalization process by the normalization processing unit 61 does not need to be performed.

That is, when a vector having all elements arranged in one row is used without normalization being performed, the number of words in an item such as a title, contents or the like is increased as the history is increased, while frequency of each word do not tend to increase as compared with an item such for example as broadcasting station or genre, in which item frequency tends to increase.

Thus, when a total by element is obtained using all elements, an effect of an item such as broadcasting station, genre or the like in which item frequency tends to increase becomes great. For example, in a case where a user is a fan of commentator A and thus likes to view "a live broadcast of a game played by baseball team B in which broadcast commentator A comments", information "live broadcast of baseball" as a genre tends to accumulate as a history, whereas information "commentator A" does not tend to accumulate as a history. Hence, there occurs a case where a live broadcast of a game played by baseball team B in which broadcast another commentator comments is recommended, but a variety program on which commentator A appears is not recommended.

On the other hand, by performing normalization or calculating a sum of results of calculation in respective major items as a degree of similarity SimUP or a degree of similarity SimMUP, it is possible to recommend the variety program on which commentator A appears without an effect of difference in frequency between the histories. Thus a preference of the user can be reflected more accurately.

The vector operation unit 62 can also calculate a degree of similarity SimUP and a degree of similarity SimMUP by performing weighting on the basis of the information initially registered by the user which information is stored in the initial registration storing unit 45, the program side effect vector EfPP transmitted in association with the program vector PP, or a user side effect vector EfUP (to be described later) generated and registered in the user information registering unit 63 or a user side counter effect vector EfMUP (to be described later).

The vector operation unit 62 for example obtains degrees of similarity SimMUP between the history vector MUP and a predetermined number of (for example 10) programs having highest degrees of similarity to the positive history vector on the basis of the degree of similarity SimUP calculated by the above-described method, calculates SimUP−SimMUP, and then outputs a predetermined number of (for example, 3) programs having highest degrees of similarity as results of calculation to the recommendation information outputting unit 49 as recommended programs.

When a program vector is grouped, the vector operation unit 62 registers a recommended priority group in the user information registering unit 63 on the basis of recommended program information, and preferentially recommends a program corresponding to the recommended priority group.

Further, the vector operation unit 62 can generate a user model vector by filtering program vectors PP using a topic stored in the initial registration storing unit 45, and register the user model vector in the user information registering unit 63 to perform a matching process. Details of a user model will be described later.

The user information registering unit 63 generates a user side effect vector EfUP and a user side counter effect vector EfMUP on the basis of the contents initially registered by the user which contents are supplied from the initial registration storing unit 45, or the positive history vector UP or the negative history vector MUP supplied from the positive history storing unit 47 or the negative history storing unit 48, and then stores the user side effect vector EfUP and the user side counter effect vector EfMUP. The user side effect vector EfUP indicates which elements of major items are important to the user in selecting a program and are given importance to select a program, or indicates preference of the user in each item. The user side counter effect vector EfMUP indicates which elements of major items are not important to the user in selecting a program and are not given importance to select a program, or indicates items disliked by the user in each item.

In other words, the user side effect vector EfUP and the user side counter effect vector EfMUP define which items greatly contribute in matching between a program vector PP and the positive history vector UP or the negative history vector MUP.

The user side effect vector EfUP and the user side counter effect vector EfMUP may be set by the user or by using predetermined values, or may be generated on the basis of the contents initially registered by the user which contents are registered in the initial registration storing unit 45.

Specifically, when the user side effect vector EfUP is information indicating which elements of major items are important to the user in selecting a program, in a case where a genre is important to the user in a program vector PP={Title Tm, Genre Gm, Time Slot Hm, Broadcasting Station Sm, Starring Pm, Scriptwriter/author/producer Am, Contents Km}, the user side effect vector EfUP is set as for example an effect vector EfUP=(1, 5, 1, 1, 1, 1, 1). On the other hand, when starring and a genre are important to the user, the user side effect vector EfUP is set as for example an effect vector EfUP=(1, 3, 1, 1, 5, 1, 1).

When the user side effect vector EfUP indicates preference of the user in each item, in a case where a genre of a program considered desirable by the user in major item Genre Gm={drama, variety, sports, movie, music, child-oriented/education, culture/document, news/report, other} is culture/document, the user side effect vector EfUP is set as for example Genre Gm={0, 0, 0, 0, 0, 0, 5, 0, 0}.

Also, the user side effect vector EfUP and the user side counter effect vector EfMUP may be generated on the basis of the positive history vector UP or the negative history vector MUP, or by counting programs viewed by the user in a certain period. Further, the user side effect vector EfUP and the user side counter effect vector EfMUP can be generated by genre. Methods for generating the user side effect vector EfUP and the user side counter effect vector EfMUP will be described later with reference to FIGS. 22 to 27.

Further, the user information registering unit 63 registers information on the recommended priority group, the user model vector and the like generated by processes of the vector operation unit 62 as required.

The matching processing unit 43 described above can determine recommended programs using only a positive history, for example, without performing a process of removing programs considered undesirable by the user (programs that the user is negative about viewing) from programs having high degrees of similarity to the positive history vector UP (programs that the user is positive about viewing), using a negative history.

The recommendation information outputting unit 49 registers recommended program information supplied from the matching processing unit 43 in a recommended program list 50, and supplies the recommended program information to the television display device 11 or the recording and reproducing device 12. The recommended program list 50 is removable from the program recommendation processing device 10. The recommended program list 50 registers the recommended program information output from the recommendation information outputting unit 49. Storing the recommended program information in the recommended program list 50 enables program recommendation, automatic recording and the like to be performed using history information hitherto accumulated even when a different television receiving device 4, a different television display device 11, or a different recording and reproducing device 12, for example, is used.

The matching processing unit 43 is connected with a drive 51 as required. A magnetic disk 71, an optical disk 72, a magneto-optical disk 73, and a semiconductor memory 74 are loaded into the drive 51 as required to send and receive data to and from the drive 51.

A first process for generating a positive history vector and a negative history vector which process is performed by the program recommendation processing device 10 will be described with reference to a flowchart of FIG. 14.

In step S71, the operation log obtaining unit 46 supplies initially registered contents read from the initial registration storing unit 45 to the negative history storing unit 48. The negative history storing unit 48 generates a negative history vector MUP referring to the initially registered contents supplied to the negative history storing unit 48.

In step S72, the operation log obtaining unit 46 determines whether or not the initially registered contents are changed on the basis of registered contents stored in the initial registration storing unit 45. When the operation log obtaining unit 46 determines in step S72 that the initially registered contents are changed, the process returns to step S71 to repeat the process from step S71 on down.

When the operation log obtaining unit 46 determines in step S72 that the initially registered contents are not changed, the operation log obtaining unit 46 determines in step S73 whether or not an operation log is supplied from the television display device 11 or the recording and reproducing device 12. When the operation log obtaining unit 46 determines in step S73 that no operation log is supplied, the process returns to step S72 to repeat the process from step S72 on down.

When the operation log obtaining unit 46 determines in step S73 that an operation log is supplied, the operation log obtaining unit 46 determines in step S74 whether or not the supplied operation log is a positive history. For example, when the operation log indicates a recording operation, a program vector PP of a program corresponding to the operation is a positive history. When the operation log indicates erasure of recorded data that has not been reproduced, a program vector PP of a program corresponding to the operation is a negative history.

When the operation log obtaining unit 46 determines in step S74 that the supplied operation log is a positive history, the operation log obtaining unit 46 in step S75 extracts a program vector PP corresponding to the operation log determined to be a positive history from the data obtaining unit 41, and supplies the program vector PP to the positive history storing unit 47. The positive history storing unit 47 additionally stores the supplied program vector PP as a positive history.

In step S76, the positive history storing unit 47 obtains a sum of vectors of positive history program vectors PP by detail item or by major item, and thereby generates a positive history vector UP. After the process of step S76 is completed, the process returns to step S72 to repeat the process from step S72 on down.

When the operation log obtaining unit 46 determines in step S74 that the supplied operation log is not a positive history, the supplied operation log is a negative history, and hence the operation log obtaining unit 46 in step S77 extracts a program vector PP corresponding to the operation log determined to be a negative history from the data obtaining unit 41, and supplies the program vector PP to the negative history storing unit 48. The negative history storing unit 48 additionally stores the supplied program vector PP as a negative history.

In step S78, the negative history storing unit 48 obtains a sum of vectors of negative history program vectors PP by detail item or by major item, and thereby generates a negative history vector MUP. After the process of step S78 is completed, the process returns to step S72 to repeat the process from step S72 on down.

When detail items are described in major items of Positive History Vector UP={Title Tup, Genre Gup, Starring Pup, Scriptwriter/author/producer Aup, Contents (Keyword) Kup}, a numerical value indicating a vector total sum is entered following each detail item in the positive history vector UP. For example, as shown in FIG. 15, as to the major item "Genre", a numerical value indicating a positive history total sum is entered for each detail item as in Genre Gup={ (drama-25), (variety-34), (sports-42), (movie-37), (music-73), (child-oriented/education-120), (culture/document-3), (news/report-5), (other-23)}.

In a vector represented by words such as the major item "Title", a numerical value indicating a positive history total sum by word is entered following the word as in Title Tup={ (title 1-12), (title 2-3), . . . }, for example. In the negative history vector MUP, numerical values indicating total sums are entered following items as in the positive history vector UP.

While the major items of the positive history vector UP (and the negative history vector MUP) described in FIG. 15 are Title, Genre, Starring, Scriptwriter/author/producer, and Contents (Keyword), which are smaller in number than those of the program vector PP described with reference to FIG. 5, it is needless to say that the major items of the positive history vector UP (and the negative history vector MUP) may be the same major items as those of the program vector PP.

Figure 14:
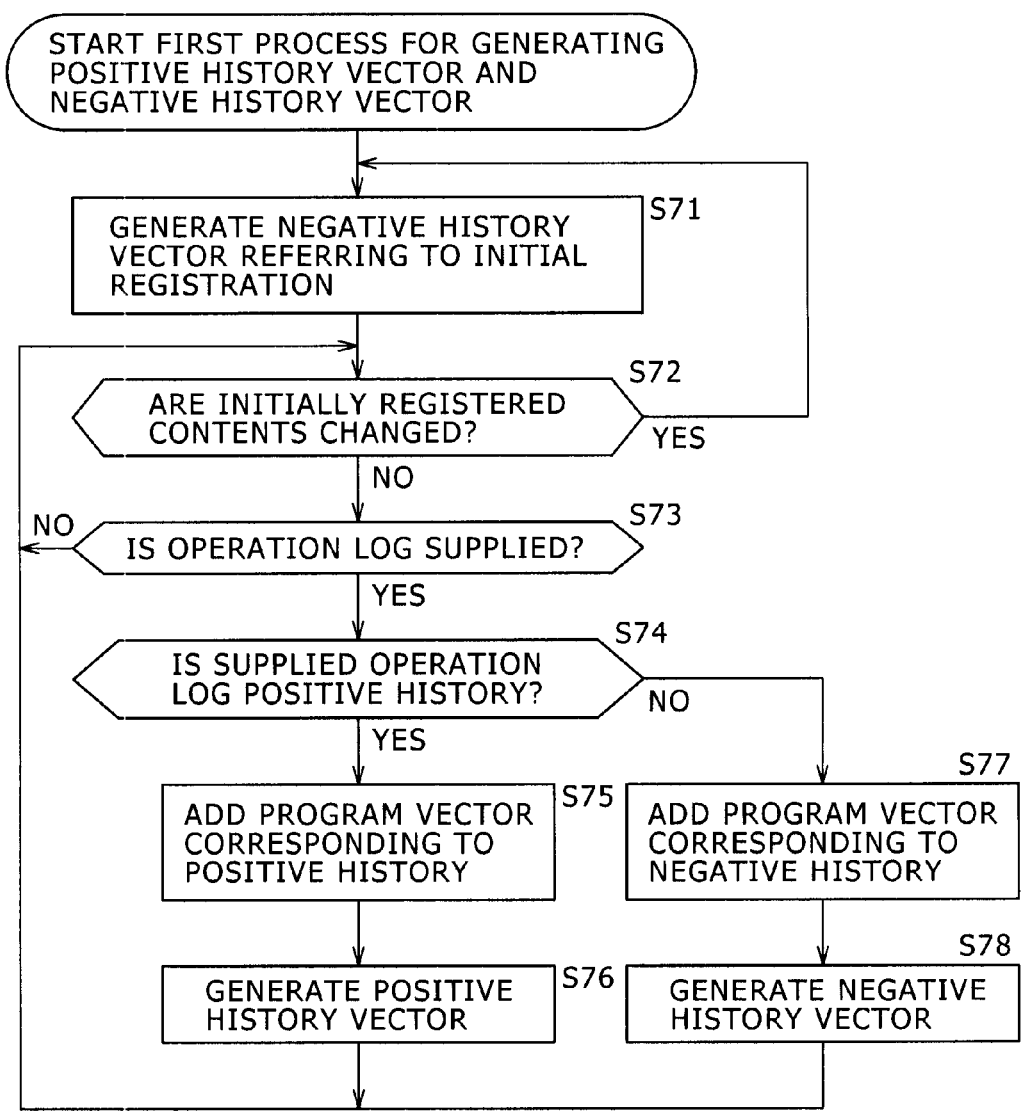
FIG. 14 is a flowchart of assistance in explaining a first process for generating a positive history vector and a negative history vector.

While the description with reference to FIG. 14 has been made supposing that the negative history vector MUP is generated on the basis of the initially registered contents before the input of the operation log, information for selecting a program considered desirable by the user may be received at the time of initial registration, so that the positive history vector UP is also generated before the input of the operation log. In addition, the positive history vector UP or the negative history vector MUP may be generated using only the operation log without the positive history vector UP or the negative history vector MUP being generated on the basis of the initial registration.

By thus generating and retaining the positive history vector UP and the negative history vector MUP independently of each other, it is possible to perform a process for matching with preference of the user more accurately.

Incidentally, at this time, more detailed positive and negative histories may be able to be obtained. For example, while in the process described with reference to FIG. 14, the positive history vector UP and the negative history vector MUP are generated using the sums of program vectors PP corresponding to positive histories and negative histories in all the items, the sums of program vectors PP corresponding to positive histories and negative histories may be accumulated by genre, for example, so that the positive history vector UP and the negative history vector MUP are generated by genre.

Since starring is often different depending on the genre of the broadcast program, there are cases where preference of the user are not correctly reflected. Specifically, in a case of a user who likes dramas and likes variety programs on which comedian A who hardly appears in dramas appears, and whose viewing ratio of variety programs to dramas is 2:8, when positive histories of starring are accumulated without distinction of genres, Starring B who frequently appears in dramas but is not an actor that the user particularly likes can have more points in the positive history vector UP than comedian A who hardly appears in dramas. In such a case, a documentary in which Starring B who frequently appears in dramas appears is recommended rather than a variety show in which comedian A appears, for example. In order to prevent this, it suffices to accumulate positive histories and negative histories by genre, and generate the positive history vector UP and the negative history vector MUP by genre on the basis of the positive histories and the negative histories.

In addition, for example, in a case where the user is a fan of commentator A and thus likes to view "a live broadcast of a game played by baseball team B in which broadcast commentator A comments", information "live broadcast of baseball" as a genre tends to accumulate as a history, whereas information "commentator A" does not tend to accumulate as a history. Hence, there occurs a case where a live broadcast of a game played by baseball team B in which broadcast another commentator comments is recommended, but a variety program on which commentator A appears is not recommended. In order to prevent this, it suffices for example to accumulate positive histories and negative histories by starring, and generate the positive history vector UP and the negative history vector MUP by starring on the basis of the positive histories and the negative histories.

By thus accumulating histories by specific item, it is possible to reflect preference of the user more accurately without obscuring preferences of the user.

Then, by verifying matching between supplied program vectors PP and the positive history vector UP and the negative history vector MUP thus generated in the matching processing unit 43, it is possible to generate recommended program information that accurately reflects the preference of the user.

Figure 16:
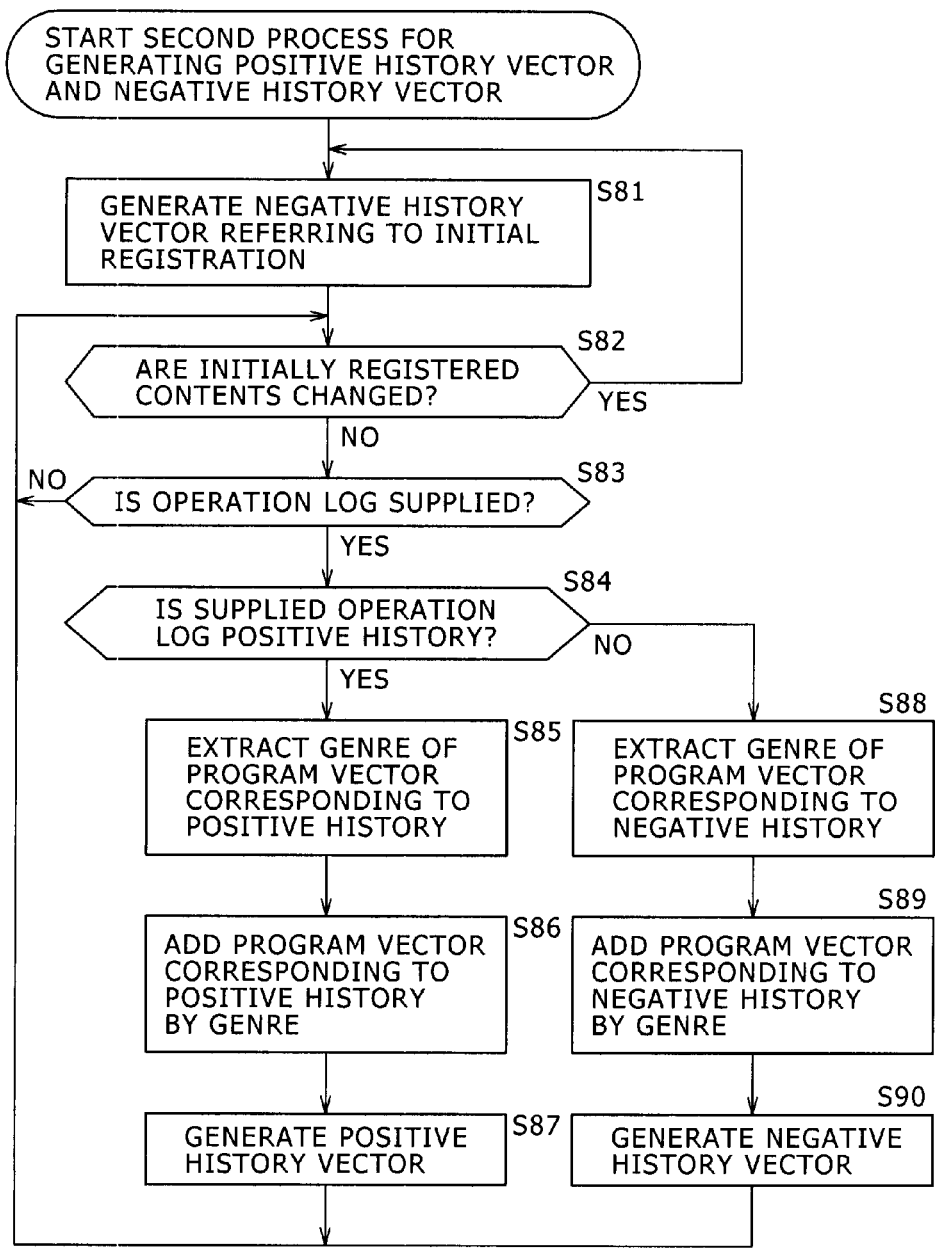
FIG. 16 is a flowchart of assistance in explaining a second process for generating a positive history vector and a negative history vector.

A second process for generating a positive history vector and a negative history vector in which process histories are accumulated by genre will next be described with reference to a flowchart of FIG. 16.

The same process as that of steps S71 to S74 in FIG. 14 is performed in steps S81 to S84. That is, a negative history vector MUP is generated referring to the initial registration, whether or not the initially registered contents are changed is determined, and when the initially registered contents are not changed, whether or not a supplied operation log is a positive history is determined.

When it is determined in step S84 that the supplied operation log is a positive history, the operation log obtaining unit 46 in step S85 extracts a program vector PP corresponding to the operation log determined to be a positive history from the data obtaining unit 41, and then supplies the program vector PP to the positive history storing unit 47. The positive history storing unit 47 extracts a genre of the supplied program vector PP.

In step S86, the positive history storing unit 47 additionally stores the program vector PP extracted from the data obtaining unit 41 as a positive history by genre.

In step S87, the positive history storing unit 47 obtains a sum of vectors of positive history program vectors PP by detail item or by major item in the genre in which the program vector is additionally stored, and thereby generates a positive history vector UP of the corresponding genre. After the process of step S87 is completed, the process returns to step S82 to repeat the process from step S82 on down.

When it is determined in step S84 that the supplied operation log is not a positive history, the supplied operation log is a negative history, and hence the operation log obtaining unit 46 in step S88 extracts a program vector PP corresponding to the operation log determined to be a negative history from the data obtaining unit 41, and supplies the program vector PP to the negative history storing unit 48. The negative history storing unit 48 extracts a genre of the supplied program vector PP.

In step S89, the negative history storing unit 48 additionally stores the program vector PP extracted from the data obtaining unit 41 as a negative history by genre.

In step S90, the negative history storing unit 48 obtains a sum of vectors of negative history program vectors PP by detail item or by major item in the genre in which the program vector is additionally stored, and thereby generates a negative history vector MUP of the corresponding genre. After the process of step S90 is completed, the process returns to step S82 to repeat the process from step S82 on down.

As a result of such a process, the positive history vector UP and the negative history vector MUP are generated by genre. It is therefore possible to reflect the preference of the user more accurately without obscuring the preferences of the user, and thus generate recommended program information that accurately reflects the preference of the user.

Figure 17:
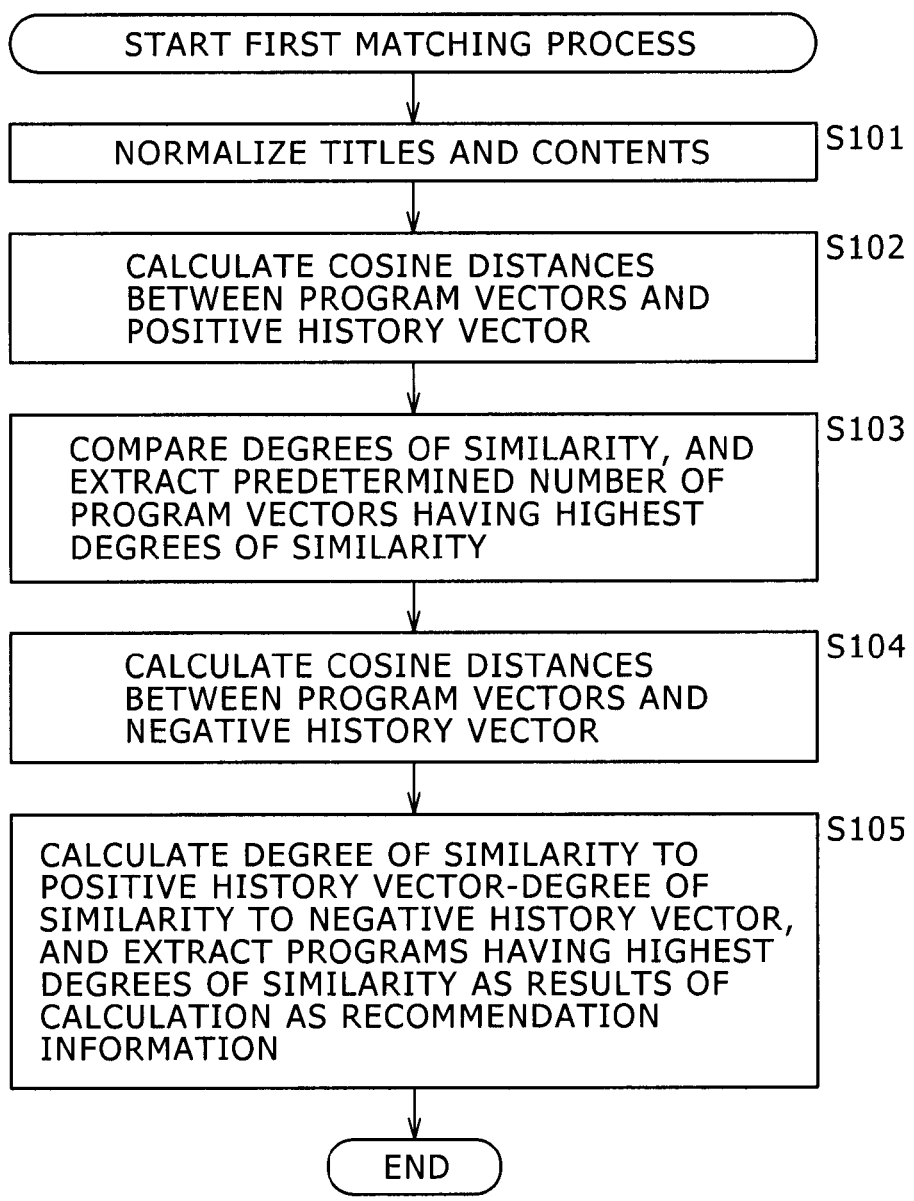
FIG. 17 is a flowchart of assistance in explaining a first matching process.

Referring to a flowchart of FIG. 17, description will be made of a first matching process when program vectors PP, a positive history vector UP, and a negative history vector MUP are represented by a vector having all detail elements arranged in one row.

In step S101, the program vector extracting unit 42 extracts program vectors PP of a plurality of programs (for example programs broadcast in a predetermined time slot) from the data obtaining unit 41, and then supplies the program vectors PP to the normalization processing unit 61 in the matching processing unit 43. The normalization processing unit 61 normalizes titles and contents comprising words among constituent elements of the supplied program vectors PP and the positive history vector UP read from the positive history storing unit 47. The normalization processing unit 61 then supplies results of normalization to the vector operation unit 62.

Specifically, when a supplied program vector PP has for example Title Tm={Tokaido-1, Mitsuya-1, Kaidan-1}, the normalization processing unit 61 normalizes Title Tm={Tokaido-1, Mitsuya-1, Kaidan-1} into Title Tm={Tokaido: 0.33, Mitsuya: 0.33, Kaidan: 0.33} so that the words within the item of the program have a total weight of 1.

In step S102, the vector operation unit 62 in the matching processing unit 43 calculates degrees of similarity SimUP as cosine distances between the program vectors PP of the plurality of programs and the positive history vector UP, using the above-described Equation (1).

In step S103, the vector operation unit 62 compares the degrees of similarity SimUP calculated in step S102, the degrees of similarity SimUP representing the degrees of similarity between the program vectors PP and the positive history vector UP, and extracts a predetermined number of program vectors PP, for example 10 program vectors PP, having highest degrees of similarity.

In step S104, the vector operation unit 62 calculates degrees of similarity SimMUP as cosine distances between the program vectors PP extracted in step S103 and the negative history vector MUP read from the negative history storing unit 48, using the above-described Equation (2).

In step S105, the vector operation unit 62 calculates the degree of similarity SimMUP (that is, the cosine distance) to, the positive history vector UP minus the degree of similarity SimMUP (that is, the cosine distance) to the negative history vector, and extracts the program vectors or EPG data of a predetermined number of programs (for example one program) having highest degrees of similarity as results of the calculation as recommendation information. The vector operation unit 62 outputs the program vectors or the EPG data to the recommendation information outputting unit 49 to register the program vectors or the EPG data in the recommended program list 50 and output the program vectors or the EPG data to the television display device 11 and the recording and reproducing device 12. Then the process is ended.

With such a process, when the program vectors PP, the positive history vector UP, and the negative history vector MUP are represented by a vector having all detail elements arranged in one row, it is possible to determine recommended programs suiting preference of the user on the basis of the degrees of similarity between the program vectors PP and the positive history vector UP and the degrees of similarity between the program vectors PP and the negative history vector MUP.

Figure 18:
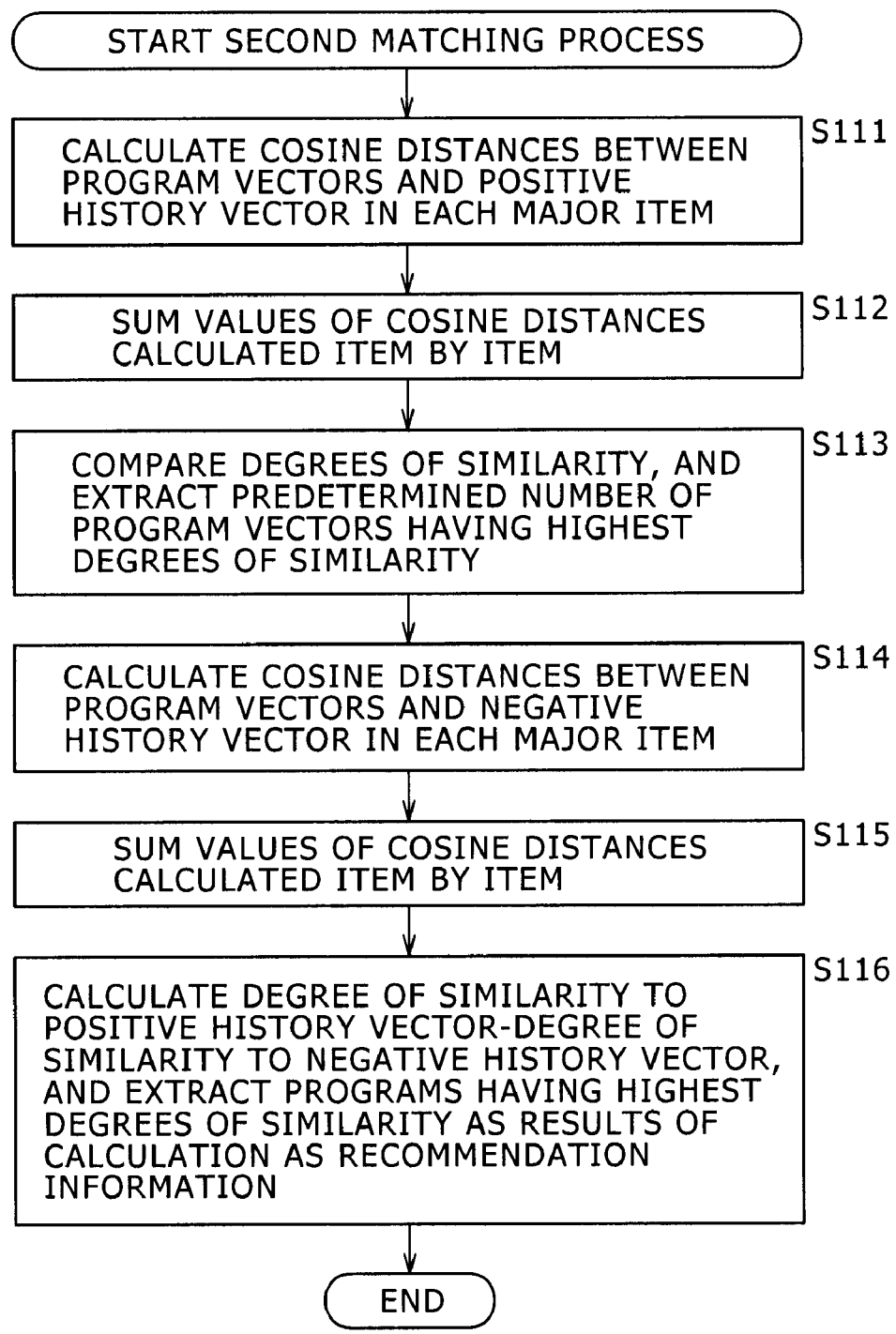
FIG. 18 is a flowchart of assistance in explaining a second matching process.

Referring to a flowchart of FIG. 18, description will next be made of a second matching process that determines recommended programs by calculating a cosine distance by major item and calculating a sum of the cosine distances as a degree of similarity SimUP and a degree of similarity SimMUP rather than normalizing items represented by words.

In step S111, the program vector extracting unit 42 extracts program vectors PP of a plurality of programs (for example programs broadcast in a predetermined time slot) from the data obtaining unit 41, and then supplies the program vectors PP to the vector operation unit 62 in the matching processing unit 43. The vector operation unit 62 calculates cosine distances between the supplied program vectors PP and the positive history vector UP read from the positive history storing unit 47 in each major item of the program vectors PP and the positive history vector UP.

In step S112, the vector operation unit 62 sums values of the cosine distances calculated item by item in step S111 using the above-described Equation (4), and thereby calculates a degree of similarity SimUP.

In step S113, the vector operation unit 62 compares the degrees of similarity SimUP, which is calculated in step S112, between the program vectors PP and the positive history vector UP, and extracts a predetermined number of program vectors PP, for example 10 program vectors PP, having highest degrees of similarity.

In step S114, the vector operation unit 62 calculates cosine distances between the program vectors PP extracted by the process of step S113 and the negative history vector MUP read from the negative history storing unit 48 in each major item of the program vectors PP and the negative history vector MUP.

In step S115, the vector operation unit 62 sums values of the cosine distances calculated item by item in step S114 using the above-described Equation (4), and thereby calculates a degree of similarity SimMUP.

In step S116, the vector operation unit 62 calculates {the degree of similarity SimUP as the cosine distance between the program vector PP and the positive history vector UP} minus {the degree of similarity SimMUP as the cosine distance between the program vector PP and the negative history vector MUP}, and extracts the program vectors. PP or EPG data of a predetermined number of (for example, 3) programs having highest degrees of similarity as results of the calculation as recommendation information. The vector operation unit 62 outputs the program vectors or the EPG data to the recommendation information outputting unit 49 to register the program vectors or the EPG data in the recommended program list 50 and output the program vectors or the EPG data to the television display device 11 and the recording and reproducing device 12. Then the process is ended.

With such a process, the sum of results of the calculation by major items is calculated as the degree of similarity SimUP and the degree of similarity SimMUP without items represented by words being normalized. Recommended programs suiting the preference of the user can be determined on the basis of the degrees of similarity between the program vectors PP and the positive history vector UP and the degrees of similarity between the program vectors PP and the negative history vector MUP without being affected by difference in history accumulation between detail elements belonging to different major items.

While in the first matching process and the second matching process described with reference to FIG. 17 and FIG. 18, programs considered undesirable to the user can be removed using the negative history from programs having high degrees of similarity to the positive history vector UP of the user, recommended programs may be determined using only the positive history, for example.

In selecting programs, some users like news and report programs very much, attach importance to starring rather than genre, or attach importance to contents without being particular about starring, for example. Thus, for some users, items to be weighted and items not to be weighted to select programs, that is, important items and unimportant items may be fixed.

Therefore the matching process may be performed using the program side effect vector EfPP and the user side effect vector EfUP or the user side counter effect vector EfMUP described above. In addition, the user may determine whether to use the program side effect vector EfPP and the user side effect vector EfUP or the user side counter effect vector EfMUP.

Referring to a flowchart of FIG. 19, description will next be made of a third matching process performed using the program side effect vector EfPP or the user side effect vector EfUP according to a setting by the user in the case where the program vector PP, the positive history vector UP, and the negative history vector MUP are represented by a vector having all detail elements arranged in one row.

In step S121, the vector operation unit 62 obtains contents set for the use of the program side effect vector EfPP and the user side effect vector EfUP or the user side counter effect vector EfMUP. The contents are input by the user using the operating input unit 44 and registered in the initial registration storing unit 45. The contents set for the use of the effect vectors are information indicating whether to perform weighting using the program side effect vector EfPP and the user side effect vector EfUP or the user side counter effect vector EfMUP in the matching process.

In step S122, the vector operation unit 62 reads the user side effect vector EfUP from the user information registering unit 63 as required, calculates a cosine distance between a program vector PP and the positive history vector UP using the following Equation (5), and sets the cosine distance as a degree of similarity SimUP.

$$SimUP = \frac{epd_1 \cdot eud_1 \cdot p_1 \cdot u_1 + epd_2 \cdot eud_2 \cdot p_2 \cdot u_2 + \ldots}{|PP||UP|} \quad (5)$$

In Equation (5), the program vector PP=$(p_1, p_2, \ldots)$, the positive history vector UP=$(u_1, u_2, \ldots)$, the program side effect vector EfPP=$(epd_1, epd_2, \ldots)$, and the user side effect vector EfUP=$(eud_1, eud_2, \ldots)$ While both the program side effect vector EfPP and the user side effect vector EfUP are used in Equation (5), when a setting is made such that one of the program side effect vector EfPP and the user side effect vector EfUP is not used, a numerical value "1" is substituted into the unused vector for the calculation.

The user side effect vector EfUP may be able to be set by the user or set on the basis of an initial setting by the user, or may be generated in the user information registering unit 63. Details of generation of the user side effect vector EfUP will be described later with reference to FIGS. 22 to 25.

In step S123, the vector operation unit 62 compares degrees of similarity SimUP, which is calculated in step S122, between program vectors PP and the positive history vector UP, and extracts a predetermined number of program vectors PP, for example 10 program vectors PP, having highest degrees of similarity.

In step S124, the vector operation unit 62 reads the user side counter effect vector EfMUP from the user information registering unit 63 as required, and calculates cosine distances between the program vectors PP extracted in step S123 and the negative history vector MUP using the following Equation (6).

$$SimMUP = \frac{epd_1 \cdot emd_1 \cdot p_1 \cdot m_1 + epd_2 \cdot emd_2 \cdot p_2 \cdot m_2 + \ldots}{|PP||MP|} \quad (6)$$

In Equation (6), the program vector PP=$(p_1, p_2, \ldots)$, the negative history vector MUP=$(m_1, m_2, \ldots)$, the program side effect vector EfPP=$(epd_1, epd_2, \ldots)$, and the user side counter effect vector EfMUP=$(emd_1, emd_2, \ldots)$. While both the program side effect vector EfPP and the user side counter effect vector EfMUP are used in Equation (6), when a setting is made such that one of the program side effect vector EfPP and the user side counter effect vector EfMUP is not used, a numerical value "1" is substituted into the unused vector for the calculation.

The user side counter effect vector EfMUP may be able to be set by the user or set on the basis of an initial setting by the user, or may be generated in the user information registering unit 63. Details of generation of the user side counter effect vector EfMUP will be described later with reference to FIG. 26 or FIG. 27.

In step S125, the vector operation unit 62 calculates the degree of similarity SimUP between the program vector PP and the positive history vector UP minus the degree of similarity SimMUP between the program vector PP and the negative history vector, and extracts the program vectors PP or EPG data of a predetermined number of (for example, 3) programs having highest degrees of similarity as results of the calculation as recommendation information. The vector operation unit 62 outputs the program vectors PP or the EPG data to the recommendation information outputting unit 49 to register the program vectors PP or the EPG data in the recommended program list 50 and output the program vectors PP or the EPG data to the television display device 11 and the recording and reproducing device 12. Then the process is ended.

With such a process, since recommendation information is extracted using the program side effect vector EfPP and the user side effect vector EfUP or the user side counter effect vector EfMUP according to the setting, it is possible to recommend programs that correctly reflect the preference of the user.

While in the process described with reference to FIG. 19, the program vector PP, the positive history vector UP, and the negative history vector MUP are represented by a vector having all detail elements arranged in one row, each of the program vector PP, the positive history vector UP, and the negative history vector MUP may be calculated by major item.

Figure 20:
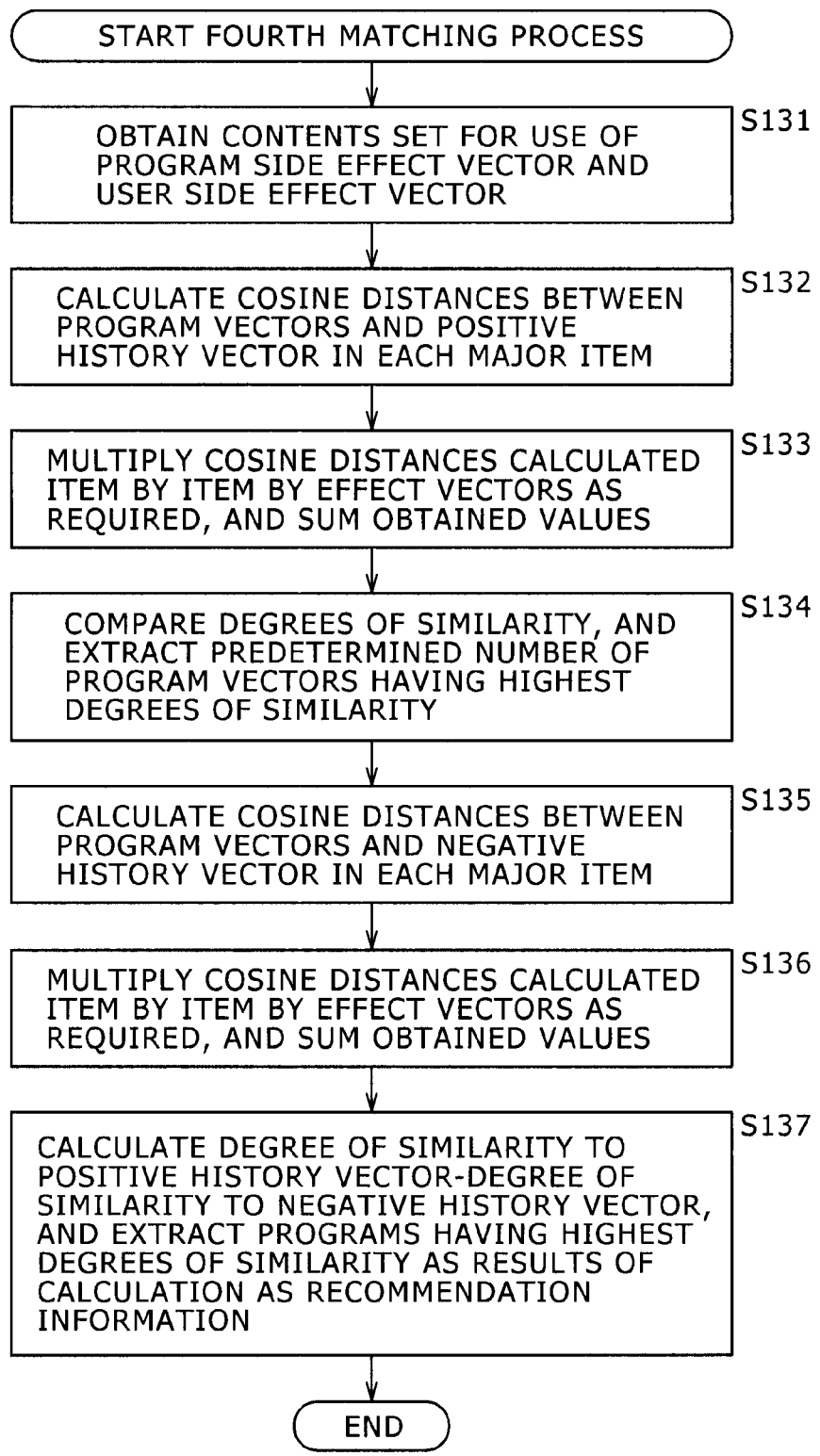
FIG. 20 is a flowchart of assistance in explaining a fourth matching process.

Referring to a flowchart of FIG. 20, description will next be made of a fourth matching process that allows the program side effect vector EfPP and the user side effect vector EfUP or the user side counter effect vector EfMUP to be reflected by major item.

Figure 19:
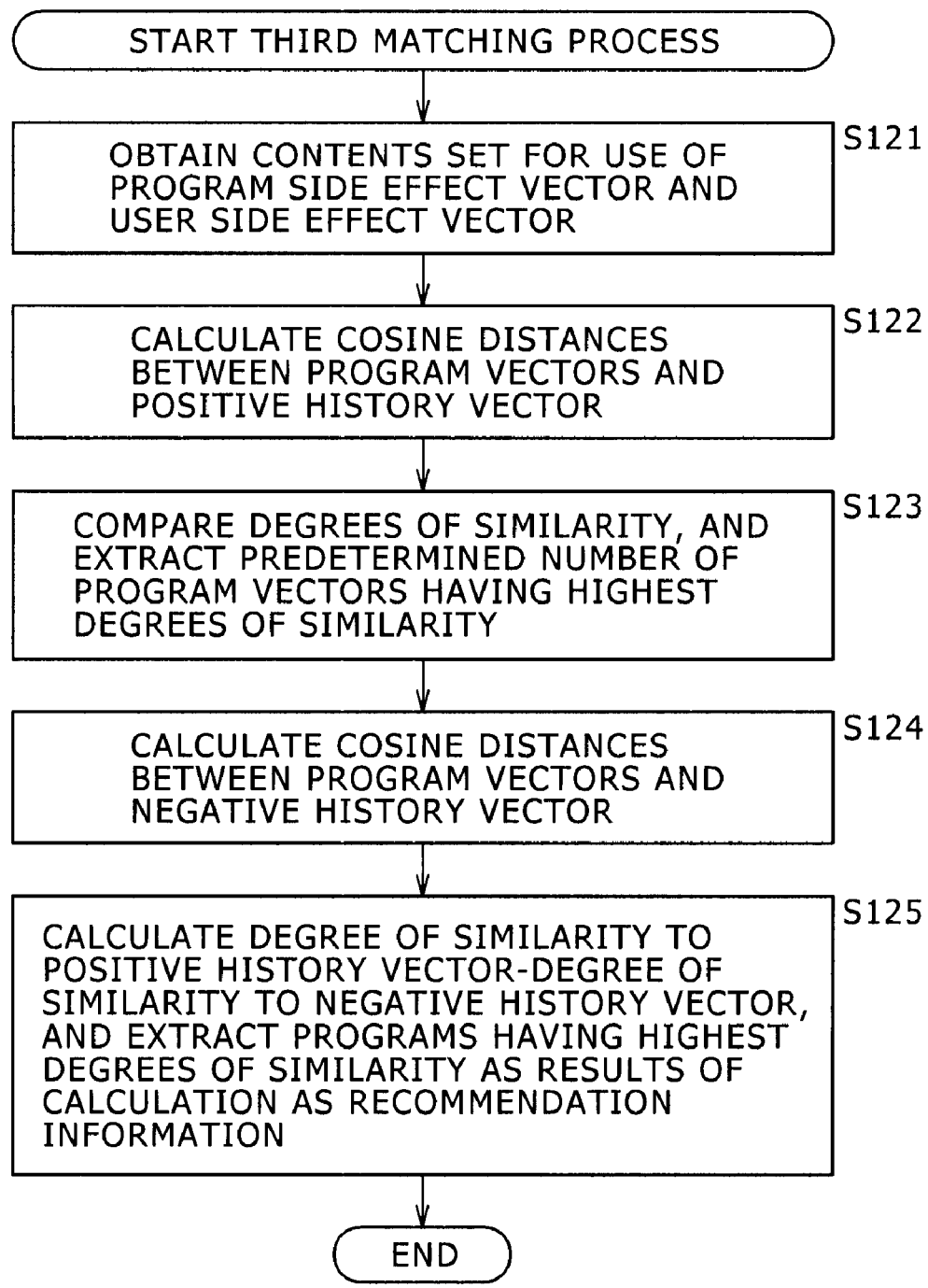
FIG. 19 is a flowchart of assistance in explaining a third matching process.

In step S131, the same process as that of step S121 in FIG. 19 is performed to obtain contents set for the use of the effect vectors.

In step S132, the vector operation unit 62 calculates a cosine distance between a supplied program vector PP and the positive history vector UP read from the positive history storing unit 47 in each major item of the program vector PP and the positive history vector UP. In this step, the effect vectors are not used for the calculation.

In step S133, using the following Equation (7), the vector operation unit 62 multiplies cosine distances calculated item by item by the effect vectors as required, sums values obtained by the multiplication, and thereby calculates a degree of similarity SimUP.

$$SimUP = epd_t \cdot eud_t \cdot \cos\theta u_t + epd_g \cdot eud_g \cdot \cos\theta u_g + \quad (7)$$
$$epd_p \cdot eud_p \cdot \cos\theta u_p + epd_a \cdot eud_a \cdot \cos\theta u_a + epd_k \cdot eud_k \cdot \cos\theta u_k$$

In Equation (7), the cosine distances by the major items between the program vector PP=$(p_t, p_g, p_p, p_a, p_k)$ and the positive history vector UP=$(u_t, u_g, u_p, u_a, u_k)$ are (cos θ $u_t$, cos θ $u_g$, cos θ $u_p$, cos θ $u_a$, cos θ $u_k$); the program side effect vector EfPP=$(epd_t, epd_g, epd_p, epd_a, epd_k)$; and the user side effect vector EfUP=$(eud_t, eud_g, eud_p, eud_a, eud_k)$. While both the program side effect vector EfPP and the user side effect vector EfUP are used in Equation (7), when a setting is made such that one of the program side effect vector EfPP and the user side effect vector EfUP is not used, a numerical value "1" is substituted into the unused vector for the calculation.

In step S134, the vector operation unit 62 compares degrees of similarity SimUP, which calculated in step S133, between program vectors PP and the positive history vector UP, and extracts a predetermined number of program vectors PP, for example 10 program vectors PP, having highest degrees of similarity.

In step S135, the vector operation unit 62 calculates cosine distances between the program vectors PP extracted by the process of step S134 and the negative history vector MUP read from the negative history storing unit 48 in each major item of the program vectors PP and the negative history vector MUP. In this step, the effect vectors are not used for the calculation.

In step S136, using the following Equation (8), the vector operation unit 62 multiplies cosine distances calculated item by item by the effect vectors as required, sums values obtained by the multiplication, and thereby calculates a degree of similarity SimMUP.

$$SimMUP = epd_t \cdot emd_t \cdot \cos\theta m_t + epd_g \cdot emd_g \cdot \cos\theta m_g + \quad (8)$$
$$epd_p \cdot emd_p \cdot \cos\theta m_p + epd_a \cdot emd_a \cdot \cos\theta m_a + epd_k \cdot emd_k \cdot \cos\theta m_k$$

In Equation (8), the cosine distances by the major items between the program vector PP=$(P_t, P_g, P_p, P_a, P_k)$ and the negative history vector MUP=$(m_t, m_g, m_p, m_a, m_k)$ are (cos θ$m_t$, cos θ$m_g$, cos θ$m_p$, cos θ$m_a$, cos θ$m_k$); the program side effect vector EfPP=$(epd_t, epd_g, epd_p, epd_a, epd_k)$; and the user side counter effect vector EfMUP=$(emd_t, emd_g, emd_p, emd_a, emd_k)$. While both the program side effect vector EfPP and the user side counter effect vector EfMUP are used in Equation (8), when a setting is made such that one of the program side effect vector EfPP and the user side counter effect vector EfMUP is not used, a numerical value "1" is substituted into the unused vector for the calculation.

In step S137, the vector operation unit 62 calculates {the degree of similarity SimUP as the cosine distance between the program vector PP and the positive history vector UP} minus {the degree of similarity SimMUP as the cosine distance between the program vector PP and the negative history vector MUP}, and extracts the program vectors PP or EPG data of a predetermined number of (for example, 3) programs having highest degrees of similarity as results of the calculation as recommendation information. The vector operation unit 62 outputs the program vectors or the EPG data to the recommendation information outputting unit 49 to register the program vectors or the EPG data in the recommended program list 50 and output the program vectors or the EPG data to the television display device 11 and the recording and reproducing device 12. Then the process is ended.

With such a process, since weighting is performed using the effect vectors by major item, recommendation information suiting the preference of the user in detail can be generated.

Figure 21:
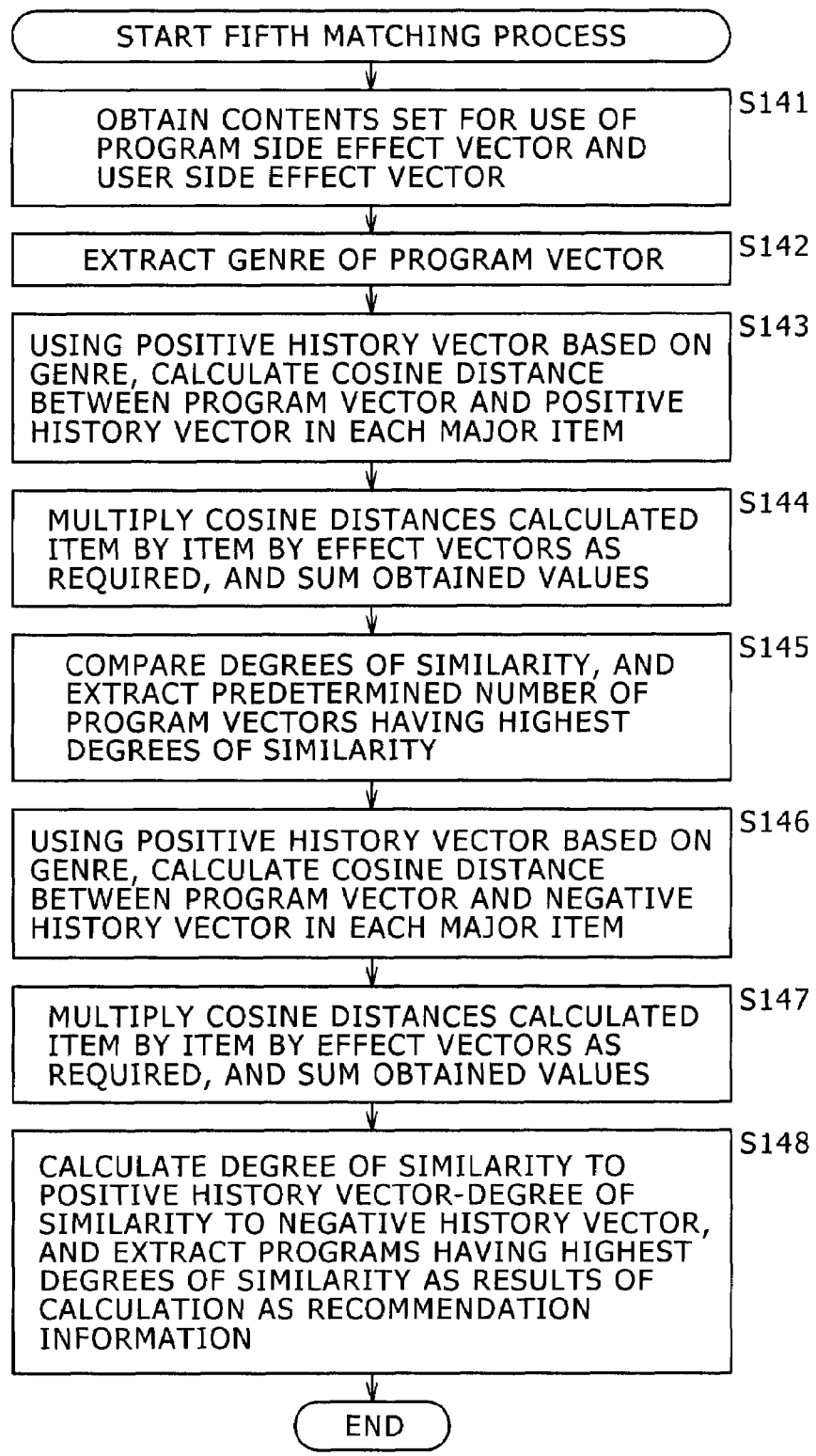
FIG. 21 is a flowchart of assistance in explaining a fifth matching process.

Referring to a flowchart of FIG. 21, description will next be made of a fifth matching process performed using the positive history vector UP and the negative history vector MUP by genre as well as the user side effect vector EfUP and the user side counter effect vector EfMUP by genre. The positive history vector UP and the negative history vector MUP by genre are generated by the second process of generating the positive history vector, and the negative history vector is described with reference to FIG. 16.

In step S141, the same process as that of step S121 in FIG. 19 is performed to obtain contents set for the use of the effect vectors.

In step S142, the vector operation unit 62 extracts a genre of a supplied program vector PP. Description in this case will be made supposing that the genre of the supplied program vector PP is "drama", for example.

In step S143, the vector operation unit 62 calculates a cosine distance between the supplied program vector PP and the positive history vector UP corresponding to the genre "drama" in each major item of the program vector PP and the positive history vector UP. The positive history vector UP is read from the positive history storing unit 47. In this step, the effect vectors are not used for the calculation.

In step S144, using the following Equation (9), the vector operation unit 62 multiplies cosine distances calculated item by item by the user side effect vector corresponding to the genre "drama" as required, sums values obtained by the multiplication, and thereby calculates a degree of similarity SimUP.

$$SimUP = \qquad (9)$$
$$epd_t \cdot eud_{td} \cdot \cos\theta u_{td} + epd_g \cdot eud_{gd} \cdot \cos\theta u_{gd} + epd_p \cdot eud_{pd} \cdot \cos\theta u_{pd} +$$
$$epd_a \cdot eud_{ad} \cdot \cos\theta u_{ad} + epd_k \cdot eud_{kd} \cdot \cos\theta u_{kd}$$

In Equation (9), the cosine distances by the major items between the program vector PP=($p_t$, $p_g$, $p_p$, $p_a$, $p_k$) and the positive history vector UP corresponding to the genre "drama"=($u_t$, $u_g$, $u_p$, $u_a$, $u_k$) are (cos θ $u_{td}$, cos θ $u_{gd}$, cos θ $u_{pd}$, cos θ $u_{ad}$, cos θ $u_{kd}$); the program side effect vector EfPP= ($epd_t$, $epd_g$, $epd_p$, $epd_a$, $epd_k$); and the user side effect vector EfUP corresponding to the genre "drama"=($eud_{td}$, $eud_{gd}$, $eud_{pd}$, $eud_{ad}$, $eud_{kd}$). While both the program side effect vector EfPP and the user side effect vector EfUP are used in Equation (9), when a setting is made such that one of the program side effect vector EfPP and the user side effect vector EfUP is not used, a numerical value "1" is substituted into the unused vector for the calculation.

In step S145, the vector operation unit 62 compares degrees of similarity SimUP, which is calculated in step S143, between program vectors PP and the positive history vector UP, and extracts a predetermined number of program vectors PP, for example 10 program vectors PP, having highest degrees of similarity.

In step S146, the vector operation unit 62 calculates cosine distances between the program vectors PP extracted by the process of step S145 and the negative history vector MUP corresponding to the genre "drama" in each major item of the program vectors PP and the negative history vector MUP. The negative history vector MUP is read from the negative history storing unit 48. In this step, the effect vectors are not used for the calculation.

In step S147, using the following Equation (10), the vector operation unit 62 multiplies cosine distances calculated item by item by the effect vectors corresponding to the genre "drama" as required, sums values obtained by the multiplication, and thereby calculates a degree of similarity SimMUP.

$$SimMUP = epd_t \cdot emd_{td} \cdot \cos\theta m_{td} + \qquad (10)$$
$$epd_g \cdot emd_{gd} \cdot \cos\theta m_{gd} + epd_p \cdot emd_{pd} \cdot \cos\theta m_{pd} +$$
$$epd_a \cdot emd_{ad} \cdot \cos\theta m_{ad} + epd_k \cdot emd_{kd} \cdot \cos\theta m_{kd}$$

In Equation (10), the cosine distances by the major items between the program vector PP=($p_t$, $p_g$, $p_p$, $p_a$, $p_k$) and the negative history vector MUP=($m_t$, $m_g$, $m_p$, $m_a$, $m_k$) are (cos θ $m_{td}$, cos θ $m_{gd}$, cos θ $m_{pd}$, cos θ $m_{ad}$, cos θ $m_{kd}$); the program side effect vector EfPP=($epd_t$, $epd_g$, $epd_p$, $epd_a$, $epd_k$); and the user side counter effect vector EfMUP corresponding to the genre "drama"=($emd_{td}$, $emd_{gd}$, $emd_{pd}$, $emd_{ad}$, $emd_{kd}$). While both the program side effect vector EfPP and the user side counter effect vector EfMUP are used in Equation (10), when a setting is made such that one of the program side effect vector EfPP and the user side counter effect vector EfMUP is not used, a numerical value "1" is substituted into the unused vector for the calculation.

In step S148, the vector operation unit 62 calculates {the degree of similarity SimUP as the cosine distance between the program vector PP and the positive history vector UP} minus {the degree of similarity SimMUP as the cosine distance between the program vector PP and the negative history vector MUP}, and extracts the program vectors PP or EPG data of a predetermined number of (for example, 3) programs having highest degrees of similarity as results of the calculation as recommendation information. The vector operation unit 62 outputs the program vectors or the EPG data to the recommendation information outputting unit 49 to register the program vectors or the EPG data in the recommended program list 50 and output the program vectors or the EPG data to the television display device 11 and the recording and reproducing device 12. Then the process is ended.

With such a process, the cosine distance between the positive history vector UP by genre and the program vector PP and the cosine distance between the negative history vector MUP by genre and the program vector PP are obtained in each major item, weighting is performed using the effect vectors corresponding to the genre, and then the degrees of similarity are calculated. Thus, recommendation information suiting the preference of the user in detail can be generated.

As described above, the user side effect vector EfUP and the user side counter effect vector EfMUP may be generated on the basis of the contents initially registered by the user. The contents are registered in the initial registration storing unit 45. Alternatively, the user side effect vector EfUP and the user side counter effect vector EfMUP specific to the user may be generated on the basis of the positive history vector UP or the negative history vector MUP, or by counting programs viewed by the user in a certain period.

Referring to a flowchart of FIG. 22, description will be made of a first process for generating a user side effect vector. The user side effect vector EfUP is generated by counting programs viewed by the user in a certain period.

In step S151, the user information registering unit 63 in the matching processing unit 43 selects one of unprocessed major items.

In step S152, the user information registering unit 63 detects programs viewed by the user in a certain period of one week, one month, or three months, for example, referring to the positive history stored in the positive history storing unit 47, makes the program vector extracting unit 42 extract program vectors PP corresponding to the programs viewed by the user in the certain period from the data obtaining unit 41, and counts the number of programs by detail item included in the major item selected in step S151.

Specifically, when the major item selected in step S151 is the major item Genre Gm={drama, variety, sports, movie, music, child-oriented/education, culture/document, news/report, other}, for example, the user information registering unit 63 classifies elements in the program vectors PP of the programs viewed by the user in the certain period into corresponding items, and then counts the elements. When the user viewed 50 programs in the certain period, for example, a result of counting the number of programs is for example Genre Gm={10, 18, 5, 2, 8, 1, 0, 1, 5}.

In step S153, the user information registering unit 63 makes the program vector extracting unit 42 extract program vectors PP corresponding to all programs in the same period from the data obtaining unit 41, and then counts the number of programs by detail item included in the major item selected in step S151.

Specifically, when the major item selected in step S151 is the major item Genre Gm={drama, variety, sports, movie, music, child-oriented/education, culture/document, news/report, other}, for example, the user information registering unit 63 classifies elements in the program vectors PP of all the programs in the same period into corresponding items, and then counts the elements. When all the programs in the same period are 1000 programs, for example, a result of counting the number of programs is for example Genre Gm={104, 239, 68, 25, 78, 91, 60, 254, 81}.

In step S154, the user information registering unit 63 calculates the counted number of the programs actually viewed by the user divided by the counted number of all the programs on the basis of the counting results in step S152 and step S153.

Being affected by audience rating competition, programming is considered to reflect preference of the general public. That is, calculating the counted number of the programs actually viewed by the user divided by the counted number of all the programs is synonymous with normalization of the counted number of the programs actually viewed by the user by the counted number of all the programs as a standard model. A normalized vector calculated in step S154 will be referred to as a normalized vector D.

For example, in the major item Genre Gm={drama, variety, sports, movie, music, child-oriented/education, culture/document, news/report, other}, when the counted number of all programs in one week is (8, 12, 3, 7, 6, 4, 2, 8, 10) while the number of programs viewed by the user is (4, 0, 1, 2, 3, 4, 1, 2, 2), the normalized vector D is as follows.

$$D=(4/8, 0/12, 1/3, 2/7, 3/6, 4/4, 1/2, 2/8, 2/10)=(0.5, 0, 0.33, 0.28, 0.5, 1.0, 0.5, 0.13, 0.2)$$

That is, an element of 1.0 in the normalized vector D indicates that all programs in the corresponding item are viewed in the set period, and an element of 0 in the normalized vector D indicates that no corresponding programs are viewed in the set period.

In step S155, the user information registering unit 63 generates an effect vector of the corresponding major item on the basis of a result of the calculation in step S154.

In order to generate the effect vector, a standard value is set using one item in the major item Genre Gm={drama, variety, sports, movie, music, child-oriented/education, culture/document, news/report, other}. For example, the standard value may be set to 0.2 assuming that an average user views about 20 percent of programs in the genre: "drama" for one week. Since the effect vector of a major item is calculated as relative values, the set value may be any value of 0 to 1. The user side effect vector is relative values between the normalized vector D calculated in step S154 and the set value.

Hence, the effect vector E of the major item Genre Gm indicating genres in which the user has interest is calculated as $$E=(0.3, -0.2, 0.13, 0.08, 0.3, 0.8, 0.3, -0.07, 0.0)$$

It can therefore be determined that the corresponding user likes the genre "child-oriented/education", and does not like the genre "variety".

In step S156, the user information registering unit 63 determines whether or not effect vectors of all the major items are generated. When the user information registering unit 63 determines in step S156 that the effect vectors of all the major items are not generated, the process returns to step S151 to repeat the process from step S151 on down.

When the user information registering unit 63 determines in step S156 that the effect vectors of all the major items are generated, the user information registering unit 63 in step S157 stores the effect vectors of all the major items. Then the process is ended.

Such a process can obtain differences between general preference and preference unique to the user. Further, recalculating the user side effect vector EfUP at intervals of three months or half a year, for example, enables recommendation of programs reflecting the preference of the user in real time.

Figure 22:
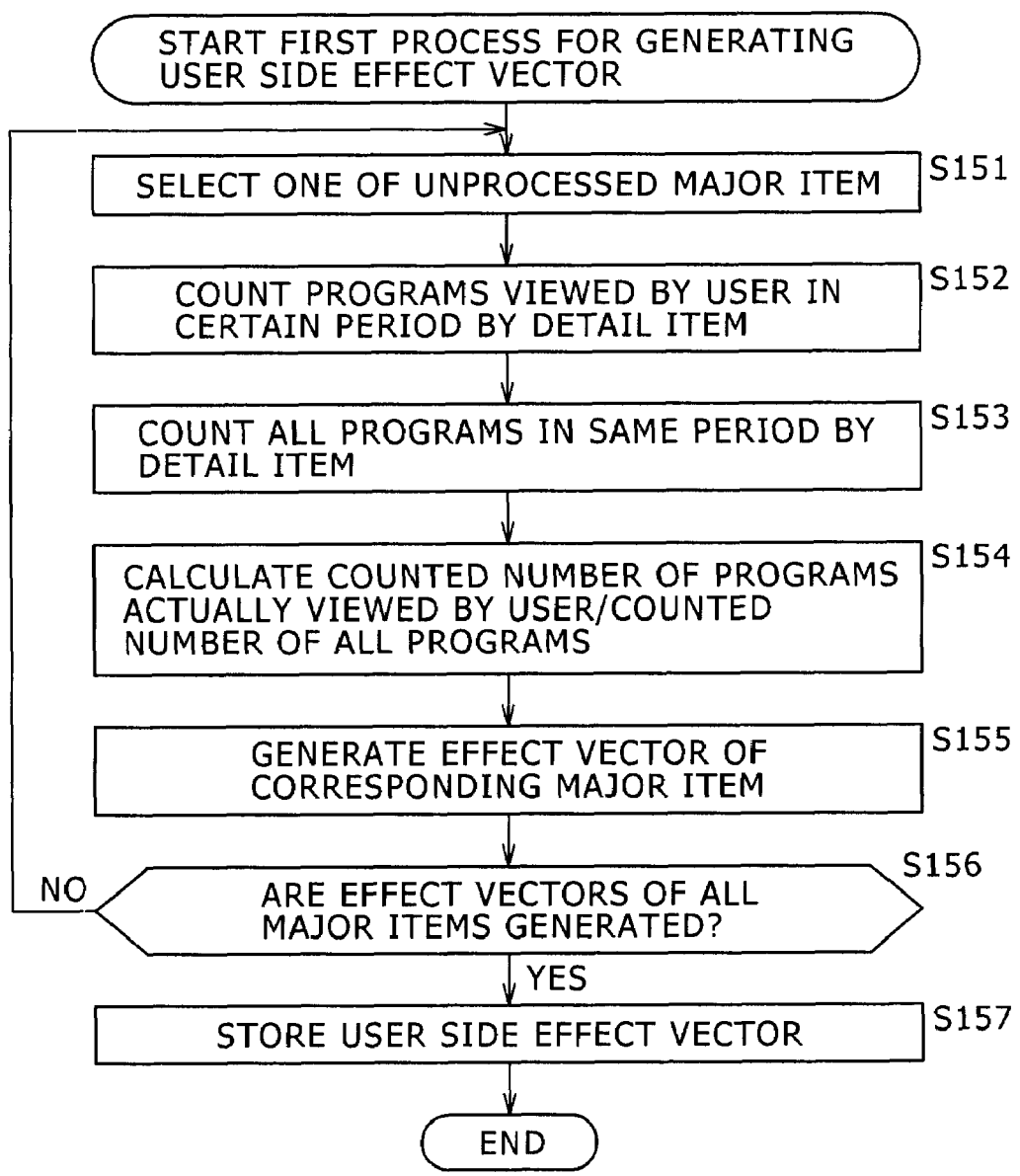
FIG. 22 is a flowchart of assistance in explaining a first process for generating a user side effect vector.

While in the process of FIG. 22, the user side effect vector EfUP is obtained on the basis of programs viewed by the user in a certain period of one week, one month, or three months, for example, user side effect vectors EfUP corresponding to a plurality of periods, for example a short period, a medium period, and a long period may be calculated so that recommendation information is determined using the plurality of effect vectors.

While the above description has been made of a case where the preference unique to the user are used as the user side effect vector EfUP, the preference unique to the user may be used as the positive history vector UP in a matching process.

Instead of all broadcast programs, all programs broadcast in a predetermined time slot (for example a so-called prime time from 18 o'clock to 22 o'clock) in which the viewer views programs most may be counted. This can greatly reduce calculation processing for obtaining general preference.

Figure 23:
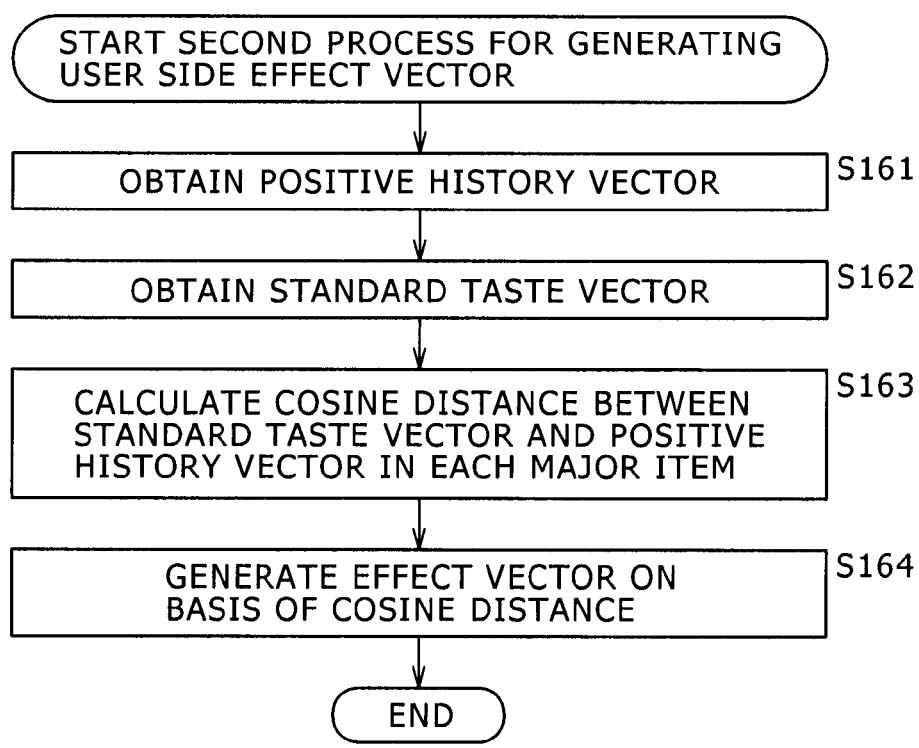
FIG. 23 is a flowchart of assistance in explaining a second process for generating a user side effect vector.

Referring to a flowchart of FIG. 23, description will next be made of a second process for calculating a user side effect vector. The user side effect vector EfUP for using differences between the preference unique to the user and the general preference in matching is obtained by calculating a cosine distance indicating a degree of similarity between the positive history vector UP and the general preference.

In step S161, the user information registering unit 63 in the matching processing unit 43 obtains the positive history vector UP stored in the positive history storing unit 47.

In step S162, the user information registering unit 63 obtains a standard preference vector APP indicating the general preference.

The standard preference vector APP may be supplied from the distribution server 5. Alternatively, since being affected by audience rating competition, programming is considered to reflect preference of the general public. As in the first process for generating a user side effect vector described with reference to FIG. 22, contents of all programs broadcast in a certain period may be counted and normalized as required, to generate the standard preference vector APP.

The distribution server 5 may generate the standard preference vector APP indicating the general preference by using for example a common audience rating survey or another method.

In step S163, the user information registering unit 63 calculates a cosine distance between the standard preference vector APP and the positive history vector UP in each major item. The greater the cosine distance, the higher the degree of similarity between the standard preference vector APP and the positive history vector UP.

In step S164, the user information registering unit 63 inverts the cosine distance in each major item on the basis of the cosine distance calculated in step S163, and thereby generates the effect vector EfUP. Then the process is ended. The larger the inverse number of the cosine distance, the lower the degree of similarity between the standard preference vector APP and the positive history vector UP.

Such a process can obtain the user side effect vector EfUP reflecting difference between the general preference and the preference unique to the corresponding user. When a program recommendation process is performed using the user side effect vector EfUP, a recommended program is determined with emphasis put on the difference between the preference unique to the user and the general preference.

Incidentally, while in the above description, the program vector PP and the positive history vector UP are represented by a vector by major item, it is needless to say that a similar process can be performed when the program vector PP and the positive history vector UP are represented by a vector having all detail elements arranged in one row.

The degree of similarity between the standard preference vector APP and the positive history vector UP may be not only used to calculate the effect vector but also used directly for program recommendation as an index indicating a degree of uniqueness of the user. For example, when the degree of similarity between the standard preference vector APP and the positive history vector UP is high, a new program conforming to a general trend or the like may be preferentially recommended.

While as described with reference to FIG. 22 and FIG. 23, the user side effect vector EfUP is suitably obtained by learning on the basis of a history of user operations, the user side effect vector may be registered in advance as an initial registration, or preset values obtained on the basis of experiences or the like may be used for the user side effect vector.

Incidentally, the user side effect vector EfUP may be not only generated with attention directed to the major items, but also generated with attention directed to the elements constituting the major items. For example, a leading actor and a supporting actor are made distinguishable from each other in the elements "Starring Pm" constituting the major item. A user who gives priority to casting of a supporting actor over a leading actor in a drama or a movie may be able to set the user side effect vector EfUP with a greater weight assigned to a supporting actor than a leading actor. Also, a director, a producer, an original author, a cinematographer, and the like are made distinguishable from each other in the elements "Scriptwriter/Writer/Producer Am" constituting the major item. A user who attaches more importance to a cameraman than a director or a producer may be able to set the user side effect vector EfUP so as to assign a greater weight to a cinematographer.

In addition, the user side effect vector EfUP may be generated by genre so as to produce an effect in matching between the positive history vector UP of a corresponding genre and a program vector PP as in the fifth matching process described with reference to FIG. 21.

Referring to a flowchart of FIG. 24, description will next be made of a third process for generating a user side effect vector. The user side effect vector EfUP is generated by counting programs viewed by the user in a certain period by genre.

In step S171, the user information registering unit 63 in the matching processing unit 43 selects one genre to count programs viewed by the user in a certain period by genre.

In step S172, the user information registering unit 63 selects one of unprocessed major items.

In step S173, the user information registering unit 63 detects programs in the selected genre among programs viewed by the user in a certain period of one week, one month, or three months, for example, referring to the positive history stored in the positive history storing unit 47, makes the program vector extracting unit 42 extract program vectors PP corresponding to the programs in the selected genre among the programs viewed by the user in the certain period from the data obtaining unit 41, and counts the number of programs by detail item included in the major item selected in step S172.

In step S174, the user information registering unit 63 makes the program vector extracting unit 42 extract program vectors PP corresponding to the selected genre among all programs in the same period from the data obtaining unit 41, and then counts the number of programs by detail item included in the major item selected in step S172.

In step S175, the user information registering unit 63 calculates the counted number of the programs actually viewed by the user divided by the counted number of all the programs in the selected genre on the basis of the counting results in step S173 and step S174.

As described above, being affected by audience rating competition, programming is considered to reflect preference of the general public. That is, calculating the counted number of the programs actually viewed by the user divided by the counted number of all the programs in the selected genre is synonymous with normalization of the counted number of the programs actually viewed by the user in the corresponding genre by the counted number of all the programs in the corresponding genre as a standard model. A normalized vector calculated in step S175 will be referred to as a normalized vector D'.

For example, in the major item Time Slot Hm={morning, noon, evening, prime time, midnight} of program vectors PP corresponding to the genre "drama" in the major item Genre Gm={drama, variety, sports, movie, music, child-oriented/education, culture/document, news/report, other}, when the counted number of all programs in one week is (10, 35, 7, 53, 17) while the number of programs viewed by the user is (5, 0, 0, 8, 4), the normalized vector D' is as follows.

D'=(5/10, 0/35, 0/7, 8/53, 4/17)=(0.5, 0, 0, 0.15, 0.24)

That is, an element of 1.0 in the normalized vector D' indicates that all programs in the corresponding item are viewed in the set period, and an element of 0 in the normalized vector D' indicates that no corresponding programs are viewed in the set period.

In step S176, the user information registering unit 63 generates an effect vector of the corresponding major item in the selected genre on the basis of a result of the calculation in step S175.

In order to generate the effect vector, a standard value is set using one item in the major item Time Slot Hm={morning, noon, evening, prime time, midnight}. For example, the standard value may be set to 0.2 assuming that an average user views about 20 percent of dramas in the time slot: "prime time" for one week. Since the effect vector of a major item is calculated as relative values, the set value may be any value of 0 to 1. The user side effect vector is relative values between the normalized vector D' calculated in step S175 and the set value.

Hence, the effect vector E', which vector indicates genres in which the user has interest, of the major item Time Slot Tm is calculated as

E'=(0.3, −0.2, −0.2, −0.05, 0.04)

It can therefore be determined that the corresponding user likes dramas in the morning time slot, and does not like dramas in the noon and the evening time slot.

In step S177, the user information registering unit 63 determines whether or not effect vectors of all the major items are generated in the selected genre. When the user information registering unit 63 determines in step S177 that the effect vectors of all the major items are not generated, the process returns to step S172 to repeat the process from step S172 on down.

When the user information registering unit 63 determines in step S177 that the effect vectors of all the major items are generated, the user information registering unit 63 in step S178 determines whether or not the process is completed in all genres. When the user information registering unit 63 determines in step S178 that the process is not completed in all the genres, the process returns to step S171 to repeat the process from step S171 on down.

When the user information registering unit 63 determines in step S178 that the process is completed in all the genres, the user information registering unit 63 in step S179 stores the effect vectors of all the major items. Then the process is ended.

Such a process can obtain differences between general preference and preference unique to the user by genre. Further, as in the description with reference to FIG. 22, recalculating the user side effect vector Erupt at intervals of three months or half a year, for example, enables recommendation of programs reflecting the preference of the user in real time.

Figure 24:
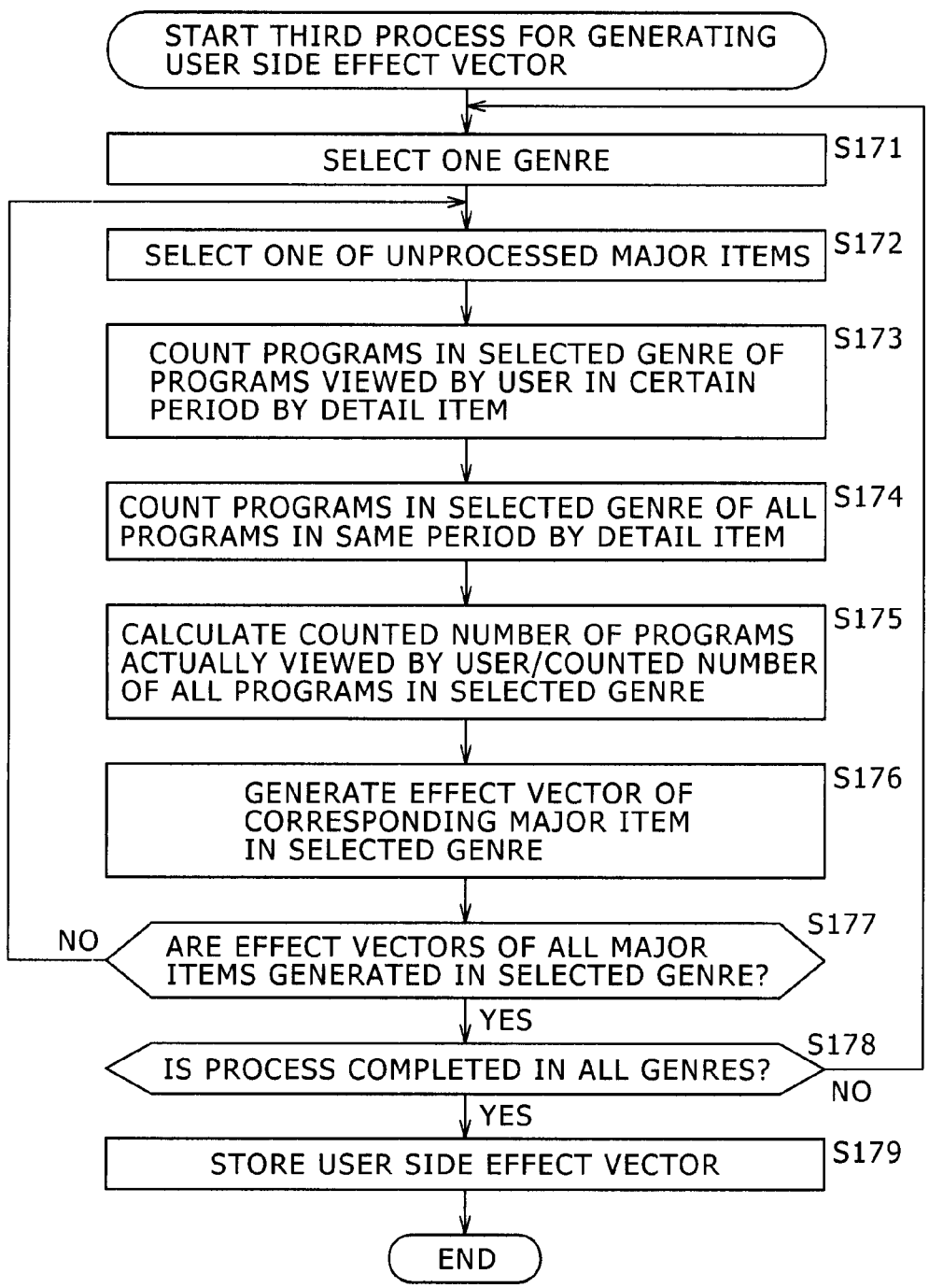
FIG. 24 is a flowchart of assistance in explaining a third process for generating a user side effect vector.

While also in the process of FIG. 24, the user side effect vector EfUP is obtained on the basis of programs viewed by the user in a certain period of one week, one month, or three months, for example, as in the description with reference to FIG. 22, user side effect vectors EfUP corresponding to a plurality of periods, for example a short period, a medium period, and a long period may be calculated so that recommendation information is determined using the plurality of effect vectors.

Also in the process of FIG. 24, instead of all broadcast programs, all programs broadcast in a predetermined time slot (for example a so-called prime time from 18 o'clock to 22 o'clock) in which the viewer views programs most may be counted.

Figure 25:
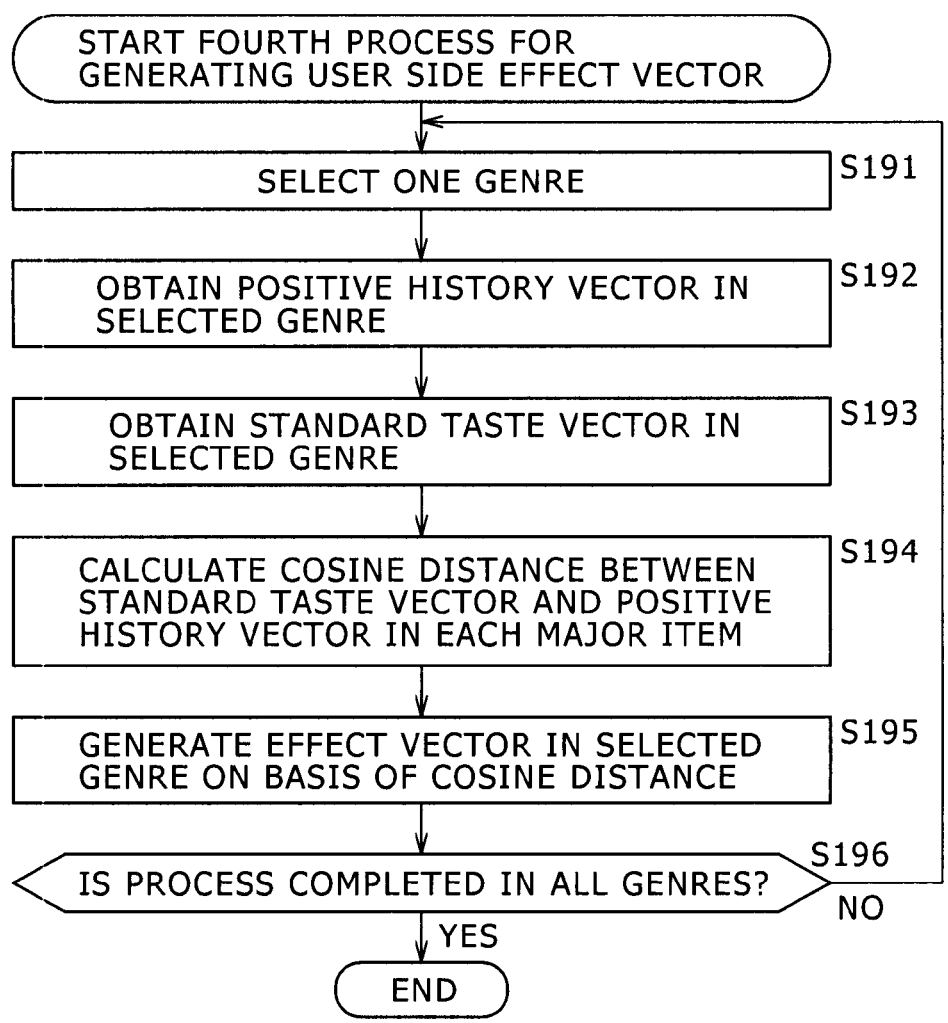
FIG. 25 is a flowchart of assistance in explaining a fourth process for generating a user side effect vector.

Referring to a flowchart of FIG. 25, description will next be made of a fourth process for calculating a user side effect vector in which process the user side effect vector EfUP for using differences between preference unique to the user and general preference in matching is obtained by calculating a cosine distance indicating a degree of similarity between the positive history vector UP and the general preference by genre.

In step S191, the user information registering unit 63 in the matching processing unit 43 selects one genre to specify the genre in which to perform the process.

In step S192, the user information registering unit 63 obtains a positive history vector UP of the selected genre among positive history vectors UP stored in the positive history storing unit 47.

In step S193, the user information registering unit 63 obtains a standard preference vector APP of the selected genre among standard preference vectors APP indicating the general preference.

As described above, the standard preference vector APP may be supplied from the distribution server 5. Alternatively, since being affected by audience rating competition, programming is considered to reflect preference of the general public, as in the third process for generating a user side effect vector which process is described with reference to FIG. 24, contents of all programs broadcast in a certain period may be counted by genre and normalized as required, to generate the standard preference vector APP by genre.

The distribution server 5 may generate the standard preference vector APP indicating the general preference by genre by using for example a common audience rating survey or another method.

Using the positive history vector UP of the selected genre and the standard preference vector APP of the selected genre, the user information registering unit 63 in step S194 calculates a cosine distance between the standard preference vector APP and the positive history vector UP in each major item. The greater the cosine distance, the higher the degree of similarity between the standard preference vector APP and the positive history vector UP.

In step S195, the user information registering unit 63 inverts the cosine distance in each major item on the basis of the cosine distance calculated in step S194, and thereby generates the effect vector EfUP in the selected genre. The larger the inverse number of the cosine distance, the lower the degree of similarity between the standard preference vector APP and the positive history vector UP.

In step S178, the user information registering unit 63 determines whether or not the process is completed in all genres. When the user information registering unit 63 determines in step S178 that the process is not completed in all the genres, the process returns to step S191 to repeat the process from step S191 on down. When the user information registering unit 63 determines in step S196 that the process is completed in all the genres, the process is ended.

Such a process can obtain the user side effect vector EfUP by genre reflecting difference between the general preference and the preference unique to the corresponding user.

Further, as in the process described with reference to FIG. 23, a degree of similarity between the standard preference vector APP and the negative history vector MUP is obtained, and an inverse number of the degree of similarity may be calculated as the counter effect vector EfMUP.

Figure 26:
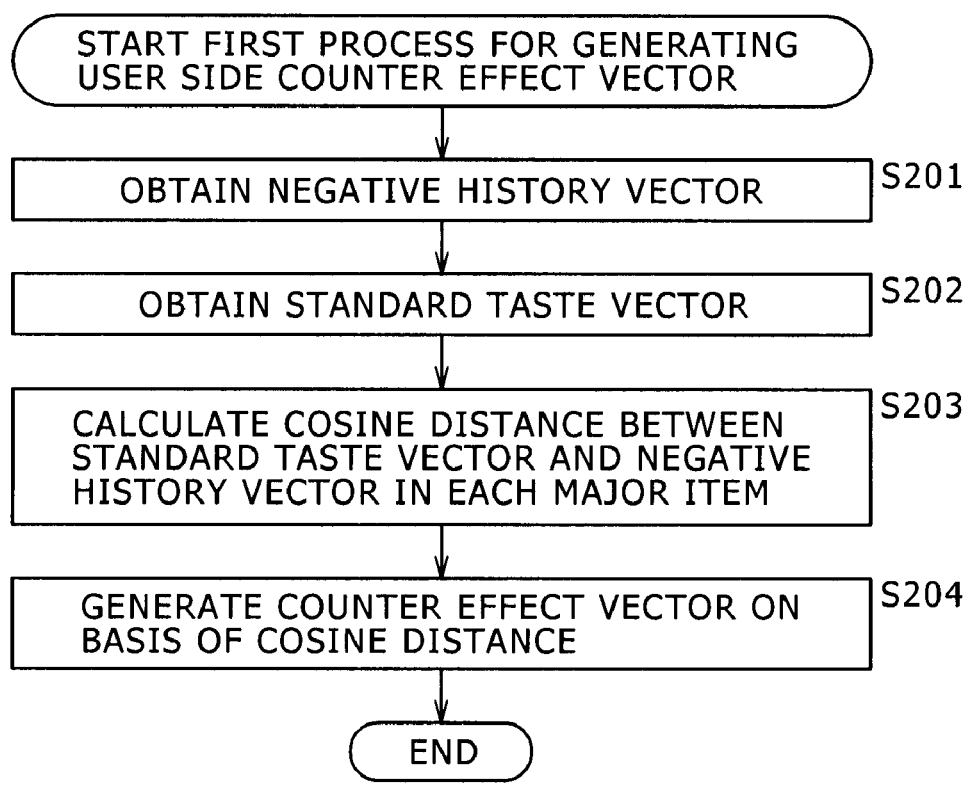
FIG. 26 is a flowchart of assistance in explaining a first process for generating a user side counter effect vector.

Referring to a flowchart of FIG. 26, description will next be made of a first process for calculating a user side counter effect vector in which process the counter effect vector EfMUP is obtained by comparing the negative history vector MUP with the general preference.

In step S201, the user information registering unit 63 in the matching processing unit 43 obtains the negative history vector MUP stored in the negative history storing unit 48.

In step S202, the user information registering unit 63 obtains a standard preference vector APP indicating the general preference.

The standard preference vector APP may be supplied from the distribution server 5. Alternatively, since being affected by audience rating competition, programming is considered to reflect preference of the general public, as in the first process for generating a user side effect vector which process is described with reference to FIG. 22, contents of all programs broadcast in a certain period may be counted and normalized as required, to generate the standard preference vector APP.

In step S203, the user information registering unit 63 calculates a cosine distance between the standard preference vector APP and the negative history vector MUP in each major item. The greater the cosine distance, the higher the degree of similarity between the standard preference vector APP and the negative history vector MUP.

In step S204, the user information registering unit 63 inverts the cosine distance in each major item on the basis of the cosine distance calculated in step S163, and thereby generates the counter effect vector EfMUP. Then the process is ended.

Such a process can generate the counter effect vector EfMUP, so that programs that the user does not like can be effectively excluded from recommended programs.

Figure 27:
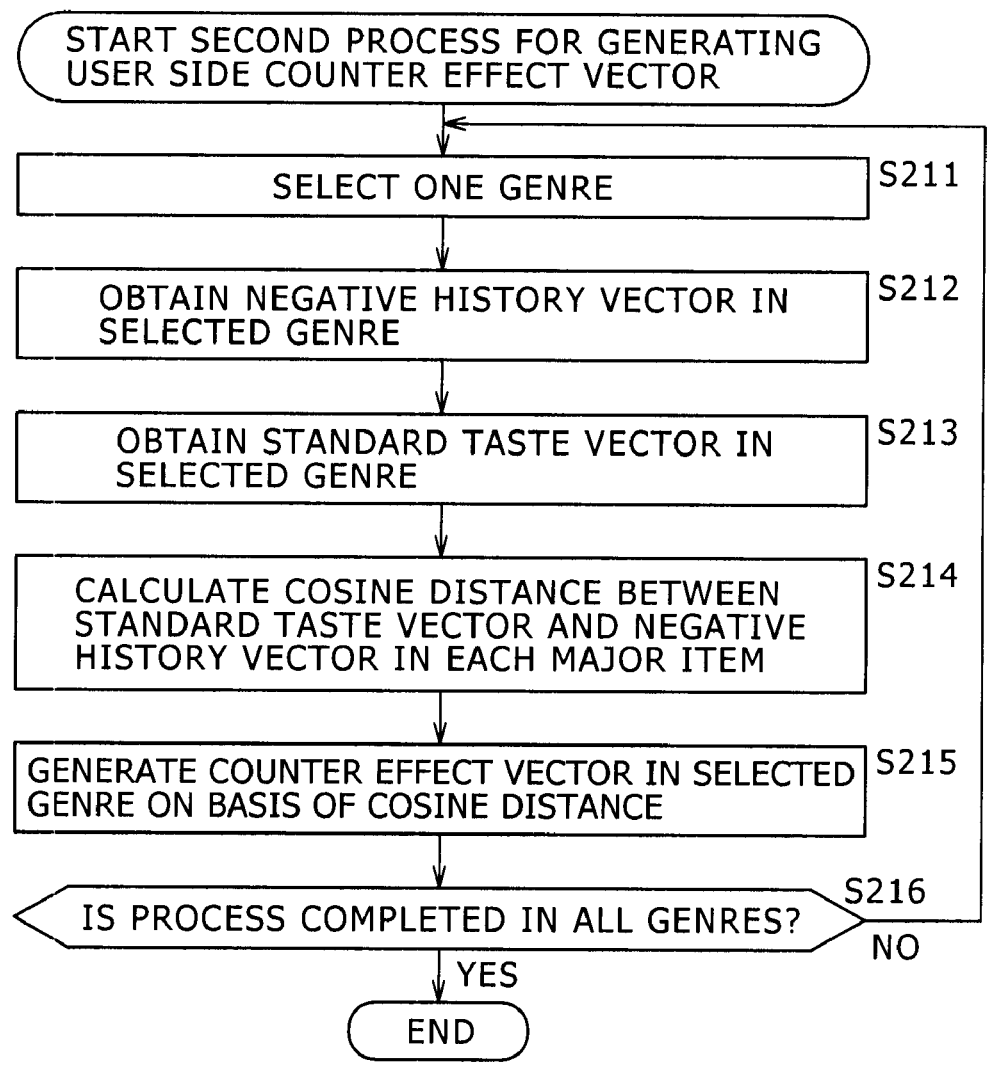
FIG. 27 is a flowchart of assistance in explaining a second process for generating a user side counter effect vector.

Referring to a flowchart of FIG. 27, description will next be made of a second process for calculating a user side counter effect vector which process is performed by genre.

In step S211, the user information registering unit 63 in the matching processing unit 43 selects one genre to specify the genre in which to perform the process.

In step S212, the user information registering unit 63 obtains a negative history vector MUP of the selected genre among negative history vectors MUP stored in the negative history storing unit 48.

In step S213, the user information registering unit 63 obtains a standard preference vector APP of the selected genre among standard preference vectors APP indicating the general preference.

On the basis of the negative history vector MUP of the selected genre and the standard preference vector APP of the selected genre, the user information registering unit 63 in step S214 calculates a cosine distance between the standard preference vector APP and the negative history vector MUP in each major item. The greater the cosine distance, the higher the degree of similarity between the standard preference vector APP and the negative history vector MUP.

In step S215, the user information registering unit 63 inverts the cosine distance in each major item on the basis of the cosine distance calculated in step S214, and thereby generates the counter effect vector EfMUP. The larger the inverse number of the cosine distance, the lower the degree of similarity between the standard preference vector APP and the negative history vector MUP.

In step S216, the user information registering unit 63 determines whether or not the process is completed in all genres. When the user information registering unit 63 determines in step S216 that the process is not completed in all the genres, the process returns to step S211 to repeat the process from step S211 on down. When the user information registering unit 63 determines in step S216 that the process is completed in all the genres, the process is ended.

Such a process can generate the counter effect vector EfMUP by genre, so that programs that the user does not like can be effectively excluded from recommended programs.

Incidentally, the user side effect vector EfUP and the user side counter effect vector EfMUP may use a value obtained by multiplying the inverse number of the cosine distance in each major item described with reference to FIG. 23 and FIGS. 25 to 27 by n, or a value obtained by rounding off the inverse number of the cosine distance to a predetermined place, or may use a value obtained by subtracting the inverse number of the cosine distance from one, or a value obtained by multiplying that value by n.

Incidentally, while in the above description, the program vector PP and the negative history vector MUP are represented by a vector by major item, it is needless to say that a similar process can be performed when the program vector PP and the negative history vector MUP are represented by a vector having all detail elements arranged in one row.

Information indicating a group, such as a group ID or a cluster code, which information is generated by the process described with reference to FIG. 7 or FIG. 8 can be added to a program vector extracted by the program vector extracting unit 42.

For example, in a case where a program that a user likes viewing is a serial drama, when all installments of the serial drama are recommended, operation processing for recommendation can be reduced. The operation processing for recommendation can also be reduced by preferentially recommending a program in the same group as a program that the user likes very much.

Figure 28:
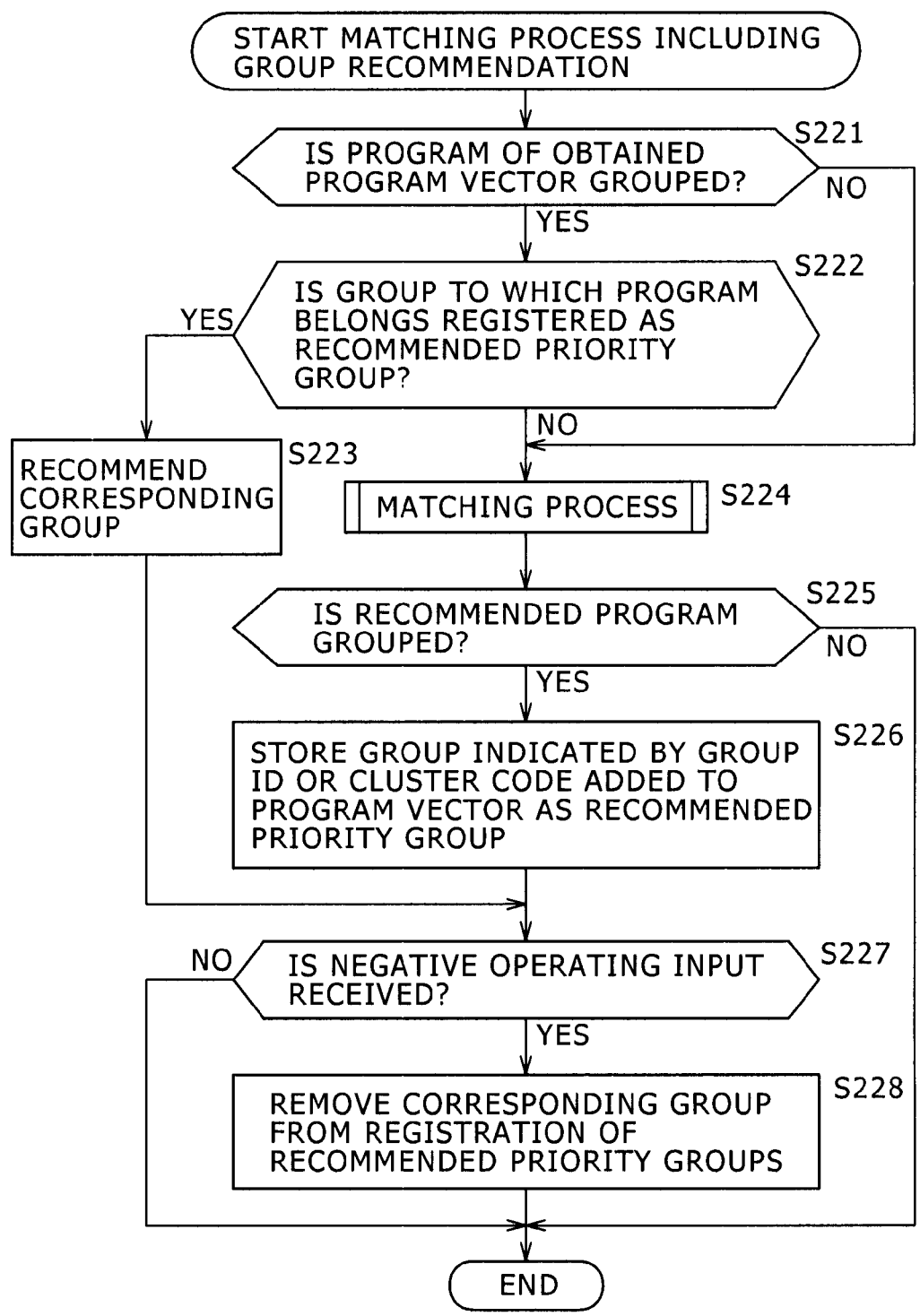
FIG. 28 is a flowchart of assistance in explaining a matching process including group recommendation.

A matching process including group recommendation will next be described with reference to a flowchart of FIG. 28.

In step S221, on the basis of whether or not information indicating a group, such as a group ID or a cluster code, is added to a program vector extracted by the program vector extracting unit 42, the vector operation unit 62 in the matching processing unit 43 determines whether or not the corresponding program is grouped.

When the vector operation unit 62 determines in step S221 that the corresponding program is grouped, the vector operation unit 62 in step S222 determines whether the group indicated by the group ID or the cluster code is registered as a recommended priority group in the user information registering unit 63.

When the vector operation unit 62 determines in step S222 that the group indicated by the group ID or the cluster code is registered as a recommended priority group, the vector operation unit 62 in step S223 supplies information on the corresponding program as recommendation information to the recommendation information outputting unit 49. The recommendation information outputting unit 49 registers the recommended program in the recommended program list 50, and outputs the information on the recommended program to the television display device 11 or the recording and reproducing device 12. The process proceeds to step S227 to be described later.

When the vector operation unit 62 determines in step S221 that the corresponding program is not grouped, or when the vector operation unit 62 determines in step S222 that the group indicated by the group ID or the cluster code is not registered as a recommended priority group, one of the first to fifth matching processes described with reference to FIGS. 17 to 21 is performed in step S224.

In step S225, on the basis of whether information indicating a group, such as a group ID or a cluster code, is added to a program vector of a program recommended in one of the first to third matching processes that is performed in step S224, the vector operation unit 62 determines whether or not the recommended program is grouped. When the vector operation unit 62 determines in step S225 that the recommended program is not grouped, the process is ended.

When the vector operation unit 62 determines in step S225 that the recommended program is grouped, the vector operation unit 62 in step S226 registers and stores the group ID or the cluster code added to the program vector as a recommended priority group in the user information registering unit 63.

After completion of the process of step S223 or step S226, the vector operation unit 62 in step S227 refers to negative history operation logs stored in the negative history storing unit 48, and thereby determines whether or not an operating input that becomes a negative history, such for example as an operating input for giving a command to view or record another program without accepting the recommended program or an operating input for giving a command to erase the program recorded automatically before reproduction is received for the program recommended by the process of step S223 or the program registered as the recommended priority group in the process of step S226 because the program is grouped among programs recommended by the process of step S224. When the vector operation unit 62 determines in step S227 that an operating input that becomes a negative history is not received, the process is ended.

When the vector operation unit 62 determines in step S227 that an operating input that becomes a negative history is received, the vector operation unit 62 in step S228 removes the corresponding group from the registration of recommended priority groups in the user information registering unit 63. Then the process is ended.

Incidentally, as a result of the first title grouping process described with reference to FIG. 9, a plurality of group IDs may be associated with one program vector PP. In such a case, in particular, in step S228, all the group IDs may be removed from the registration of recommended priority groups in the user information registering unit 63 in response to a negative history operation input, or the number of negative history operation inputs may be accumulated and when a predetermined number of negative history operation inputs are performed, a corresponding group ID may be removed from the registration of recommended priority groups in the user information registering unit 63. The same applies to a case where one group ID is associated with one program vector PP.

Such a process can recommend all installments of a serial drama that the user likes to view and recommend a program in the same group as a program that the user likes very much. Therefore operation processing for recommendation can be reduced.

When the matching process including group recommendation is thus performed, the positive history vector UP and the negative history vector MUP generated on the basis of histories of user operations which histories are obtained from the television display device 11 or the recording and reproducing device 12 may be generated by corresponding group.

Also, the number of times of viewing or programmed recording of a same serial drama may be counted on the basis of a positive history of the histories of user operations which histories are obtained from the television display device 11 or the recording and reproducing device 12, and when the number of times of viewing or programmed recording of the same serial drama equals or exceeds a predetermined number, preferential recommendation may be made without any particular matching process being performed.

In addition, instead of a program recommendation process using a history of a user, a program recommendation process may be performed on the basis of a user model set on the basis of a topic specified in advance by the user.

The user model is obtained by extracting programs corresponding to the topic specified in advance by the user from a predetermined group of programs by filtering using the topic. The initial registration storing unit 45 stores the topic input by the user. A plurality of topics may be registered, and the topic is updated as required by an operating input by the user. The vector operation unit 62 extracts program vectors including the topic stored in the initial registration storing unit 45 in program vectors of programs from which to create a user model which program vectors are supplied from the program vector extracting unit 42. The vector operation unit 62 normalizes a sum of the extracted program vectors as required. The vector operation unit 62 thereby generates a user model vector. The vector operation unit 62 registers the user model vector in the user information registering unit 63.

Thus, when Time Slot Hm="after 23 o'clock" and Genre Gm="variety" are specified as topics, for example, filtering is performed using these topics, and a user model "midnight variety" is generated. Since the user model "midnight variety" includes, as an element, a comedian who appeared in a variety program broadcast in a midnight slot after 23 o'clock, a program in which the corresponding comedian appears in a genre different from variety shows, such for example as dramas, is extracted and recommended in a matching process. Hence, as compared with a matching process performed by item, it is possible to apply preference of the user beyond a genre or the like.

Incidentally, programs from which to create a user model may be for example all programs in a predetermined period of time or a group of programs broadcast in a predetermined time slot (for example a so-called prime time).

Also, by filtering different sets of programs using the same filtering condition, for example, it is possible to generate user model vectors corresponding in detail to different programmings in different times or different time slots, for example.

Specifically, programming at the present time and programming 10 years ago are different in terms of broadcast times and starring even under the same condition of "Genre Gm=music". Therefore different user models of a "music fan at the present time" and a "music fan 10 years ago" can be generated. It is thereby possible to recommend a drama or a movie in which a pop singer that the "music fan 10 years ago" liked listening to now appears as an actor, or recommend a program in which a musical piece that the "music fan 10 years ago" liked listening to is sung by a singer of the present time.

In addition, different program groups can be obtained from for example a time slot from 20 o'clock to 24 o'clock mainly for viewing by workers and a time slot from 15 o'clock to 20 o'clock mainly for viewing by children by filtering even under the same condition of "Genre Gm=music", so that different user models can be generated.

Then, the vector operation unit 62 calculates a degree of similarity between a program vector PP of a program which vector is supplied from the program vector extracting unit 42 and the user model vector registered in the user information registering unit 63. The vector operation unit 62 generates recommendation information on the basis of a result of the calculation. The vector operation unit 62 then supplies the recommendation information to the recommendation information outputting unit 49. The recommendation information outputting unit 49 registers the recommendation information in the recommended program list 50, and supplies the recommendation information to the television display device 11 or the recording and reproducing device 12.

Figure 29:
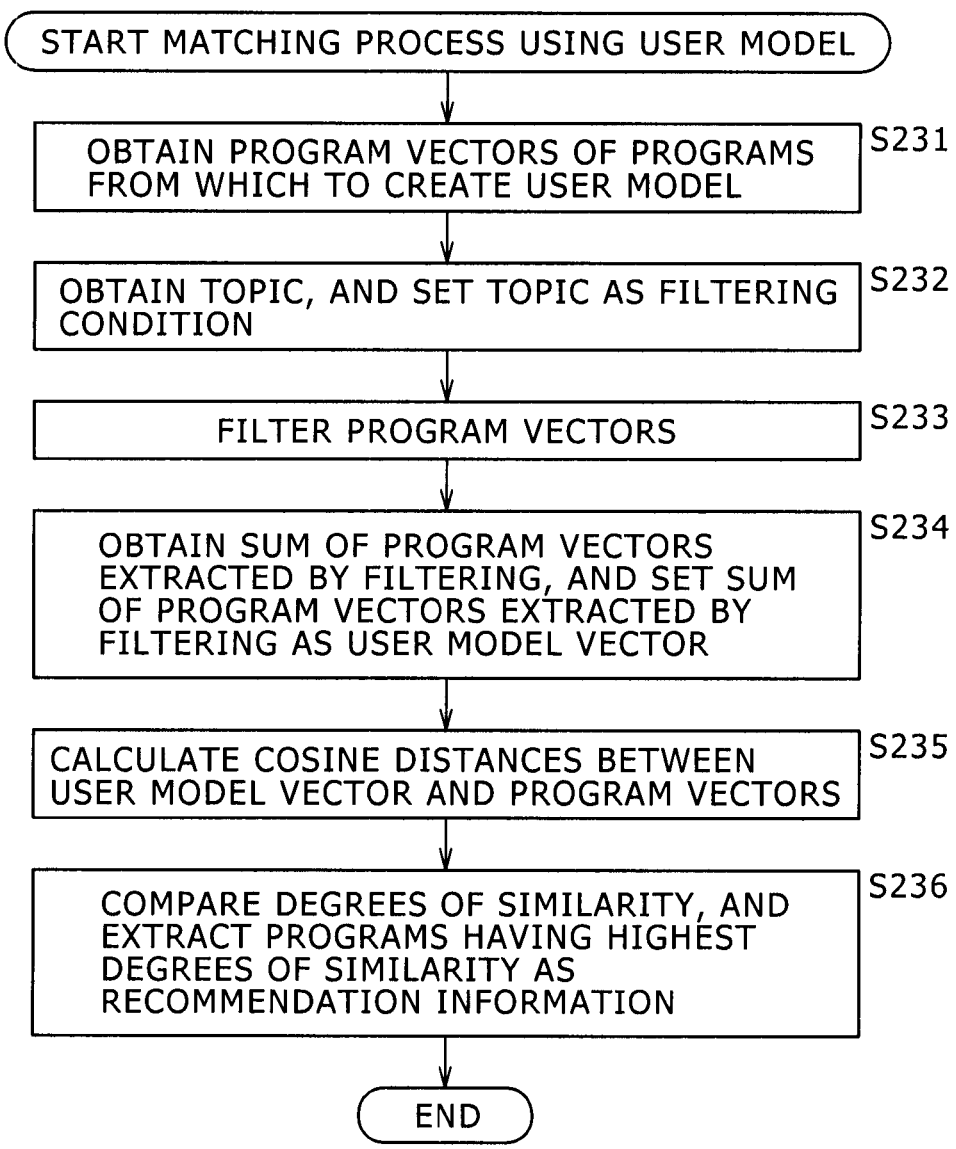
FIG. 29 is a flowchart of assistance in explaining a matching process using a user model.

A matching process using a user model will next be described with reference to a flowchart of FIG. 29.

In step S231, the vector operation unit 62 in the matching processing unit 43 obtains program vectors of programs from which to create a user model which vectors are extracted by the program vector extracting unit 42. The programs from which to create a user model may be for example programs broadcast in a predetermined period of one month or three months, or programs broadcast in a predetermined time slot (for example a prime time) in the predetermined period, or may be programs broadcast in a predetermined past period of 10 years ago, 20 years ago, or the like.

In step S232, the initial registration storing unit 45 obtains a topic input by the user from the operating input unit 44, and stores the topic. The vector operation unit 62 reads the topic from the initial registration storing unit 45, and then sets the topic as a filtering condition. The filtering condition may be described as a hash table, for example.

In step S233, the vector operation unit 62 filters the program vectors PP obtained in step S231 on the basis of the filtering condition set in step S232, and thereby extracts program vectors PP matching the topic. For example, when the programs from which to create a user model are all programs in the past three months, the vector operation unit 62 filters all the programs in the past three months with a condition of "Title Tm or Genre Gm=soccer".

In step S234, the vector operation unit 62 obtains a sum of the program vectors PP extracted by filtering in step S233, and sets the sum as a user model vector. For example, when filtering is performed with the condition of "Title Tm or Genre Gm=soccer", a user model vector of a user model of a "soccer fan" is generated.

In step S235, the vector operation unit 62 calculates cosine distances between the user model vector generated in step S234 and program vectors PP of programs as candidates for obtaining recommendation information (scheduled to be broadcast hereafter), the program vectors PP being extracted from the program vector extracting unit 42.

In step S236, the vector operation unit 62 compares the user model vector with the program vectors PP of the programs as candidates for obtaining recommendation information on the basis of the cosine distances calculated in step S235, and extracts a predetermined number of programs having highest degrees of similarity as recommendation information on the basis of a result of the comparison. The vector operation unit 62 supplies the recommendation information to the recommendation information outputting unit 49. The recommendation information outputting unit 49 registers the recommendation information in the recommended program list 50, and supplies the recommendation information to the television display device 11 or the recording and reproducing device 12. Then the process is ended.

Such a process can recommend programs matching the topic set by the user even when there is no history of user operations. Conventionally, when a matching process is performed after setting a condition of "Title Tm or Genre Gm=soccer", for example, a variety show, a drama or the like in which a soccer player appears cannot be extracted. On the other hand, in the process described with reference to FIG. 29, since setting a user model with the topic of "Title Tm or Genre Gm=soccer" results in inclusion of many soccer player names also in items such as starring and contents in the user model vector, a variety show, a drama or the like in which a soccer player appears can be extracted and recommended even when the program does not match the condition of "Title Tm or Genre Gm=soccer".

While in the above description, the degrees of similarity are obtained by calculating the cosine distances between the user model vector and the program vectors, a cosine distance may be calculated individually in each major item, and a degree of similarity may be obtained by using a sum of the cosine distances.

Incidentally, the process of generating a user model vector may be performed in the distribution server 5. In this case, it suffices to perform the process of steps S231 to S234 in FIG. 29 using program vectors generated by the program vector generating unit 23 described with reference to FIG. 2, for example.

Further, besides recommending programs suiting the preference of the user, selection of programs having low degrees of similarity to both the positive history vector UP and the negative history vector MUP increases a possibility of recommending programs that the user neither likes nor dislikes, that is, programs having characteristics that the user has not seen before, or recommending programs that the user dislikes without having viewed them. For progress in learning by extracting the preference of the user, it is important that the user evaluate programs having characteristics that the user has not seen before.

This makes it possible not only to give unexpectedness to a recommendation result provided to the user and broaden interests of the user but also to obtain very important history information for recommending programs suiting the preference of the user more.

Figure 30:
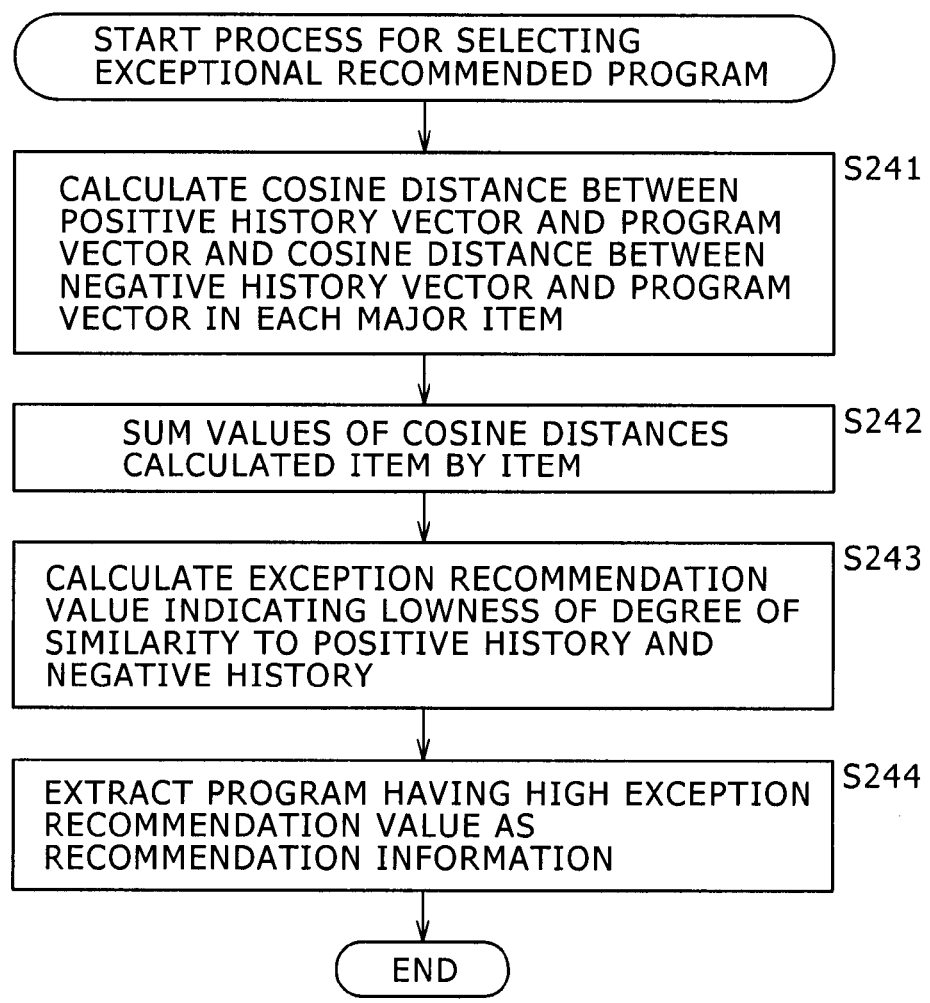
FIG. 30 is a flowchart of assistance in explaining an exception recommendation process.

A process for selecting an exceptional recommended program will next be described with reference to a flowchart of FIG. 30.

In step S241, using a program vector PP supplied from the program vector extracting unit 42, the positive history vector UP stored in the positive history storing unit 47, and the negative history vector MUP stored in the negative history storing unit 48, the vector operation unit 62 in the matching processing unit 43 calculates a cosine distance between the positive history vector UP and the program vector PP and a cosine distance between the negative history vector MUP and the program vector PP in each major item.

In step S242, the vector operation unit 62 sums values of the cosine distances calculated by items on each of a positive history side and a negative history side. That is, a degree of similarity SimMUP between the positive history vector UP and the program vector PP and a degree of similarity SimMUP between the negative history vector MUP and the program vector PP as described above are calculated by the process of step S241 and step S242.

In step S243, the vector operation unit 62 calculates an exception recommendation value indicating lowness of the degrees of similarity to the positive history vector UP and the negative history vector MUP.

Specifically, the exception recommendation value can be obtained by $(1-\text{SimUP}) \times (1-\text{SimMUP})$ or $(1/\text{SimUP}) \times (1/\text{SimMUP})$.

In step S244, the vector operation unit 62 obtains programs having high exception recommendation values on the basis of results of the calculation in step S243, and thus extracts the programs having high exception recommendation values as recommendation information. Then the process is ended.

Such a process can extract and recommend programs having characteristics that the user has not seen before. It is therefore possible not only to give unexpectedness to selection of programs recommended to the user and broaden interests of the user but also to obtain very important history information for recommending programs suiting the preference of the user more.

Recommendation information is generated in the program recommendation processing device 10 by the processes described with reference to FIGS. 13 to 30, and then supplied to the television display device 11 or the recording and reproducing device 12.

The television display device 11 or the recording and reproducing device 12 is supplied with a satellite wave or terrestrial wave broadcast signal received and decoded by the television receiving device 4.

The television display device 11 displays a broadcast signal supplied from the television receiving device 4 or reproduced data supplied from the recording and reproducing device 12 on the basis of operation input by the user, and displays recommended program information or automatically sets a channel on the basis of the recommendation information supplied from the recording and reproducing device 12. Further, the television display device 11 supplies an operation log to the program recommendation processing device 10.

The recording and reproducing device 12 records or programs recording of a broadcast signal supplied from the television receiving device 4 on the basis of operation input by the user, and automatically records a program on the basis of the recommendation information supplied from the program recommendation processing device 10. Also, the recording and reproducing device 12 reproduces a program recorded on a recording medium loaded in the recording and reproducing device 12 or a recording medium included in the recording and reproducing device 12, and then outputs the program to the television display device 11 for display. Further, the recording and reproducing device 12 supplies an operation log to the program recommendation processing device 10.

Figure 31:
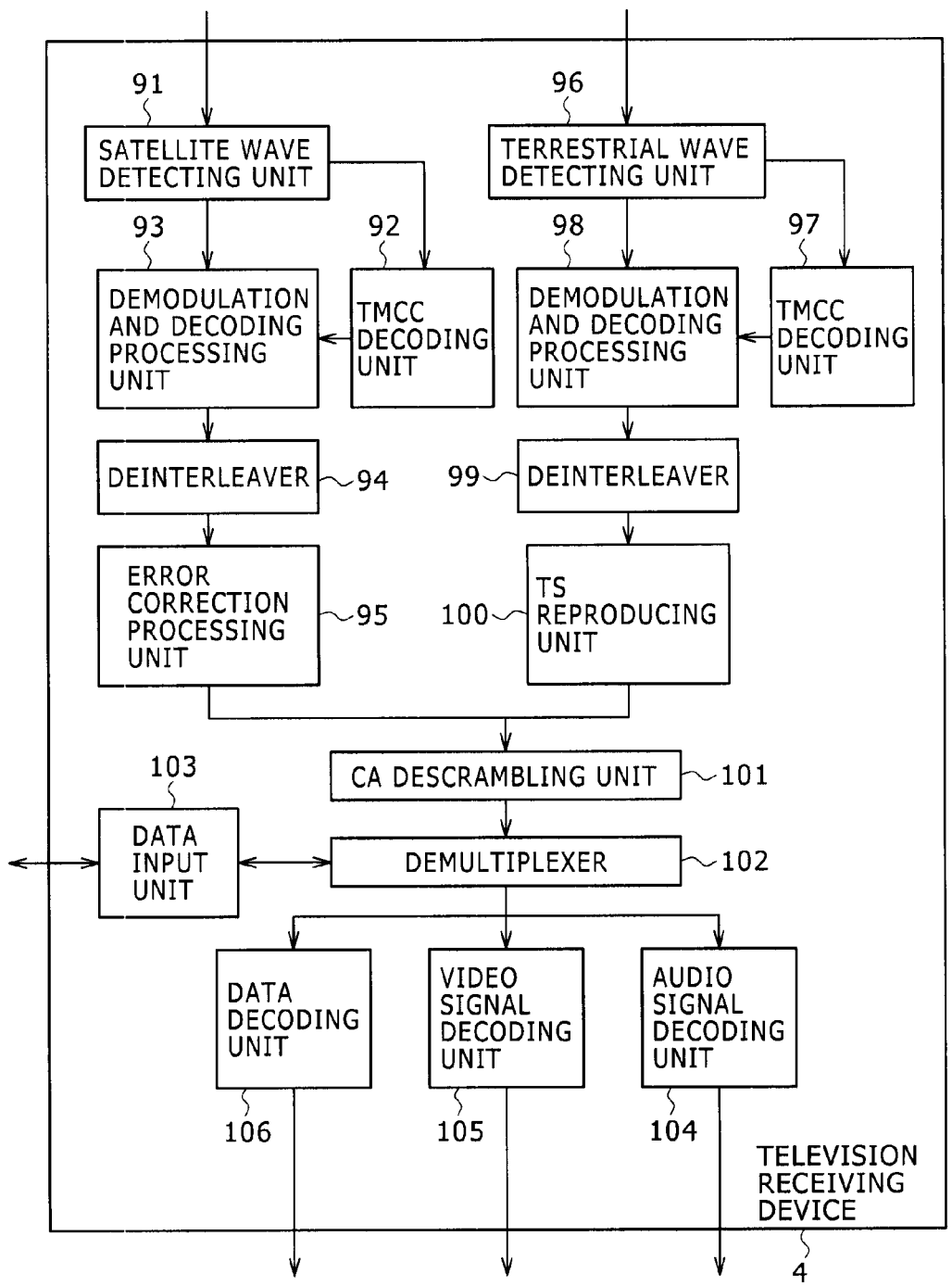
FIG. 31 is a block diagram showing a configuration of a television receiving device in FIG. 1.

FIG. 31 is a block diagram showing a configuration of the television receiving device 4. Description will be made supposing that the television receiving device 4 is a general receiving device supporting standards for receiving devices for digital broadcasting.

A satellite wave detecting unit 91 selects and detects a satellite wave transmitted via the satellite 2 and received by the antenna 3 on the basis of a signal for selecting a channel which signal is supplied from the television display device 11 or the recording and reproducing device 12. The satellite wave detecting unit 91 supplies a control signal related to a transmission mode to a TMCC (Transmission and Multiplexing Configuration Control) decoding unit 92, and supplies a broadcast signal to a demodulation and decoding processing unit 93.

The TMCC decoding unit 92 receives input of information on the transmission mode (a modulation system, a coding rate and the like), slots and the like in the transmission and multiplexing control signal, decodes the information, and then supplies the decoded information to the demodulation and decoding processing unit 93.

The demodulation and decoding processing unit 93 demodulates and decodes the supplied broadcast signal by a method of for example a QPSK (quadri-phase shift keying, or referred to also as 4PSK) system or an 8PSK system on the basis of the information on the transmission mode which information is supplied from the TMCC decoding unit 92. The demodulation and decoding processing unit 93 supplies the demodulated and decoded signal to a deinterleaver 94.

The deinterleaver 94 deinterleaves the supplied signal, and then supplies the deinterleaved signal to an error correction processing unit 95. The deinterleaver 94 may further subject the supplied signal to a frame separation and a descrambling process.

The error correction processing unit 95 performs error correction processing using a Reed-Solomon code, for example, and then supplies the result to a CA (Conditional Access) descrambling unit 101.

A terrestrial wave detecting unit 96 selects and detects a terrestrial wave received by the antenna 3 on the basis of a control signal for selecting a channel which signal is supplied from the television display device 11 or the recording and reproducing device 12. The terrestrial wave detecting unit 96 supplies a control signal related to a transmission mode to a TMCC decoding unit 97, and supplies a broadcast signal to a demodulation and decoding processing unit 98.

The TMCC decoding unit 97 receives input of information on the transmission mode (a modulation system, a coding rate and the like), slots, TS and the like in the transmission and multiplexing control signal, decodes the information, and then supplies the decoded information to the demodulation and decoding processing unit 98.

The demodulation and decoding processing unit 98 demodulates and decodes the supplied broadcast signal by a method of for example a QAM (quadrature amplitude modulation) system on the basis of the information on the transmission mode which information is supplied from the TMCC decoding unit 97. The demodulation and decoding processing unit 93 supplies the demodulated and decoded signal to a deinterleaver 99.

The deinterleaver 99 deinterleaves the supplied signal, and then supplies the deinterleaved signal to a TS (Transport Stream) reproducing unit 100. The deinterleaver 99 may further subject the supplied signal to a frame separation and a descrambling process.

The TS reproducing unit 100 reproduces a transport stream on the basis of the supplied signal, and then supplies the reproduced transport stream to the CA descrambling unit 101.

The CA descrambling unit 101 descrambles a conditional access signal on the basis of the signal supplied from the error correction processing unit 95 or the TS reproducing unit 100, and then supplies the descrambled signal to a demultiplexer 102.

A data input unit 103 receives EPG data input from the EPG receiving device 9, and receives streaming data supplied from the distribution server 5 via the network 8. The data input unit 103 supplies the data to the demultiplexer 102.

The demultiplexer 102 demultiplexes the signal supplied from the CA descrambling unit 101 or the data input unit 103. The demultiplexer 102 supplies an audio signal to an audio signal decoding unit 104, a video signal to a video signal decoding unit 105, and a control signal and data such as an EPG and the like to a data decoding unit 106.

The audio signal decoding unit 104 decodes the supplied audio signal, and then supplies the decoded audio signal to the television display device 11 or the recording and reproducing device 12. The video signal decoding unit 105 decodes the supplied video signal, and then supplies the decoded video signal to the television display device 11 or the recording and reproducing device 12. The data decoding unit 106 decodes the supplied control signal and data such as an EPG and the like, and then supplies the decoded control signal and data to the television display device 11 or the recording and reproducing device 12.

As a result of processing by the television receiving device 4, the received satellite wave or terrestrial wave, or the distributed streaming data is demodulated and decoded by the predetermined method, and then supplied to the television display device 11 or the recording and reproducing device 12.

Figure 32:
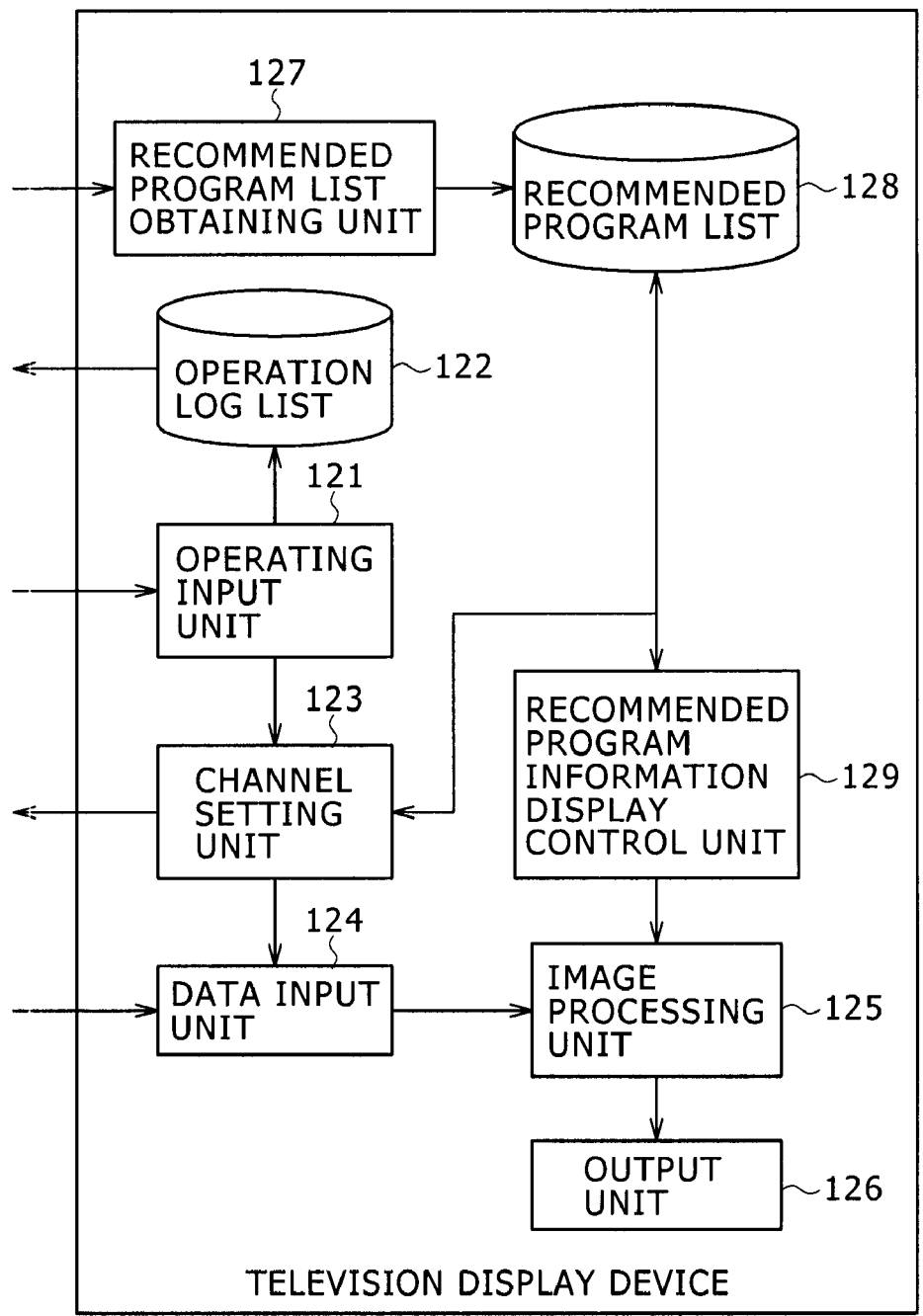
FIG. 32 is a block diagram showing a configuration of a television display device in FIG. 1.

FIG. 32 is a block diagram showing a configuration of the television display device 11.

An operating input unit 121 receives an operating input from the user, and supplies a control signal corresponding to the operating input from the user to various parts of the television display device 11. Also, the operating input unit 121 supplies a description of the operation by the user to an operation log list 122 to store the description of the operation in the operation log list 122. A user operation log stored in the operation log list 122 is obtained by the operation log obtaining unit 46 in the program recommendation processing device 10 described with reference to FIG. 13. When a user operation input is to select a channel, the operating input unit 121 supplies the input user operation to a channel setting unit 123.

The channel setting unit 123 generates a control signal indicating the selection of the channel on the basis of a signal indicating the user operation input supplied from the operating input unit 121. The channel setting unit 123 supplies the control signal to the television receiving device 4. Also, the channel setting unit 123 generates a control signal indicating the selection of a channel to automatically set the channel on the basis of recommendation information registered in a recommended program list 128 to be described later. The channel setting unit 123 supplies the control signal to the television receiving device 4. On the basis of the control signal, the television receiving device 4 receives a broadcast signal of the specified channel.

A data input unit 124 receives the broadcast signal input from the television receiving device 4, and then supplies the broadcast signal to an image processing unit 125. The image processing unit 125 subjects the supplied broadcast signal to image processing based on an image display method of an output unit 126. The image processing unit 125 supplies the broadcast signal after the image processing to the output unit 126. The output unit 126 includes for example a display device such as a CRT (Cathode Ray Tube), an LCD (Liquid Crystal Display) or the like, and an audio output device such as a speaker or the like. The output unit 126 displays an image signal of the supplied broadcast signal after the image processing on the display device, and outputs an audio signal of the broadcast signal from the audio output device.

A recommended program list obtaining unit 127 obtains recommendation information from the program recommendation processing device 10, and then supplies the recommendation information to the recommended program list 128. The recommended program list 128 registers therein the supplied recommendation information. The recommendation information registered in the recommended program list 128 is output to the channel setting unit 123, or read out by a recommended program information display control unit 129.

The recommended program information display control unit 129 outputs recommendation information read out from the recommended program list 128 to the image processing unit 125 in order to present the program recommendation information to the user. The image processing unit 125 outputs the recommendation information supplied from the recommended program information display control unit 129 singly or in a state of being superimposed on the image of the broadcast signal supplied from the data input unit 124 to the output unit 126 to display the recommendation information on the display device.

Incidentally, whether to display the recommendation information on the output unit 126 or automatically set a channel on the basis of the recommendation information supplied from the program recommendation processing device 10 may be determined by a user setting.

Referring to a flowchart of FIG. 33, description will be made of a recommendation information display process for presenting program recommendation information to the user on the basis of recommendation information supplied from the program recommendation processing device 10.

In step S251, the recommended program list obtaining unit 127 obtains recommendation information output from the recommendation information outputting unit 49 in the program recommendation processing device 10.

In step S252, the recommended program list obtaining unit 127 registers the obtained recommendation information in the recommended program list 128.

In step S253, the recommended program information display control unit 129 reads, from the recommended program list 128, recommendation information for recommending programs to be broadcast within a predetermined time of for example three hours or one day of a present time, generates data for displaying the recommendation information to display titles, contents, broadcast times, broadcasting channels and the like of the recommended programs, and then supplies the data for displaying the recommendation information to the image processing unit 125.

In step S254, the image processing unit 125 performs image processing to display the supplied data for displaying the recommendation information on the output unit 126. The image processing unit 125 supplies a result of the image processing to the output unit 126. The recommendation information is subjected to the image processing singly or so as to be superimposed on the image of a broadcast signal supplied from the data input unit 124.

In step S255, the output unit 126 displays the recommendation information supplied from the image processing unit 125. Then the process is ended.

As a result of such a process, the recommendation information is displayed on the output unit 126. The user can therefore select a program to be viewed referring to the displayed recommendation information.

Figure 34:
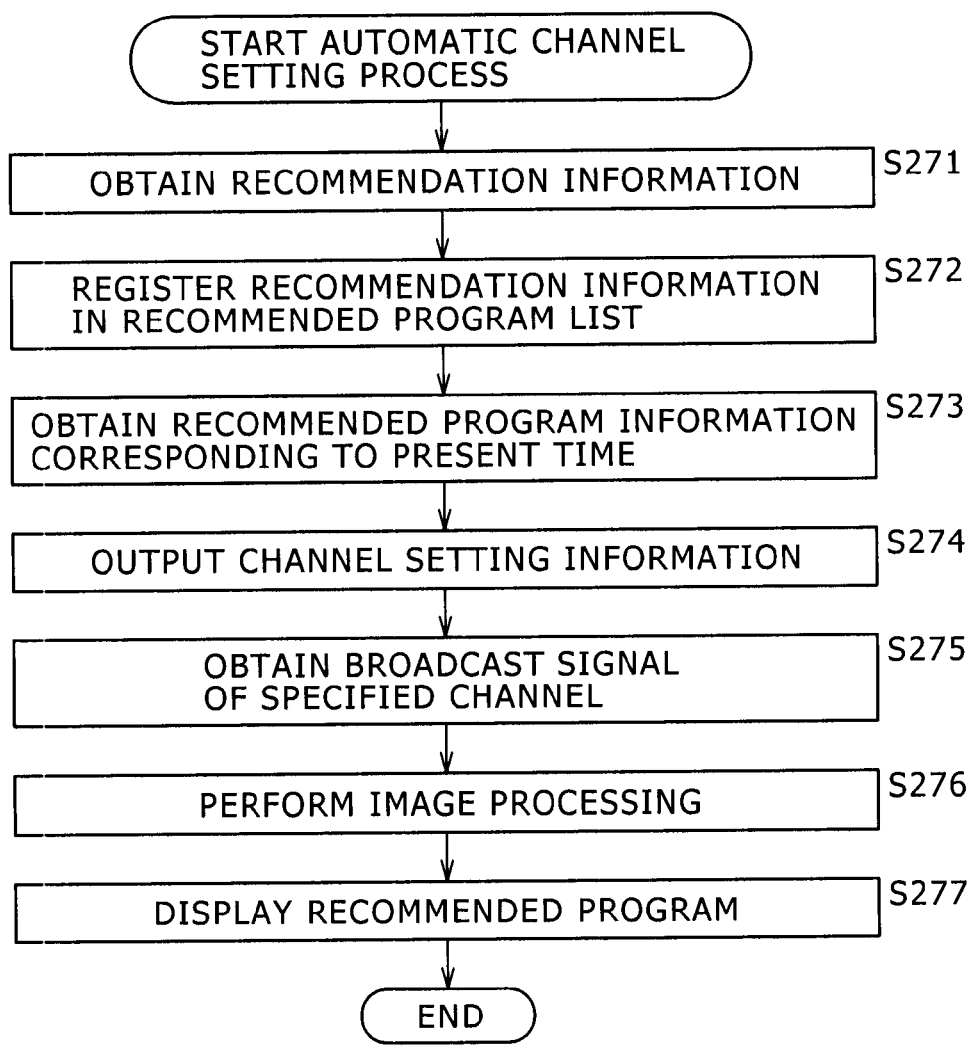
FIG. 34 is a flowchart of assistance in explaining an automatic channel setting process.

Referring to a flowchart of FIG. 34, description will next be made of an automatic channel setting process for automatically setting a channel on the basis of recommendation information supplied from the program recommendation processing device 10 to display a program suiting preference of the user.

Figure 33:
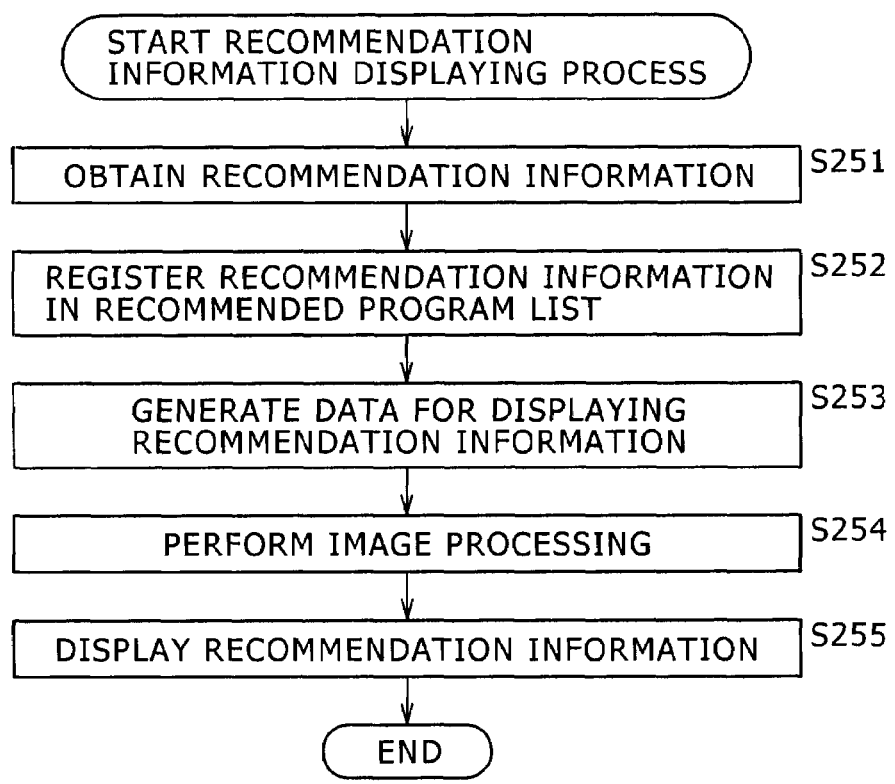
FIG. 33 is a flowchart of assistance in explaining a recommendation information display process.

In step S271 and step S272, the same process as that of step S251 and step S252 described with reference to FIG. 33 is performed. That is, recommendation information output from the recommendation information outputting unit 49 in the program recommendation processing device 10 is obtained, and the obtained recommendation information is registered in the recommended program list 128.

The channel setting unit 123 obtains information on a recommended program corresponding to a present time from the recommended program list 128 in step S273. In step S274, the channel setting unit 123 generates channel setting information on the basis of the information on the recommended program, and then outputs the channel setting information to the television receiving device 4. The television receiving device 4 receives a broadcast signal of a specified channel on the basis of the control signal.

In step S275, the data input unit 124 obtains the broadcast signal of the specified channel from the television receiving device 4. The data input unit 124 supplies the broadcast signal to the image processing unit 125.

In step S276, the image processing unit 125 subjects the supplied broadcast signal to image processing for display on the output unit 126. The image processing unit 125 outputs a result of the image processing to the output unit 126.

In step S277, the output unit 126 displays video of the recommended program supplied from the image processing unit 125, and outputs audio of the recommended program. Then the process is ended.

As a result of such a process, channel setting is automatically made to a channel on which the program suiting the preference of the user is being broadcast. The automatic channel setting process described with reference to FIG. 34 may be performed when a command is given by the user, for example. This makes it possible to set the channel automatically to an appropriate program being broadcast when the user does not know what program to view, for example.

In addition, the automatic channel setting process described with reference to FIG. 34 may be performed at intervals of a predetermined time of for example two hours after which if the channel remains unchanged without any particular intention, it can be determined that the channel is left as it is, or for example when there is no operating input from the user for a predetermined time after which the channel that remains unchanged can be determined to be left as it is.

Incidentally, in order to prevent automatic channel change while the user is viewing a program with intention, a mode in which the automatic channel setting process is disabled may be provided, and the user may be able to give a command to set the mode.

Figure 35:
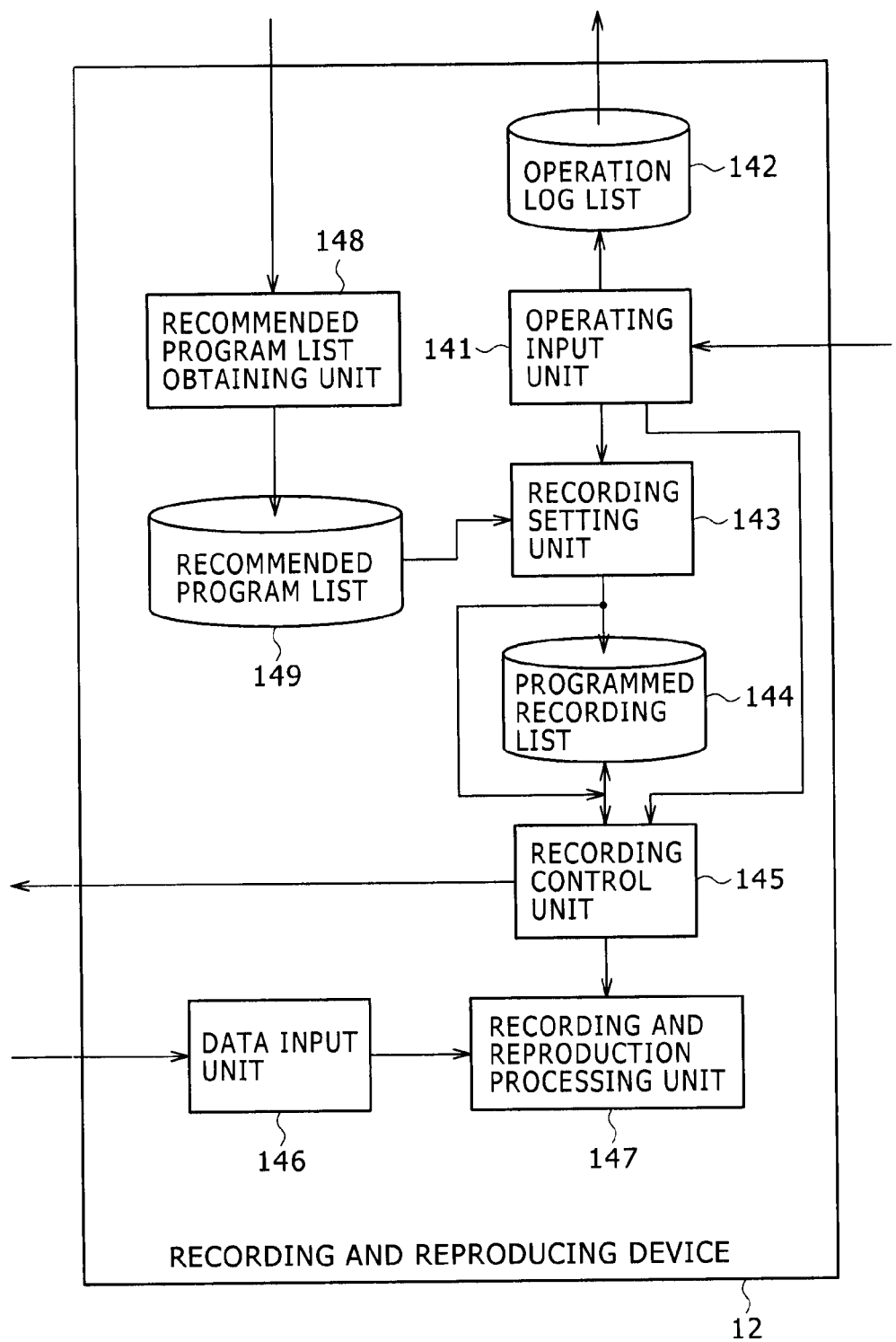
FIG. 35 is a block diagram showing a configuration of a recording and reproducing device in FIG. 1.

FIG. 35 is a block diagram showing a configuration of the recording and reproducing device 12.

An operating input unit 141 receives an operating input from the user, and supplies a control signal corresponding to the operating input from the user to various parts of the recording and reproducing device 12. Also, the operating input unit 141 supplies a description of the operation by the user to an operation log list 142 to store the description of the operation in the operation log list 142. A user operation log stored in the operation log list 142 is obtained by the operation log obtaining unit 46 in the program recommendation processing device 10 described with reference to FIG. 13.

A recording setting unit 143 extracts information necessary to perform a recording process, such for example as a broadcast start time and a broadcast end time, a broadcasting channel and the like of a program to be recorded on the basis of a signal indicating a user operating input supplied from the operating input unit 141 or from recommendation information registered in a recommended program list 149 to be described later. When the user operating input supplied from the operating input unit 141 is for programmed recording, the recording setting unit 143 registers the information necessary to perform a recording process in a programmed recording list 144. When the user operating input supplied from the operating input unit 141 is for a process of recording a program being broadcast now, or when an automatic recording process is to be performed using recommendation information registered in the recommended program list 149 to be described later, the recording setting unit 143 supplies the information necessary to perform a recording process to a recording control unit 145.

On the basis of the information necessary to perform a recording process which information is supplied from the recording setting unit 143, or by extracting programmed recording information corresponding to a present time from programmed recording information registered in the programmed recording list 144, the recording control unit 145 generates a control signal indicating a broadcasting channel of a program to be recorded and then supplies the control signal to the television receiving device 4, and also generates a control signal for performing a recording process and then supplies the control signal to a recording and reproduction processing unit 147. The television receiving device 4 receives a broadcast signal of the specified channel on the basis of the control signal.

A data input unit 146 receives the broadcast signal from the television receiving device 4, and supplies the broadcast signal to, the recording and reproduction processing unit 147. The recording and reproduction processing unit 147 is configured such that a recording medium such for example as a magnetic tape, an optical disk, a magnetic disk, a magneto-optical disk, or a semiconductor memory can be inserted into the recording and reproduction processing unit 147, or the recording and reproduction processing unit 147 has a recording medium such for example as a hard disk or a semiconductor memory within the recording and reproduction processing unit 147. The recording and reproduction processing unit 147 can record information on these recording media, and reproduce the information from these recording media. Specifically, when the recording medium that can be inserted into the recording and reproduction processing unit 147 is a magnetic tape, the recording and reproduction processing unit 147 has a magnetic head. The recording and reproduction processing unit 147 records (that is, videotapes) the broadcast signal supplied from the data input unit 146 onto the magnetic tape, and reproduces information recorded on the magnetic tape and then supplies the information to the television display device 11 or the like for reproduction output.

A recommended program list obtaining unit 148 obtains recommendation information from the program recommendation processing device 10, and then supplies the recommendation information to the recommended program list 149. The recommended program list 149 registers therein the supplied recommendation information. The recommendation information registered in the recommended program list 149 is output to the recording setting unit 143 so that a recording process is performed automatically.

Figure 36:
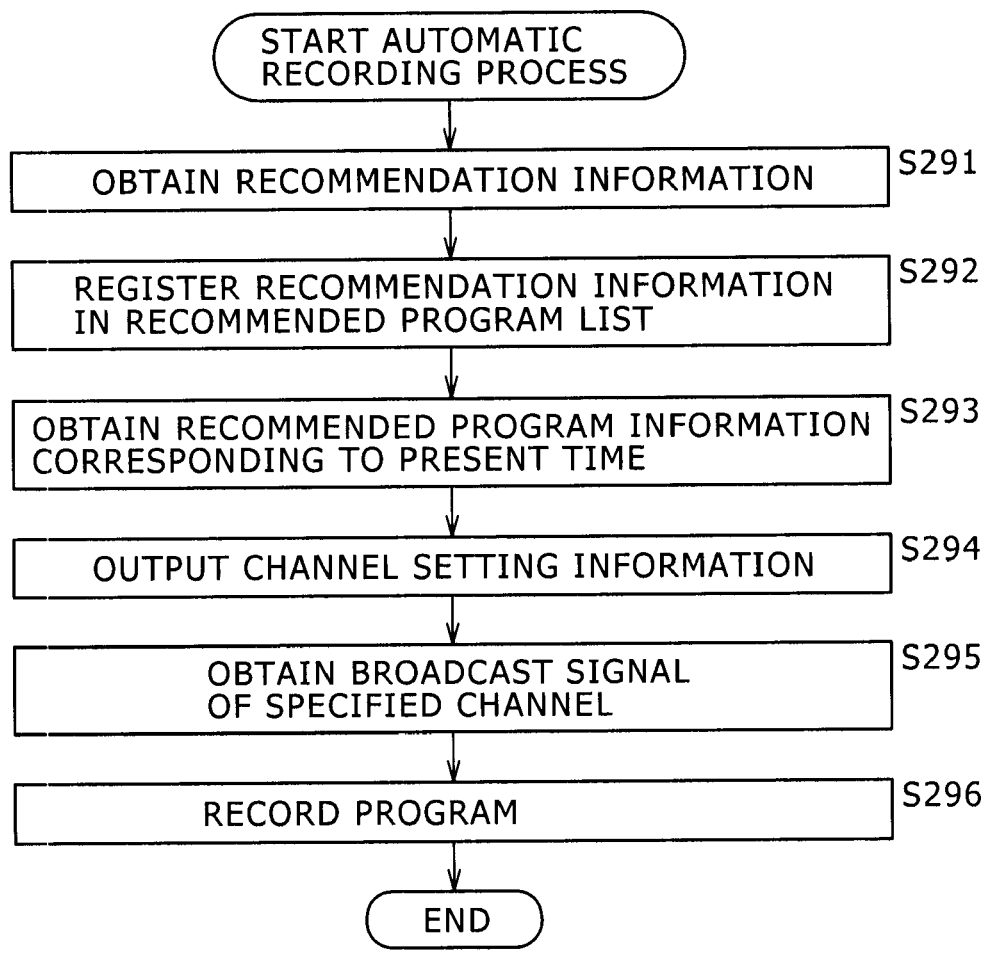
FIG. 36 is a flowchart of assistance in explaining an automatic recording process.

An automatic recording process will next be described with reference to a flowchart of FIG. 36.

In step S291, the recommended program list obtaining unit 148 obtains recommendation information output from the recommendation information outputting unit 49 in the program recommendation processing device 10.

In step S292, the recommended program list obtaining unit 148 registers the obtained recommendation information in the recommended program list 149.

In step S293, the recording setting unit 143 extracts information on a recommended program corresponding to a present time from the recommended program list 149, thereby obtains information necessary to perform a recording process, such as a broadcast start time and a broadcast end time, a broadcasting channel and the like, and then supplies the information to the recording control unit 145.

In step S294, the recording control unit 145 generates channel setting information for receiving a broadcast signal of the program to be recorded, and then outputs the channel setting information to the television receiving device 4. The television receiving device 4 receives the broadcast signal of a specified channel on the basis of the control signal.

In step S295, the data input unit 146 obtains the broadcast signal of the specified channel from the television receiving device 4, and then supplies the broadcast signal to the recording and reproduction processing unit 147.

In step S296, the recording and reproduction processing unit 147 records the supplied broadcast signal onto the recording, medium loaded or included in the recording and reproduction processing unit 147. Then the process is ended.

Such a process can automatically record a program suiting preference of the user. The automatic recording process described with reference to FIG. 36 is not performed while a recording operation is already being performed by a recording process commanded by the user or a programmed recording process, for example.

While in the above description, automatic recording is performed on the basis of a recommended program corresponding to a present time, it is needless to say that for example obtaining recommendation information for a predetermined time after the present time, programmed recording may be able to be set automatically by a similar process.

While in the processes described with reference to FIGS. 1 to 36, the program vector PP is generated in the distribution server 5, EPG data may be supplied to the program recommendation processing device via the network 8, and the program recommendation processing device may generate the program vector PP instead of the distribution server generating the program vector PP.

Figure 37:
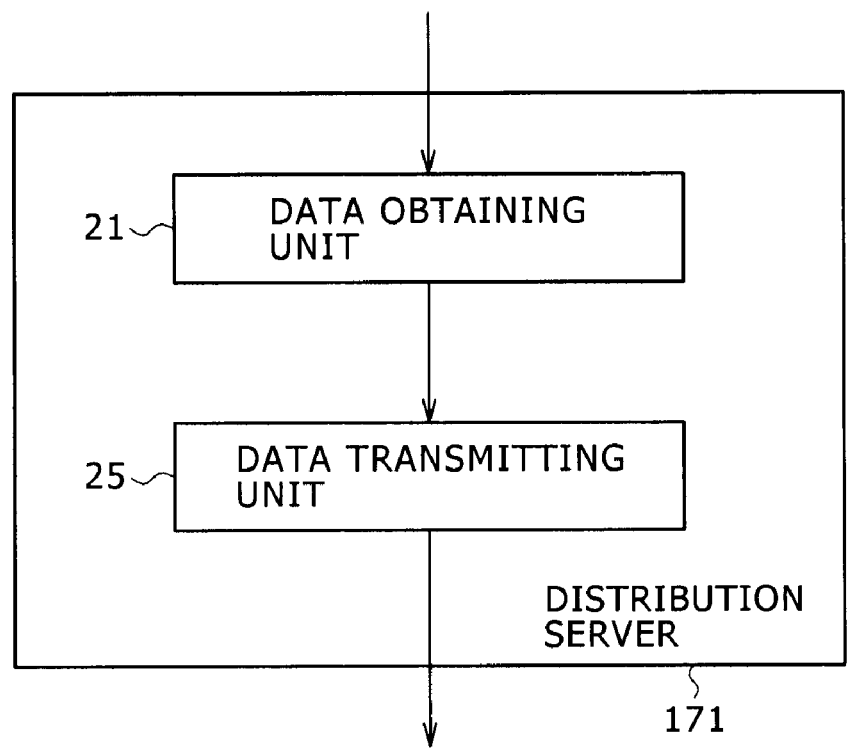
FIG. 37 is a block diagram showing another example of configuration of the distribution server.
Figure 38:
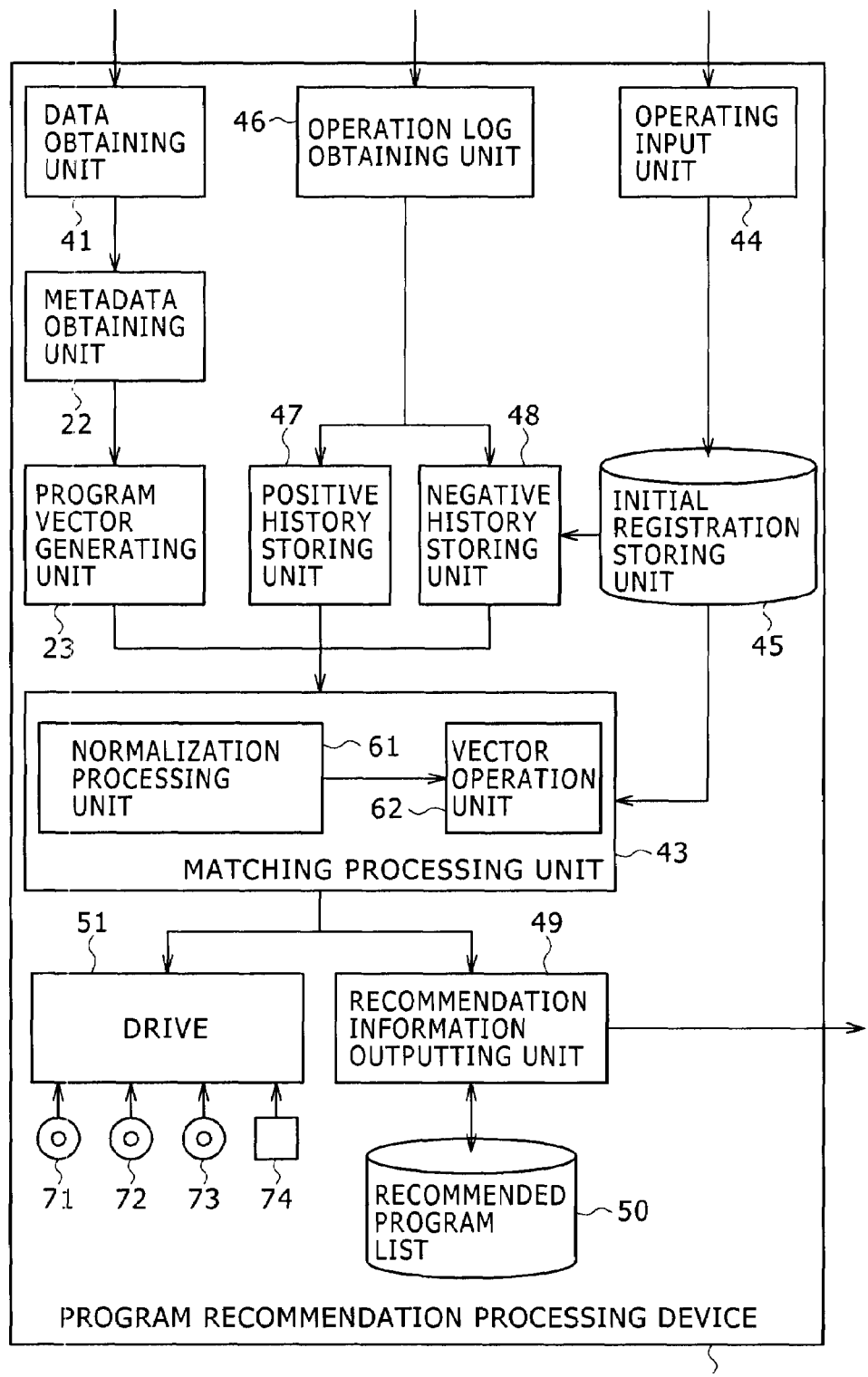
FIG. 38 is a block diagram showing another example of configuration of the program recommendation processing device.

FIG. 37 shows a configuration of a distribution server 171 and FIG. 38 shows a configuration of a program recommendation processing device 191 in a case where EPG data is supplied to the program recommendation processing device via the network 8, and the program recommendation processing device generates the program vector PP instead of the distribution server generating the program vector PP.

Incidentally, parts corresponding to those in the distribution server 5 of FIG. 2 and the program recommendation processing device 10 of FIG. 13 are identified by the same reference numerals, and description thereof will be omitted as appropriate.

Specifically, the distribution server 171 includes the data obtaining unit 21 and the data transmitting unit 25 of the distribution server 5 described with reference to FIG. 2. The distribution server 171 obtains streaming data or EPG data including metadata from the streaming data database 6 or the metadata database 7. The distribution server 171 transmits the streaming data or the EPG data to the EPG receiving device 9 or the television receiving device 4 via the network 8.

The program recommendation processing device 191 has the same configuration as the program recommendation processing device 10 described with reference to FIG. 13 except that the program recommendation processing device 191 is newly provided with a metadata extracting unit 22 and a program vector generating unit 23 that are similar to those provided in the distribution server 5 of FIG. 2. In addition to the processes performed by the program recommendation processing device 10, the program recommendation processing device 191 performs the first program vector generating process described with reference to FIG. 3 and the second program vector generating process described with reference to FIG. 6 as well as the first grouping process described with reference to FIG. 7 and the grouping process described with reference to FIG. 8.

The same effects as in the case described with reference to FIGS. 1 to 36 can be produced in the case where EPG data is supplied to the program recommendation processing device via the network 8, and the program recommendation processing device generates the program vector PP instead of the distribution server generating the program vector PP.

Figure 39:
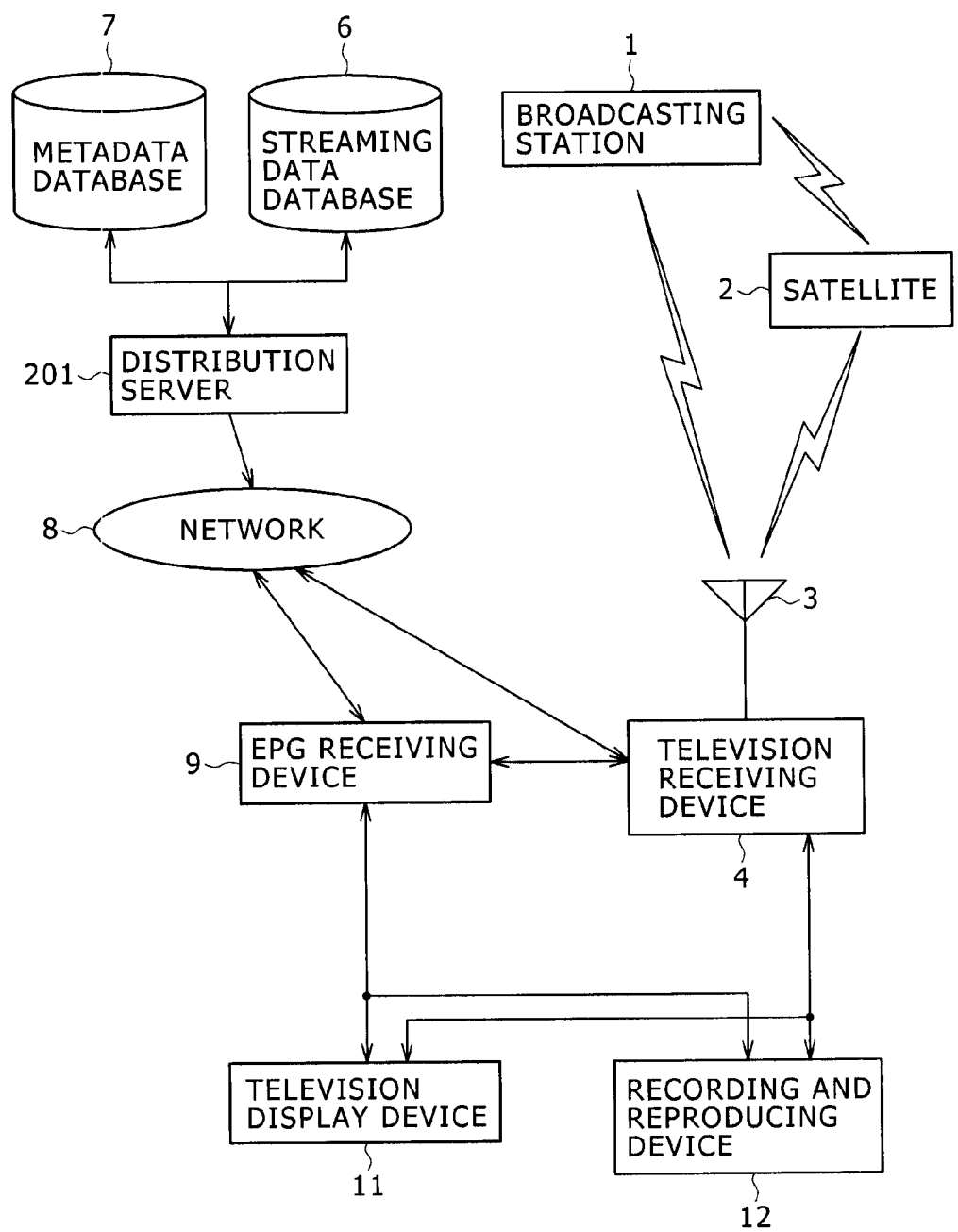
FIG. 39 is a diagram of assistance in explaining another example of a network for television program broadcasting and stream data distribution.
Figure 40:
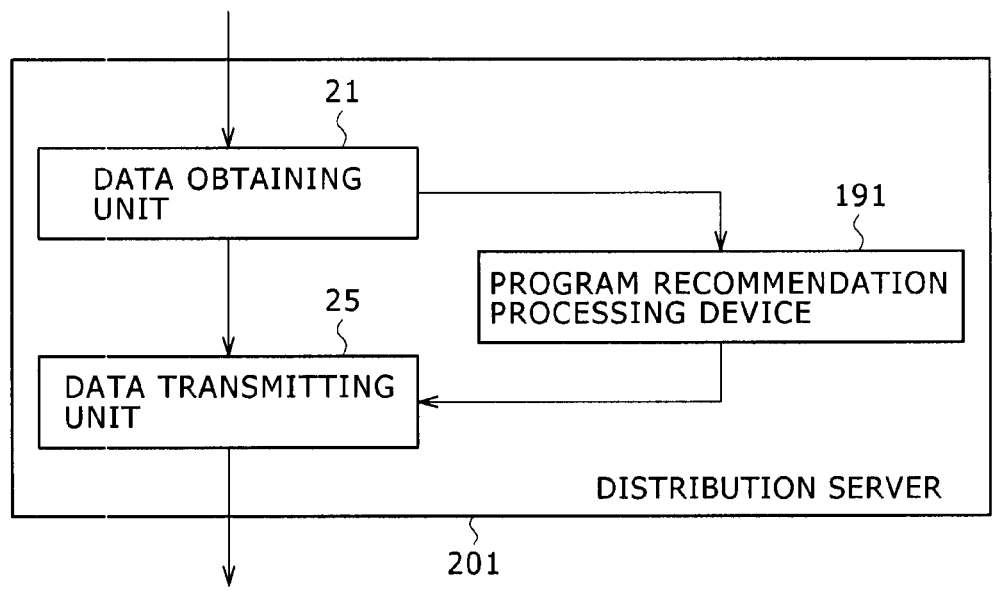
FIG. 40 is a block diagram showing another example of configuration of the distribution server.

Further, the EPG receiving device 9 may collect a history of user operations, setting information and the like from the television display device 11 and the recording and reproducing device 12, and supply the history of user operations, the setting information and the like to the distribution server via the network 8, and the distribution server may not only generate the program vector PP but also perform a matching process and then supply a matching result to the EPG receiving device 9 via the network 8. FIG. 39 shows a network configuration in this case, and FIG. 40 is a block diagram showing a configuration of a distribution server 201 in this case.

Incidentally, parts corresponding to those in FIG. 1, FIG. 37, and FIG. 38 are identified by the same reference numerals, and description thereof will be omitted as appropriate.

Specifically, the distribution server 201 is formed by adding the functions of the program recommendation processing device 191 described with reference to FIG. 38 to the distribution server 171 described with reference to FIG. 37. Therefore the user does not need to retain the program recommendation processing device.

In the configuration shown in FIG. 39 and FIG. 40, the distribution server 201 performs all the processes described with reference to FIGS. 3 to 12 and FIGS. 14 to 30, such as the process for generating the program vector PP, the program side effect vector EfPP, the positive history vector UP, the negative history vector MUP, or the standard preference vector APP, the program vector grouping processes, the matching processes, or the exceptional recommended program selecting process.

Incidentally, in this case, a history of user operations, setting information and the like collected from a television display device 11 and a recording and reproducing device 12 and transmitted via a network 8 by an EPG receiving device 9 are provided with a user ID, for example, so as to be distinguishable by user. Also, an initial registration storing unit 45, a positive history storing unit 47, a negative history storing unit 48 and the like in the program recommendation processing device 191 of the distribution server 201 store respective pieces of information by user on the basis of user IDs of the supplied information.

While the above description has been made of a case where a program suiting preference of a user is recommended by using EPG data of television broadcast signals, the present invention is also applicable to cases where attribute information is added to various digital contents such as radio broadcasts or streaming data, and contents suiting preference of a user are recommended.

The series of processes described above can be carried out also by software. The software, or a program constituting the software is installed from a recording medium onto a computer that is incorporated in special hardware, or for example a general-purpose personal computer that can perform various functions by installing various programs thereon.

As shown in FIG. 2, FIG. 13, or FIG. 38, the recording medium is formed by for example a packaged medium distributed to users to provide the program separately from the computer, and having the program recorded thereon, the packaged medium including the magnetic disk 31 or 71 (including flexible disks), the optical disk 32 or 72 (including CD-ROM (Compact Disk-Read Only Memory) and DVD (Digital Versatile Disk)), the magneto-optical disk 33 or 73 (including MD (Mini-Disk) (trademark)), the semiconductor memory 34 or 74 or the like.

In addition, in the present specification, the steps describing the program recorded on the recording medium include not only processes carried out in time series in the described order but also processes carried out in parallel or individually and not necessarily in time series.

It is to be noted that in the present specification, a system refers to an apparatus as a whole formed by a plurality of apparatus.

INDUSTRIAL APPLICABILITY

Thus, according to the present invention, contents suiting preference of a user can be selected. Particularly because recommendation information indicating contents recommended for viewing to the user is generated by calculating a degree of similarity between first preference information generated on the basis of a user operation history and attribute information and a degree of similarity between second preference information and the attribute information independently of each other, contents suiting preference of a user accurately can be selected.

The invention claimed is:

1. An information processing apparatus for executing a process of selecting a content suiting preference of a user, comprising:
   attribute information obtaining means for obtaining attribute information of said content;
   operation history obtaining means for obtaining an operation history of said user;
   preference information generating means for generating first preference information indicating positive factors of the preference of said user and second preference information indicating negative factors of the preference of said user on a basis of said operation history obtained by said operation history obtaining means; and
   recommendation information generating means for generating recommendation information indicating the content recommended for viewing to said user by calculating a degree of similarity between said first preference information and said attribute information and a degree of similarity between said second preference information and said attribute information independently of each other.

2. The information processing apparatus as claimed in claim 1, wherein: said first preference information and said second preference information generated by said preference information generating means and said attribute information obtained by said attribute information obtaining means each include a plurality of items; said preference information generating means directs attention to one of said items of said operation history obtained by said operation history obtaining means, and generates said first preference information and said second preference information by elements of said item to which said preference information generating means directs attention; and said recommendation information generating means extracts said first preference information and said second preference information corresponding to said elements of said attribute information, and calculates a degree of similarity between said first preference information and said attribute information and a degree of similarity between said second preference information and said attribute information.

3. The information processing apparatus as claimed in claim 1, wherein: said recommendation information generating means generates recommendation information indicating said content having a low degree of similarity to each of said first preference information and said second preference information on a basis of independent results of the calculation of the degree of similarity between said first preference information and said attribute information and the degree of similarity between said second preference information and said attribute information.

4. The information processing apparatus as claimed in claim 1, wherein: said first preference information and said second preference information generated by said preference information generating means and said attribute information obtained by said attribute information obtaining means are vectorized by predetermined items.

5. The information processing apparatus as claimed in claim 4, further comprising normalization processing means for normalizing at least a part of the attribute information of said content and said first preference information and said second preference information by said items, wherein said recommendation information generating means generates said recommendation information by calculating, independently of each other, a degree of similarity between said first preference information and the attribute information of said content and a degree of similarity between said second preference information and the attribute information of said content, at least the part of the attribute information of said content and said first preference information and said second preference information being normalized by said normalization processing means.

6. The information processing apparatus as claimed in claim 4, wherein: said recommendation information generating means generates said recommendation information on a basis of a calculation of an inner product of said first preference information generated by said preference information generating means and said attribute information obtained by said attribute information obtaining means and an inner product of said second preference information generated by said preference information generating means and said attribute information obtained by said attribute information obtaining means.

7. The information processing apparatus as claimed in claim 4, wherein: said predetermined items include major items and minor items obtained by further dividing said major items into details; and said recommendation information generating means calculates, by said major items, an inner product of said first preference information generated by said preference information generating means and said attribute information obtained by said attribute information obtaining means and an inner product of said second preference information generated by said preference information generating means and said attribute information obtained by said attribute information obtaining means, and generates said recommendation information on a basis of a sum of results of the calculation of the inner products.

8. The information processing apparatus as claimed in claim 1, wherein: said operation history obtaining means divides the obtained said operation history into a first operation history indicating contents that said user likes and a second operation history indicating contents that said user does not like; and said preference information generating means generates said first preference information on a basis of said first operation history and generates said second preference information on a basis of said second operation history.

9. The information processing apparatus as claimed in claim 8, wherein: said recommendation information generating means generates said recommendation information on a basis of a value obtained by subtracting the degree of similarity between said second preference information generated by said preference information generating means and said attribute information obtained by said attribute information obtaining means from the degree of similarity between said first preference information generated by said preference information generating means and said attribute information obtained by said attribute information obtaining means.

10. The information processing apparatus as claimed in claim 1, further comprising display means for displaying said recommendation information generated by said recommendation information generating means.

11. The information processing apparatus as claimed in claim 1, further comprising:
receiving means for receiving said content; and selection controlling means for controlling selection of said content received by said receiving means on a basis of said recommendation information generated by said recommendation information generating means.

12. The information processing apparatus as claimed in claim 11, further comprising recording means for recording the received said content selected by said selection controlling means.

13. An information processing method of an information processing apparatus for executing a process of selecting a content suiting preference of a user, comprising:
obtaining an operation history of said user;
generating first preference information indicating positive factors of the preference of said user and second preference information indicating negative factors of the preference of said user on a basis of said operation history obtained by a process of said operation history obtaining step; and
generating recommendation information indicating the content suiting the preference of said user by calculating a degree of similarity between said first preference information and said attribute information and a degree of similarity between said second preference information and said attribute information independently of each other.

14. A computer readable medium including computer executable instructions, wherein the instructions, when executed by a processor, cause the processor to perform a method of selecting a content suiting preference of a user is recorded, the method comprising:
obtaining an operation history of said user;
generating first preference information indicating positive factors of the preference of said user and second preference information indicating negative factors of the preference of said user on a basis of said operation history obtained by a process of said obtaining; and
generating recommendation information indicating the content suiting the preference of said user by calculating a degree of similarity between said first preference information and said attribute information and a degree of similarity between said second preference information and said attribute information independently of each other.

15. An information processing apparatus for executing a process of selecting a content suiting preference of a user, comprising:
an attribute information obtaining unit configured to obtain attribute information of said content;
an operation history obtaining unit configured to obtain an operation history of said user;
a preference information generating unit configured to generate first preference information indicating positive factors of the preference of said user and second preference information indicating negative factors of the preference of said user on a basis of said operation history obtained by said operation history obtaining unit; and
a recommendation information generating unit configured to generate recommendation information indicating the content recommended for viewing to said user by calculating a degree of similarity between said first preference information and said attribute information and a degree of similarity between said second preference information and said attribute information independently of each other.

16. The information processing apparatus as claimed in claim 15, wherein said first preference information and said second preference information generated by said preference information generating unit and said attribute information obtained by said attribute information obtaining unit each include a plurality of items; said preference information generating unit is configured to direct attention to one of said items of said operation history obtained by said operation history obtaining unit, and to generate said first preference information and said second preference information by elements of said item to which said preference information generating unit directs attention; and said recommendation information generating unit is configured to extract said first preference information and said second preference information corresponding to said elements of said attribute information, and to calculate a degree of similarity between said first preference information and said attribute information and a degree of similarity between said second preference information and said attribute information.

17. The information processing apparatus as claimed in claim 1, wherein said recommendation information generating unit is configured to generate recommendation information indicating said content having a low degree of similarity to each of said first preference information and said second preference information on a basis of independent results of the calculation of the degree of similarity between said first preference information and said attribute information and the degree of similarity between said second preference information and said attribute information.

18. The information processing apparatus as claimed in claim 1, wherein said first preference information and said second preference information generated by said preference information generating unit and said attribute information obtained by said attribute information obtaining unit are vectorized by predetermined items.

19. The information processing apparatus as claimed in claim 18, further comprising:
a normalization processor configured to normalized at least a part of the attribute information of said content and said first preference information and said second preference information by said items, wherein said recommendation information generating unit is configured to generate said recommendation information by calculating, independently of each other, a degree of similarity between said first preference information and the attribute information of said content and a degree of similarity between said second preference information and the attribute information of said content, at least the part of the attribute information of said content and said first preference information and said second preference information being normalized by said normalization processor.

20. The information processing apparatus as claimed in claim 18, wherein said recommendation information generating unit is configured to generate said recommendation information on a basis of a calculation of an inner product of said first preference information generated by said preference information generating unit and said attribute information obtained by said attribute information obtaining unit and an inner product of said second preference information generated by said preference information generating unit and said attribute information obtained by said attribute information obtaining unit.

* * * * *